(12) United States Patent
Stremler et al.

(10) Patent No.: US 8,712,877 B2
(45) Date of Patent: Apr. 29, 2014

(54) PHILANTHROPY MANAGEMENT APPARATUS, SYSTEM, AND METHODS OF USE AND DOING BUSINESS

(75) Inventors: Troy Stremler, Parker, CO (US); Stephen P. Clark, Monument, CO (US); Jeffrey M. Emrich, Colorado Springs, CO (US)

(73) Assignee: Newdea, Inc., Englewood, CO (US)

( * ) Notice: Subject to any disclaimer, the term of this patent is extended or adjusted under 35 U.S.C. 154(b) by 558 days.

(21) Appl. No.: 11/624,193

(22) Filed: Jan. 17, 2007

(65) Prior Publication Data

US 2008/0288374 A1    Nov. 20, 2008

Related U.S. Application Data

(62) Division of application No. 10/290,556, filed on Nov. 8, 2002.

(60) Provisional application No. 60/345,361, filed on Nov. 8, 2001.

(51) Int. Cl.
- *G07B 17/00* (2006.01)
- *G07F 19/00* (2006.01)
- *G06Q 40/00* (2012.01)
- *G06Q 30/04* (2012.01)
- *G06Q 20/10* (2012.01)
- *G06Q 30/02* (2012.01)

(52) U.S. Cl.
CPC .............. *G06Q 40/10* (2013.01); *G06Q 30/04* (2013.01); *G06Q 20/10* (2013.01); *G06Q 30/02* (2013.01)
USPC ................................ 705/30; 705/32; 705/39

(58) Field of Classification Search
CPC ....... G06Q 40/10; G06Q 30/04; G06Q 20/10; G06Q 30/02
USPC ......... 705/1, 7, 26, 39, 40, 14, 30, 34, 27, 11, 705/36 R, 44, 7.14, 80, 32, 2; 235/375, 380, 235/379, 376; 709/223, 224
See application file for complete search history.

(56) References Cited

U.S. PATENT DOCUMENTS 5,557,518 A    9/1996  Rosen
5,621,640 A *  4/1997  Burke ............................ 705/14

(Continued)

FOREIGN PATENT DOCUMENTS

WO    WO-02/42951 A1    5/2002

OTHER PUBLICATIONS

JustGive, JustGive.org, Jan. 25, 2001 as obtained from the Wayback Machine.*

(Continued)

Primary Examiner — Olusegun Goyea
(74) Attorney, Agent, or Firm — Merchant & Gould PC

(57) ABSTRACT

A philanthropic donation management system and methods of use and doing business. The system includes a computing server in communication with a communications network, such as the Internet, a LAN, or a WAN. The computing server maintains information about charitable projects and provides remote users and others with management tools for inputting information about charitable projects, pre-approving or otherwise assessing them, and accessing and managing charitable project information, portfolios, user team member information and access. The system can provide a business based on, for example, providing system, access, charitable fund management, and charitable donation transaction fees.

14 Claims, 72 Drawing Sheets

(56) References Cited

U.S. PATENT DOCUMENTS

| | | | |
|---|---|---|---|
| 5,663,547 A | 9/1997 | Ziarno | |
| 5,665,952 A | 9/1997 | Ziarno | |
| 5,696,366 A | 12/1997 | Ziarno | |
| 5,826,243 A | 10/1998 | Musmanno et al. | |
| 5,987,440 A * | 11/1999 | O'Neil et al. | 705/44 |
| 6,052,674 A | 4/2000 | Zervides et al. | |
| 6,363,361 B1 | 3/2002 | Lundberg | |
| 6,519,573 B1 * | 2/2003 | Shade et al. | 705/26 |
| 6,578,010 B1 * | 6/2003 | Teacherson | 705/14.16 |
| 6,581,041 B1 * | 6/2003 | Canney | 705/36 R |
| 6,750,881 B1 | 6/2004 | Appelman | |
| 7,100,195 B1 | 8/2006 | Underwood | |
| 7,120,387 B2 * | 10/2006 | Gruber et al. | 434/350 |
| 7,130,802 B1 * | 10/2006 | Mehregany et al. | 705/7.14 |
| 7,130,807 B1 | 10/2006 | Mikurak | |
| 7,165,041 B1 | 1/2007 | Guheen et al. | |
| 7,325,012 B2 * | 1/2008 | Nagy | 1/1 |
| 7,448,534 B2 * | 11/2008 | Stremler et al. | 235/376 |
| 2001/0051875 A1 * | 12/2001 | Miller et al. | 705/1 |
| 2002/0016718 A1 | 2/2002 | Rothschild et al. | |
| 2002/0026511 A1 | 2/2002 | Garcia-Luna-Aceves et al. | |
| 2002/0029179 A1 * | 3/2002 | Gruber et al. | 705/35 |
| 2002/0038225 A1 | 3/2002 | Klasky et al. | |
| 2002/0059512 A1 * | 5/2002 | Desjardins | 713/1 |
| 2002/0062367 A1 * | 5/2002 | Debber et al. | 709/224 |
| 2002/0069108 A1 | 6/2002 | Aubertin et al. | |
| 2002/0077839 A1 | 6/2002 | Siegel et al. | |
| 2002/0087464 A1 * | 7/2002 | Galland | 705/39 |
| 2002/0091538 A1 * | 7/2002 | Schwartz et al. | 705/1 |
| 2002/0111904 A1 * | 8/2002 | Gruber et al. | 705/39 |
| 2002/0165759 A1 * | 11/2002 | Gruber et al. | 705/10 |
| 2002/0178082 A1 | 11/2002 | Krause et al. | |
| 2002/0184058 A1 | 12/2002 | Simonson et al. | |
| 2003/0033244 A1 | 2/2003 | Feig et al. | |
| 2004/0162775 A1 | 8/2004 | Winklevoss et al. | |
| 2004/0182992 A1 | 9/2004 | Talarico | |
| 2004/0225569 A1 | 11/2004 | Bunnell | |
| 2004/0230524 A1 | 11/2004 | Meiners | |
| 2005/0015335 A1 | 1/2005 | Howard | |
| 2005/0033669 A1 | 2/2005 | Stremler et al. | |
| 2005/0055264 A1 | 3/2005 | Gallick et al. | |
| 2005/0114254 A1 | 5/2005 | Condie | |
| 2005/0159976 A1 * | 7/2005 | Schwartz et al. | 705/1 |
| 2005/0235061 A1 * | 10/2005 | Debber et al. | 709/224 |
| 2005/0240433 A1 * | 10/2005 | Schwartz et al. | 705/1 |
| 2006/0059253 A1 * | 3/2006 | Goodman et al. | 709/223 |
| 2007/0021973 A1 | 1/2007 | Stremler | |
| 2007/0106575 A1 | 5/2007 | Barr et al. | |
| 2007/0136147 A1 | 6/2007 | Stremler et al. | |
| 2007/0198372 A1 | 8/2007 | Stremler et al. | |
| 2008/0288374 A1 | 11/2008 | Stremler et al. | |

OTHER PUBLICATIONS www.Arthritis.org webpages dated Sep. 25, 2001 as retrieved from the Wayback Machine.*
Office Action (non-final), U.S. Appl. No. 11/624,190, Jul. 11, 2007.
Office Action (non-final), U.S. Appl. No. 10/290,556, Jun. 29, 2007.
Office Action (non-final), U.S. Appl. No. 10/290,556, Dec. 5, 2006.
PCT International Search Report and Written Opinion, dated Mar. 21, 2007, 10 pages.
Singapore Written Opinion, dated Jan. 19, 2007, 4 pages.
Internet Article; www.newdea.com; Newdea is a leading provider of high-quality . . . ; Aug. 2, 2002, 2 pages.
Internet Article; www.newdea.com; The MyGivingPortfolio software . . . ; Aug. 2, 2002, 1 page.
Internet Article; www.newdea.com; MyGivingPortfolio Direct is an easy . . . ; Jun. 10, 2002, 1 page.
Internet Article; www.newdea.com; MyGivingPortfolio Pro Offers Donor . . . ; Jun. 10, 2002, 1 page.
Internet Article; www.newdeacom; Newdea Announces Newdea Project Network Pilot; Dec. 13, 2007, 2 pages.
Internet Article; www.newdea.com; Project Assessment System; Dec. 3, 2001, 1 page.
Internet Article; www.neadea.com; Newdea New Corporate Web Site; Oct. 8, 2001, 1 page.
Internet Article; www.newdea.com; Newdea Announces MyGivingPortfolio.com; May 30, 2001, 1 page.
JustGive.org, "Donate Money to Charity," http://www.justgive.org/?gclid=CLTwhvTriloCFQNGgQod6SGedw, 4 pages, Jan. 25, 2001 (accessed Jan. 30, 2007).
Office Action (non-final), U.S. Appl. No. 11/624,196, Sep. 5, 2008.
PCT International Search Report and Written Opinion, dated Sep. 2, 2008, PCT Patent Application No. PCT/US08/61450, 8 pages.
PCT International Preliminary Report on Patentability, dated Jul. 11, 2008, 13 pages.
PCT International Search Report and Written Opinion, dated Jul. 3, 2008, 13 pages.
Office Action (non-final), U.S. Appl. No. 11/542,929, Jun. 12, 2008.
Office Action (non-final), U.S. Appl. No. 10/873,995, Jun. 11, 2008.
Examination Report, Intellectual Property Office of New Zealand; dated Jun. 9, 2008, 1 page.
Office Action (final), U.S. Appl. No. 10/290,556, May 14, 2008.
Office Action (non-final), U.S. Appl. No. 10/290,556, Dec. 1, 2008.
Office Action (non-final), U.S. Appl. No. 11/624,186, Nov. 4, 2008.
Australian 1st Exam Report in Application 2004250719, mailed Jul. 3, 2008, 2 pgs.
Australian 1st Exam Report in Application 2010201313, mailed Dec. 19, 2011, 2 pgs.
Australian 3rd Exam Report in Application 2010201313, mailed Jun. 7, 2013, 3 pgs.
Australian Examiner's First Report in Application 2008245683, mailed May 25, 2012, 2 pgs.
Australian Examiner's Second Report in Application 2008245683, mailed Jul. 8, 2013, 2 pgs.
Australian Examiner's Second Report in Application 2010201313, mailed Feb. 27, 2012, 2 pgs.
Chinese Notice on Correction of Formal Deficiencies in Application 200480023754.3, mailed Mar. 17, 2006, 2 pgs.
Chinese Notice on Publication and Entering Into Examination in Application 200480023754.3, mailed Oct. 20, 2006, 2 pgs.
European Communication in Application 06815982.1, mailed Jun. 6, 2008, 2 pgs.
European Official Communication in Application 04776891.6, mailed Dec. 7, 2006, 2 pgs.
European Official Communication in Application 04776891.6, mailed Mar. 1, 2006, 1 pg.
European Official Communication in Application 04776891.6, mailed Jul. 7, 2008, 1 pg.
European Official Communication in Application 06788549.1, mailed Apr. 4, 2008, 2 pgs.
European Official Communication in Application 08754919.2, mailed Jan. 15, 2010, 1 pg.
Internet Archive: www.habitat.org, "habitat for humanity international", Aug. 15, 2000, 3 pgs.
JustGive.org, Retrieved Jun. 3, 2008, Archived Aug. 3, 2004, http://web.archive.org/web/20040803070752/http://www.justgive.org/index.html, 67 pgs.
New Zealand Examination Report and Notice of Acceptance of Complete Specification for Application 544269, Intellectual Property Office of New Zealand; mailed Sep. 24, 2008, 2 pages.
New Zealand Examination Report for Application 544269, Intellectual Property Office of New Zealand; mailed Sep. 5, 2006, 2 pages.
New Zealand First Examination Report in Application 581401, mailed Oct. 10, 2012, 2 pgs.
New Zealand Second Examination Report in Application 581401, mailed Apr. 14, 2011, 2 pgs.
PCT International Preliminary Report on Patentability, dated Apr. 7, 2009, PCT Patent Application No. PCT/US06/38362, 9 pages.
PCT International Search Report and Written Opinion in International Application PCT/US04/19913, mailed Jun. 30, 2005, 4 pgs.
Proquest search, obtained online at: http://proquest.umi.com/pqdweb?RQT=560&TS=1212588819&clientld=19649, Jun. 4, 2008, 1 page.
U.S. Appl. No. 10/290,556, Amendment and Response filed on Nov. 14, 2008, 8 pgs.

(56) References Cited

OTHER PUBLICATIONS

U.S. Appl. No. 10/290,556, Amendment and Response filed on Nov. 29, 2007, 17 pgs.
U.S. Appl. No. 10/290,556, Amendment and Response filed on Mar. 26, 2007, 26 pgs.
U.S. Appl. No. 10/290,556, Final Office Action mailed May 14, 2008, 12 pages.
U.S. Appl. No. 10/873,995, Amendment and Response filed on Dec. 11, 2008, 12 pgs.
U.S. Appl. No. 10/873,995, Office Action mailed Apr. 3, 2009, 20 pgs.
U.S. Appl. No. 10/873,995, Office Action mailed Jun. 11, 2008, 24 pgs.
U.S. Appl. No. 11/493,502, Office Action mailed Sep. 29, 2009, 20 pgs.
U.S. Appl. No. 11/542,929, Amendment and Response filed Dec. 12, 2008, 13 pgs.
U.S. Appl. No. 11/542,929, Amendment and Response filed Feb. 17, 2012, 20 pgs.
U.S. Appl. No. 11/542,929, Amendment and Response filed Jul. 19, 2011, 11 pgs.
U.S. Appl. No. 11/542,929, Amendment and Response filed Sep. 12, 2012, 16 pgs.
U.S. Appl. No. 11/542,929, Office Action mailed Nov. 17, 2011, 27 pgs.
U.S. Appl. No. 11/542,929, Office Action mailed Mar. 16, 2012, 32 pgs.
U.S. Appl. No. 11/542,929, Office Action mailed Mar. 21, 2013, 32 pgs.
U.S. Appl. No. 11/542,929, Office Action mailed Apr. 13, 2009, 17 pgs.
U.S. Appl. No. 11/542,929, Office Action mailed Jun. 12, 2008, 17 pgs.
U.S. Appl. No. 11/624,186, Amendment and Response filed on May 4, 2009, 8 pgs.
U.S. Appl. No. 11/624,186, Office Action mailed Sep. 1, 2009, 10 pgs.
U.S. Appl. No. 11/624,190, Advisory Action mailed Jun. 3, 2008, 3 pgs.
U.S. Appl. No. 11/624,190, Amendment and Response filed on Dec. 11, 2007, 8 pgs.
U.S. Appl. No. 11/624,190, Amendment and Response filed on Apr. 28, 2008, 8 pgs.
U.S. Appl. No. 11/624,190, Amendment and Response filed on Jun. 13, 2008, 8 pgs.
U.S. Appl. No. 11/624,190, Amendment and Response filed on Aug. 25, 2008, 11 pgs.
U.S. Appl. No. 11/624,190, Notice of Allowance mailed Sep. 23, 2008, 6 pgs.
U.S. Appl. No. 11/624,190, Office Action mailed Mar. 13, 2008, 6 pgs.
U.S. Appl. No. 11/624,190, Office Action mailed Jul. 9, 2008, 8 pgs.
U.S. Appl. No. 11/624,193, Amendment and Response filed on Oct. 31, 2011, 12 pgs.
U.S. Appl. No. 11/624,193, Amendment and Response filed on Mar. 28, 2011, 8 pgs.
U.S. Appl. No. 11/624,193, Amendment and Response filed on Apr. 2, 2009, 6 pgs.
U.S. Appl. No. 11/624,193, Amendment and Response filed on May 16, 2013, 9 pgs.
U.S. Appl. No. 11/624,193, Amendment and Response filed on Sep. 17, 2013, 8 pgs.
U.S. Appl. No. 11/624,196, Amendment and Response filed Mar. 5, 2009, 11 pgs.
U.S. Appl. No. 11/624,196, Office Action mailed May 26, 2009, 15 pgs.
Australian 3rd Exam Report in Application 2008245683, mailed Dec. 17, 2013, 3 pgs.

* cited by examiner

MyGivingPortfolio PRO     ⌒ 64     *by* newdea

User: John Demo     Last Login: 10/25/2001 10:36:30

- Home
- Clients
- Team
- Find Projects
- Reports
- Options
- Logout

89

Main Menu > Clients Menu > New Client

- NEW CLIENT

Bold type indicates required fields.

First:    ⌒ 66
Middle:    ⌒ 90
Last:    ⌒ 68

Phone Numbers:
   Home    ⌒ 70
   Work    ⌒ 92
   Mobile    ⌒ 94
   Fax    ⌒ 96

Email Address:    ⌒ 98
Email Format:    ⌒ 100

Home Address:    ⌒ 72
   Street 1    ⌒ 102
   Street 2
   City    ⌒ 74
   State    ⌒ 76
   Zip    ⌒ 78

⌒ 104

Work Address:
   Street 1
   Street 2
   City

MyGivingPortfolio PRO 474 by newdea

User: John Demo | Last Login: 10/25/2001 2:35:27

- Home
- Clients
- Team
- Find Projects
- Reports
- Options
- Logout

Main Menu > Find Projects Menu > Browse All Projects (>) Browse All Projects 478 480
(Previous Page)  Page 1 of 4  (Next Page)

476

☐ Making Abortion Unthinkable

Distribution of a fully developed "plug and play" training system to teach people th art of pro-life persuasion. The goal is to place this material into the hands of leaders and counselors who are best positioned to make a difference.

☐ Potter's House

Youth Discipleship Program

☐ Dayapuram Leprosy Hospital

Dayapuram provides integrated and holistic outreach to families affected by leprosy by offering healing and hope. Dayapuram offers a Christian-based approach to leprosy for all impacted by this disease.

☐ Chiang Rai Training Center 482

No Description Available

☐ Pokhara Preschool

Preschool targeting children of Hindu families. Program includes a lunch and nutrition program.

(Add to my Research)  (Give to Selected Projects)
484  486

Fig. 30

MyGivingPortfolio PRO ⟵ 352  by newdea

User: John Demo  Last Login: 10/25/2001 10:36:30

- Home
- Clients
- Team
- Find Projects
- Reports
- Options
- Logout

Main Menu > Give to a Project/Organization

Give to a Project/Organization

Project Name: Dayapuram Leprosy Hospital

Brief Description: Dayapuram provides integrated and holistic outreach to families affected by leprosy by offering health and hope. Dayapuram offers a Christian-based approach to leprosy care for all impacted by this disease. ⟵ 360

Amount: [                    ] ⟵ 362

Method of Payment: 366 — ● Deduct from your Account:

368 — ○ Wire Transfer:
| | |
|---|---|
| Account # | 123456789 |
| Routing # | 987654321 |
| Bank Name and Address: | Wells Fargo Bank 123 Garden of the Gods Rd Colorado Springs, CO 80919 |
| Phone #: | 800-456-2000 |

370 — ○ Check (payable to Newdea Foundation):
Mailing Address:
Newdea Foundation
5245 Centennial Blvd., Ste 107
Colorado Springs, CO 80919

( Submit )  ( Cancel )
372             374

Fig. 32

MyGivingPortfolio PRO
*by newdea*

User: John Demo  Last Login: 10/25/2001 2:35:27

- Home
- Clients
- Team
- Find Projects
- Reports
- Options
- Logout

Main Menu > Options Menu > Edit Personal Info

Edit Personal Information:

First: John  Middle: B.  Last: Demo — 408

Address 1: 123 Main St. — 410
Address 2: 100

City: Colorado Springs  State: CO — 412  Zip: 80919

Phone: 719-999-8345 — 414

Email Address: demo@newdea.com  HTML Format — 416

SUBMIT — 418    CANCEL — 422

| USER: JEFF EMERICH | LAST LOGIN: 10/26/2001 11:23:37 AM | LOGOUT |

PROJECT ASSESMMENT SYSTEM — 576 — newdea

| MAIN MENU | MY PROJECTS | MY TEAM | SEARCH | OPTIONS | ADMIN MENU | HELP |

DEFINE PROJECT

MY PROJECTS > NEW PROJECT (GENERAL)

▶ GENERAL INFO — 626
ORGANIZATION — 628
DESCRIPTION — 630
FINANCIAL — 632
CLASSIFICATION — 634
CONTACTS — 636
MEDIA — 638

NEW PROJECT

FILL IN THE FOLLOWING FIELDS FOR THE NEW PROJECT AND THEN CLICK THE "CREATE" BUTTON AT THE BOTTOM OF THE PAGE. ONCE THIS PAGE OF INFORMATION IS SAVED, YOU WILL BE FORWARDED TO THE PROJECT EDIT SCREENS, WHERE YOU CAN CONTINUE INPUTTING INFORMATION FOR THIS PROJECT.

PROJECT GENERAL INFORMATION — 604

PROJECT NAME: (REQUIRED - 50 CHARS MAX)
[_____] — 606

PROJECT SECURITY: (REQUIRED)
[(SELECTION REQUIRED) ▼] — 608

PROJECT MAILING ADDRESS

ADDRESS 1: (REQUIRED)
[_____]

ADDRESS 2 — 610
[_____]

CITY LOCALITY: (REQUIRED)
[_____]

STATE/PROVINCE:
[_____]

POSTAL CODE:
[_____]

COUNTRY: (REQUIRED)
[_____]

PROJECT SHIPPING ADDRESS — 612

ADDRESS 1:
[_____]

FIG. 49

Address 2:

City/Locality:

State/Province:

Postal Code:

Country:

General Contact Information

Project/Organization Website URL:

Phone Main:

Fax:

Phone Other (include description with number):

Phone Other (include description with number):

Phone Other (include description with number):

USER: JEFF EMERICH  LAST LOGIN: 10/26/2001 11:23:37 AM  LOGOUT

PROJECT ASSESMENT SYSTEM  — 624  newdea

MAIN MENU | MY PROJECTS | MY TEAM  SEARCH  OPTIONS  ADMIN MENU  HELP

DEFINE PROJECT — 627
▶ GENERAL INFO — 626
ORGANIZATION — 628
DESCRIPTION — 630
FINANCIAL — 632
CLASSIFICATION — 634
CONTACTS — 636
MEDIA — 638

MY PROJECTS > EDIT PROJECT (GENERAL)

EDIT PROJECT — 640

PROJECT GENERAL INFORMATION

PROJECT NAME: — 606
[TESTING]

PROJECT SECURITY:
[(SELECTION REQUIRED) ▽] — 608

PROJECT MAILING ADDRESS

ADDRESS 1:
[123]

ADDRESS 2: — 610
[ ]

CITY LOCALITY:
[CS]

STATE/PROVINCE:
[CO]

POSTAL CODE:
[ ]

COUNTRY:
[USA]

PROJECT SHIPPING ADDRESS

ADDRESS 1: — 612
[ ]

ADDRESS 1:
[ ]

CITY/LOCALITY:

*FIG. 51*

STATE/PROVINCE:

POSTAL CODE:                           ← 612

COUNTRY:

GENERAL CONTACT INFORMATION
                                        612
PROJECT/ORGANIZATION WEBSITE URL:

PHONE MAIN:

FAX:

PHONE OTHER (INCLUDE DESCRIPTION W/ NUMBER):

PHONE OTHER (INCLUDE DESCRIPTION W/ NUMBER):

PHONE OTHER (INCLUDE DESCRIPTION W/ NUMBER):

642           644
[ NEXT ]   [ CANCEL RETURN TO MY PROJECTS ]

Figure 54:
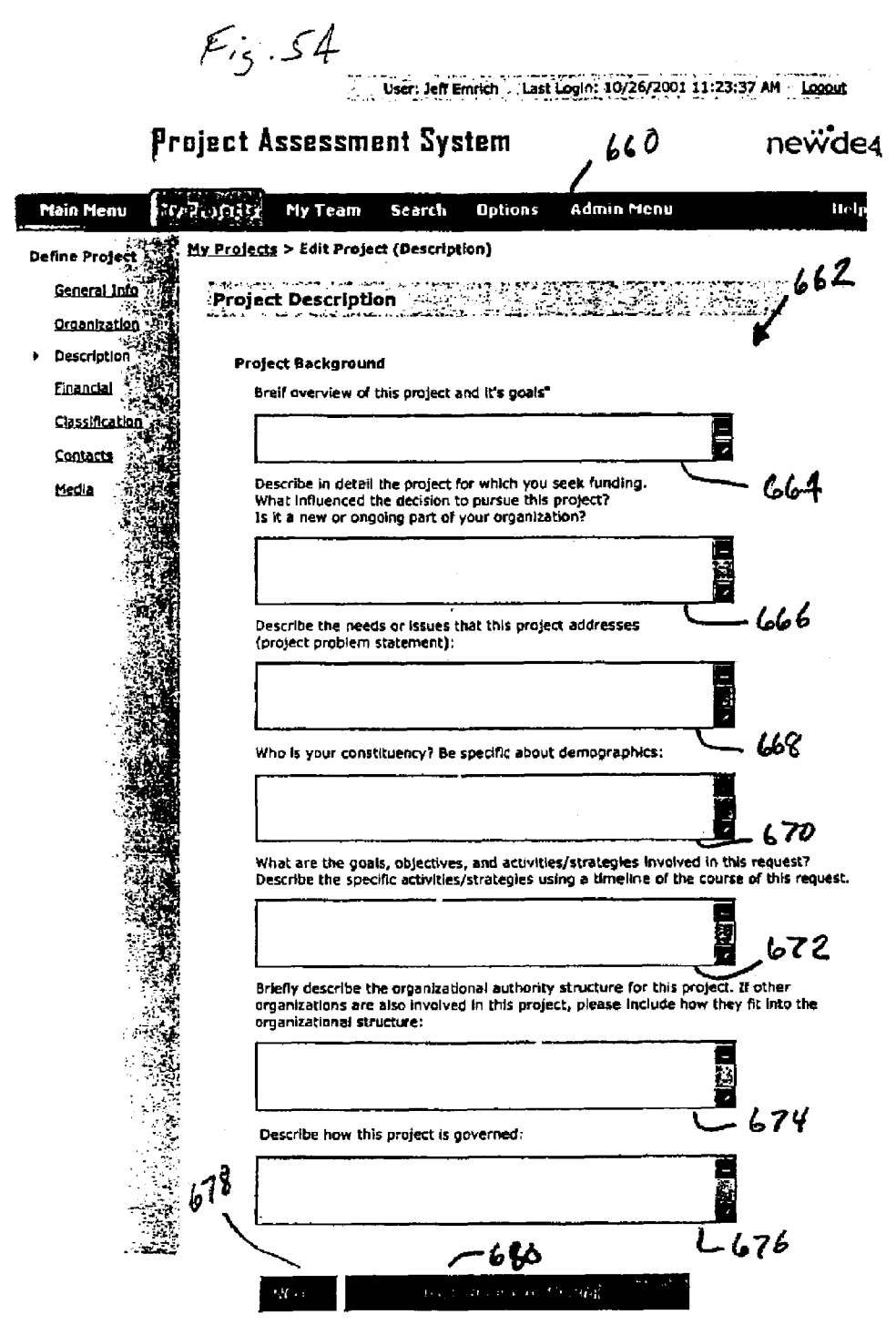

User: Jeff Emrich   Last Login: 10/26/2001 11:23:37 AM   Logout

Project Assessment System   660   newde4

Main Menu | My Projects | My Team | Search | Options | Admin Menu | Help

Define Project
- General Info
- Organization
- ▶ Description
- Financial
- Classification
- Contacts
- Media My Projects > Edit Project (Description)

Project Description — 662

Project Background

Breif overview of this project and it's goals*

[                    ]  ← 664

Describe in detail the project for which you seek funding.
What influenced the decision to pursue this project?
Is it a new or ongoing part of your organization?

[                    ]  ← 666

Describe the needs or issues that this project addresses
(project problem statement):

[                    ]  ← 668

Who is your constituency? Be specific about demographics:

[                    ]  ← 670

What are the goals, objectives, and activities/strategies involved in this request?
Describe the specific activities/strategies using a timeline of the course of this request.

[                    ]  ← 672

Briefly describe the organizational authority structure for this project. If other
organizations are also involved in this project, please include how they fit into the
organizational structure:

[                    ]  ← 674

Describe how this project is governed:

User: Jeff Emrich   Last Login: 10/26/2001 11:23:37 AM   Logout

Project Assessment System  690   newdea

| Main Menu | My Project | My Team | Search | Options | Admin Menu | Help |

Define Project
- General Info
- Organization
- Description
- ▶ Financial
- Classification
- Contacts
- Media My Projects > Edit Project (Financial)

Edit Project Financial Information

General Financial Information   694   692

Starting date of fiscal year:
[                    ]

696

Is there a matching grant available for this project?

○ Matching grant
  Details of matching grant:
  [                              ]

○ No matching grant

Fundraising Information

Total funds requested ($):   698
[                    ]

Funding request period:   700
  Start date:
  [              ]
  End date:
  [              ]

Budget Information

Total project budget ($):
[                    ] 702

Total annual expenses ($):
[                    ] 704

Expense breakdown:
  Percent to operations (%):
  [                    ] 706
  Percent to programs (%):
  [                    ] 708

Fig. 60

User: Jeff Emrich  Last Login: 10/26/2001 11:23:37 AM  Logout

Project Assessment System — 794            newdea

| Main Menu | My Projects | My Team | Search | Options | Admin Menu | Help |

826 ↙ Review Project
  ▸ General Info
  Organization — 910
  Description
  Financial
814 Classification
  Contacts
820 Media
  Evaluation
   824
806
808

Admin Menu > Manage Projects > Review Projects > Review Project - General Info

Review Project
812 Project Name:    African Orphanage — 795
814 Input By:        emrich — 796
    Input Date:      6/26/2001 6:23:29 PM — 797
818
    Project Name:         — 798
      African Orphanage
822
    Brief Project Description:        — 799
      Build an orphanage for children in Ethiopia.

Project Description:  — 800

Project Notes:  — 801

Project Mailing Address  ← 802

Project Shipping Address  ← 803

Website URL:  ← 804

827

User: Jeff Emrich    Last Login: 10/26/2001 11:23:37 AM    Logout

Project Assessment System           newdea

| Main Menu | My Projects | My Team | Search | Options | Admin Menu | Help |

Admin Menu > Manage Projects > Review Projects > Review Project - Description

Review Project

Review Project
General Info
Organization
▸ Description
Financial — 816
Classification
Contacts
Media
Evaluation Project Name:   African Orphanage  ← 831
Input By:       emrichj
Input Date:     6/26/2001 6:23:29 PM Problem Statement:   ← 834

Constituency:   ← 836

Program Description:   ← 838

Goals, Objectives, Activities/Strategies:   ← 840

Organizational Authority Structure:   ← 842

Project Governance:   ← 844

[Save] ← 846

| USER: JEFF EMERICH | LAST LOGIN: 10/26/2001 11:23:37 AM | LOGOUT |

PROJECT ASSESMMENT SYSTEM — 850 — newdea

MAIN MENU | MY PROJECTS | MY TEAM | SEARCH | OPTIONS | ADMIN MENU | HELP

REVIEW PROJECT
GENERAL INFO
ORGANIZATION
DESCRIPTION
▶ FINANCIAL
CLASSIFICATION
CONTACTS
MEDIA
EVALUATION

ADMIN MENU > MANAGE PROJECTS > REVIEW PROJECTS > REVIEW PROJECT - FINANCIAL
856 ← 854

REVIEW PROJECT

PROJECT NAME:   AFRICAN ORPHANAGE
INPUT BY:       EMRICHJ ← 852
INPUT DATE:     6/26/2001 6:23:29 PM

818

TOTAL PROJECT BUDGET:
$0.00 ← 858

FUNDS REQUESTED:
$0.00 ← 860

FUNDING REQUEST PERIOD:
← 862

MATCHING GRANT INFORMATION:
← 864

FISCAL YEAR START DATE:
← 866

TOTAL ANNUAL EXPENSES:
$0.00 ← 868

EXPENSE BREAKDOWN: ← 870

% TO OPERATIONS:   0.00%
% TO PROGRAMS:     0.00%     ← 872
% TO FUND RAISING: 0.00%
                              [ NEXT ]

User: Jeff Emrich    Last Login: 10/26/2001 11:23:37 AM    Logout

Project Assessment System  ← 852    newdea

| Main Menu | My Projects | My Team | Search | Options | Admin Menu | Help |

Review Project

Admin Menu > Manage Projects > Review Projects > Review Project - Classification General Info
Organization
Description
Financial
▸ Classification
Contacts
Media
Evaluation

Review Project

Project Name:  African Orphanage
Input By:      emrichj
Input Date:    6/26/2001 6:23:29 PM

Economic Development:  ← 854

| 0.00% | Agriculture |
| 0.00% | Community Development |
| 0.00% | Financial Services |
| 0.00% | Job Training/Placement |
| 0.00% | Macro Business |
| 0.00% | Micro Business |

Infrastructure Development:  ← 856

| 0.00% | Assessments |
| 0.00% | Conferences |
| 0.00% | Facilities |
| 0.00% | Overhead |
| 0.00% | Research |
| 0.00% | Services |

Social Development:  ← 858

| 0.00% | Continued Education |
| 0.00% | Elderly Care |
| 0.00% | Homeless |
| 0.00% | Housing |
| 0.00% | Hunger Solutions |
| 0.00% | Literacy |
| 0.00% | Medical |
| 0.00% | Orphanages |
| 0.00% | Preschool/Daycare |
| 0.00% | Primary Education |
| 0.00% | Widow Care |
| 0.00% | Womens Ministries |

Spiritual Development:  ← 860

| 0.00% | Bible Translation |

User: Jeff Emrich   Last Login: 10/26/2001 11:23:37 AM   Logout

Project Assessment System                         newdeq

| Main Menu | My Projects | My Team | Search | Options | Admin Menu | Help |

Admin Menu > Manage Projects > Review Projects > Review Project - Contacts

Review Project

- Review Project
  - General Info
  - Organization
  - Description
  - Financial
  - Classification
  - ▸ Contacts
  - Media
  - Evaluation

Review Project

Project Name:   African Orphanage
Input By:       emrichj
Input Date:     6/26/2001 6:23:29 PM Contacts:

There are no contacts for this project.  ← 868

User: Jeff Emrich   Last Login: 10/26/2001 11:23:37 AM   Logout

Project Assessment System   928   newdeq

Main Menu | My Projects | My Team | Search | Options | Admin Menu | Help

Admin Menu > Manage Users > New User Account

New User Account

Personal Information:

- First Name: _____ *
- Middle Initial: _____     ← 930
- Last Name: _____ *
- Home Phone: _____
- Work Phone: _____
- Mobile Phone: _____     ← 932
- Fax: _____
- Email: _____ *

Biography:     934
_____

Login Information:

Please choose a User Id and password.     936

- User Id: _____ * (15 chars max)
- Password: _____ * (15 chars max)
- Re-Type: _____ * (15 chars max)

Administrator? No ▼     ← 938

Fig. 72

User: Jeff Emrich   Last Login: 10/26/2001 11:23:37 AM   Logout

Project Assessment System  904   newdeq

| Main Menu | My Projects | My Team | Search | Options | Admin Menu | Help |

Admin Menu > Manage Users > Edit User Account  — 972

Edit User Account                              Change Password | Delete User
                                                              926

Personal Information:

- User Id: emrichj
- First Name: John •  ← 906
- Middle Initial: [ ]
- Last Name: Doe •
- Home Phone: 123-456-5555   ← 908
- Work Phone: [ ]
- Mobile Phone: [ ]
- Fax: [ ]
- Email: john@yahoo.com •  ← 910

Biography:  912

[ text box ]

- Administrator? No — 914
- Team Manager? Yes — 916
- Reports to Team Mgr: Choose a Team Manager — 918

[button] — 924

PHILANTHROPY MANAGEMENT APPARATUS, SYSTEM, AND METHODS OF USE AND DOING BUSINESS

PRIORITY STATEMENT

The present application is a divisional of U.S. patent application Ser. No. 10/290,556, filed Nov. 8, 2002, which claims priority to U.S. Provisional Application No. 60/345,361, filed Nov. 8, 2001. The contents of both of these applications are incorporated herein by reference.

FIELD OF INVENTION

The present invention relates to apparatus, systems, and methods for managing and/or assessing philanthropic donations, resources, and projects.

GENERAL BACKGROUND

Philanthropy has been essential to advancement of society and betterment of the human condition for hundreds of years. Many of the very finest educational, health care, and religious institutions and activities have long been the direct result of philanthropic donations and activities. The resulting institutions, services, and products not only often fulfill substantial voids that have not been, and often cannot be met, by government, but also expand the range of options and competitive alternatives to institutions, services, and products provided by the government and non-philanthropic private activities and entities. The net result is not only a more efficient allocation of resources in the market and society as a whole, but also substantial increases in the quality of societal morals, education, human interaction, spiritual accomplishment, and life all across society.

As the industrial and other economies have evolved over the past one hundred years and more, individuals and institutions in them have developed enormous amounts of capital that they often seek to allocate and donate toward philanthropic donations and other activities. The effort involved, however, in actually making and managing donations on behalf the philanthropists or philanthropic institutions owning or controlling the capital is often a sizable, costly, and time consuming challenge.

Typically, those individuals or entities with particularly large funds or other resources for philanthropic activities set up their own foundations to identify charitable projects and manage their philanthropic donations. Each foundation then typically conducts investigations into the large number of potential recipients, such as charities, educational institutions, and religious entities, to determine those who will receive donations from the foundation. The foundation often also conducts its own oversight and management depending on the nature of the donation and the level of interest of the donors in ensuring proper use of the donated funds. Typically, each philanthropic foundation must itself conduct these types of activities, and set up attendant customized management and accounting systems and functions, at substantial expense to the philanthropic foundations and those who fund them. This substantial effort and expense can delay and consume resources that would otherwise be available for actual philanthropic or other uses. It also reduces the ability of potential donors to learn of all the potential philanthropic projects in which the donors might be interested in funding.

For those individuals or entities seeking to engage in philanthropic activities without use of a foundation, the challenges are often even greater. In the applicants' view, this problem greatly reduces both the quantity and the quality of philanthropic activities.

Nevertheless, the amount of funds available for philanthropic use has been growing rapidly over the past few decades in particular. The applicants have recognized these problems and their likely adverse consequences for those who would engage in philanthropic activities as well as for those who would benefit from them.

SUMMARY

The applicants have invented apparatus, systems, and methods for managing and/or assessing philanthropic activities having a variety of different aspects. In one aspect, the invention preferably provides a system and method for managing or reporting the status and needs of one or more charitable or philanthropic projects and, most preferably, portfolios of such projects.

The system preferably provides access to information about potential projects and organizations seeking charitable funding. Most preferably, the system also provides searching capability for searching potential projects and organizations and reporting those that meet the search criteria.

In another aspect, the invention may preferably provide a system for assessing or qualifying philanthropic projects and organizations according to one or more criteria. Most preferably, the qualified projects and organizations are then searchable or otherwise accessible to users through other management and/or reporting functions in the system. The qualified projects and organizations are preferably also accessible through the managing and reporting system.

Most preferably, the system provides philanthropic fund qualification, transfer, deposit, and/or reporting functionality.

In another aspect, the invention may preferably provide a system that makes philanthropic project management, reporting, and/or assessment activities more efficient, thorough, economical, and/or widely available to users.

Most preferably, the system is readily and widely available to philanthropic donors, managers, and consultants by remote access, including through the Internet or private or virtual private networks or combinations thereof.

In a particularly preferred embodiment, one or aspects of the invented system or method can provide revenue generation for an entity for providing access to or use of the one or more aspects. In this fashion, a business (or method) may most preferably help fund the development, deployment, and/or use of or access to the one or more aspects.

Most preferably, such a business (and method) can not only possibly expand philanthropic activities but also provide additional incentives and opportunities to further improve and expand philanthropic activities and projects in the future.

It can thus be seen that there are many aspects of the present invention, including particular additional or alternative features that will become apparent as this specification proceeds. It is therefore understood that the scope of the invention is to be determined by the claims and not by whether the claimed subject matter solves any particular problem or all of them, provide any particular features or all of them, or meet any particular objective or group of objectives set forth in the General Background or Brief Summary above.

BRIEF DESCRIPTION OF THE DRAWINGS

The preferred embodiments of the present invention are shown in the accompanying drawings in which:

FIG. 14 is a screen shot of the upper portion of the "new client menu" browser page provided by the "managing clients" procedure of FIG. 4;

FIG. 24 is a screen shot of the "new team member" browser page provided by the "team member" procedure of FIG. 5;

FIG. 30 is a screen shot of the "browse all projects" browser page of the "find projects" procedure of FIG. 7;

FIG. 32 is a screen shot of the "give to a project/organization" browser page of the "fund project" procedure of FIGS. 7 and 10;

FIG. 34 is a screen shot of the "edit personal info" browser page of the "user options" procedure of FIG. 8;

FIG. 49 is a screen shot of the upper portion of the "new project" browser page for the "my projects" procedure of FIG. 37;

FIG. 50 is a screen shot of the lower portion of the "new project" browser page of FIG. 49;

FIG. 51 is a screen shot of the upper portion of the "edit project (general)" browser page of the "edit existing project" procedure of FIG. 38;

FIG. 52 is a screen shot of the lower portion of the "edit project (general)" browser page of FIG. 51;

FIG. 54 is a screen shot of the "edit project (description)" browser page of the "edit existing project" procedure of FIG. 38;

FIG. 55 is a screen shot of the upper portion of the "edit project (financial)" browser page of the "edit existing project" procedure of FIG. 38;

FIG. 60 is a screen shot of the "review project—general info" browser page of the "review projects" procedure of FIG. 45;

FIG. 61 is a screen shot of the "review project—description" browser page of the "review projects" procedure of FIG. 45;

FIG. 62 is a screen shot of the "review projects—financial" browser page of the "review projects" procedure of FIG. 45;

FIG. 63 is a screen shot of upper portion of the "review project—classification" browser page of the "review projects" procedure of FIG. 45;

FIG. 65 is a screen shot of the "review project—contacts" browser page of the "review projects" procedure of FIG. 45;

Figure 67:
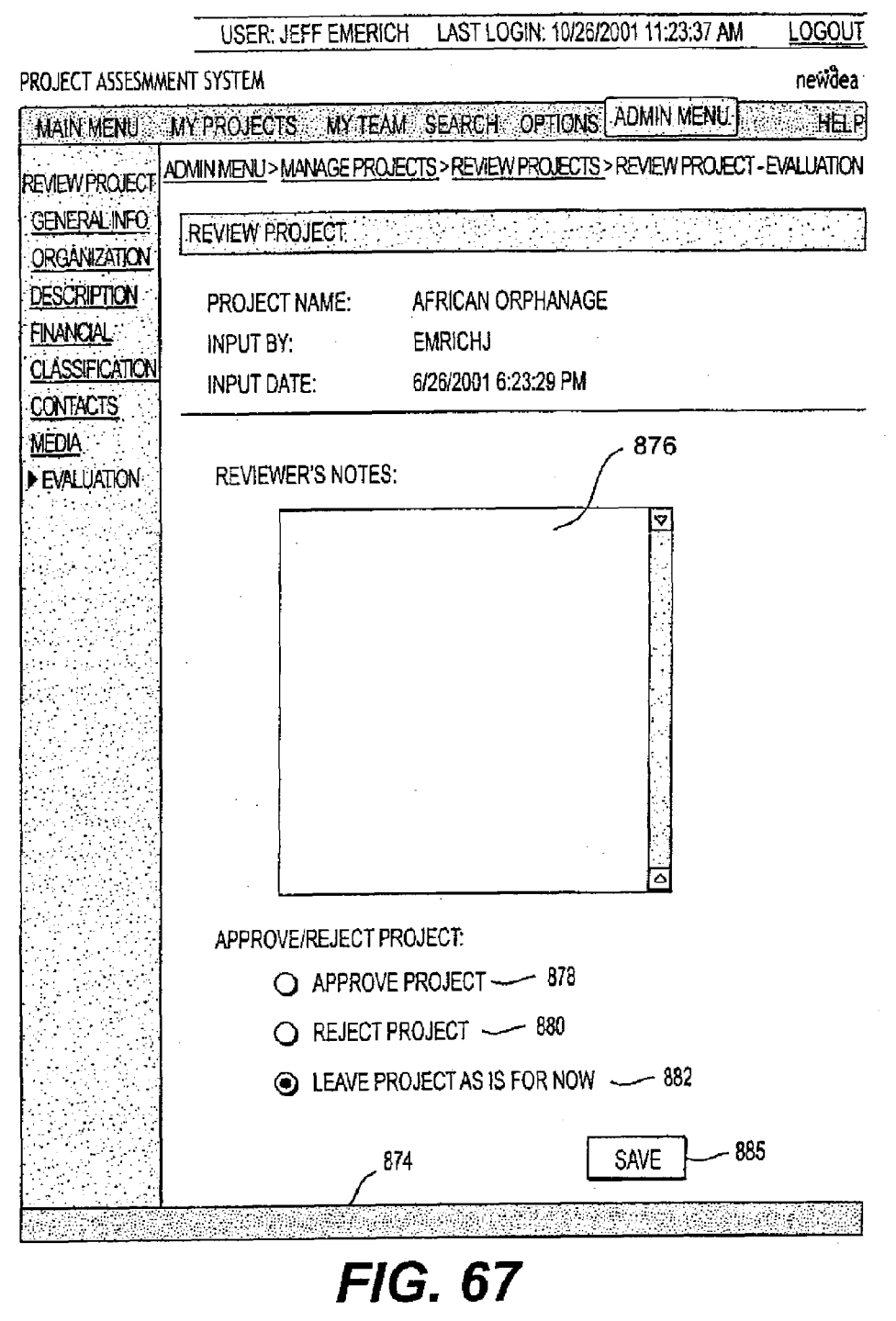

FIG. 67 is a screen shot of the "review project—evaluation" browser page of the "review projects" procedure of FIG. 45;

FIG. 69 is a screen shot of the upper portion of the "new user account" browser page of the "manage users" procedure of FIG. 43;

FIG. 71 is a screen shot of the "change user password" browser page of the "manage users" procedure of FIG. 43.

DETAILED DESCRIPTION OF THE PREFERRED EMBODIMENTS

The preferred embodiment of the present invention is shown in the accompanying drawings. It is to be understood, however, that the present invention is not limited to the preferred embodiments and can be implemented in numerous ways with varying features.

Figure 1:
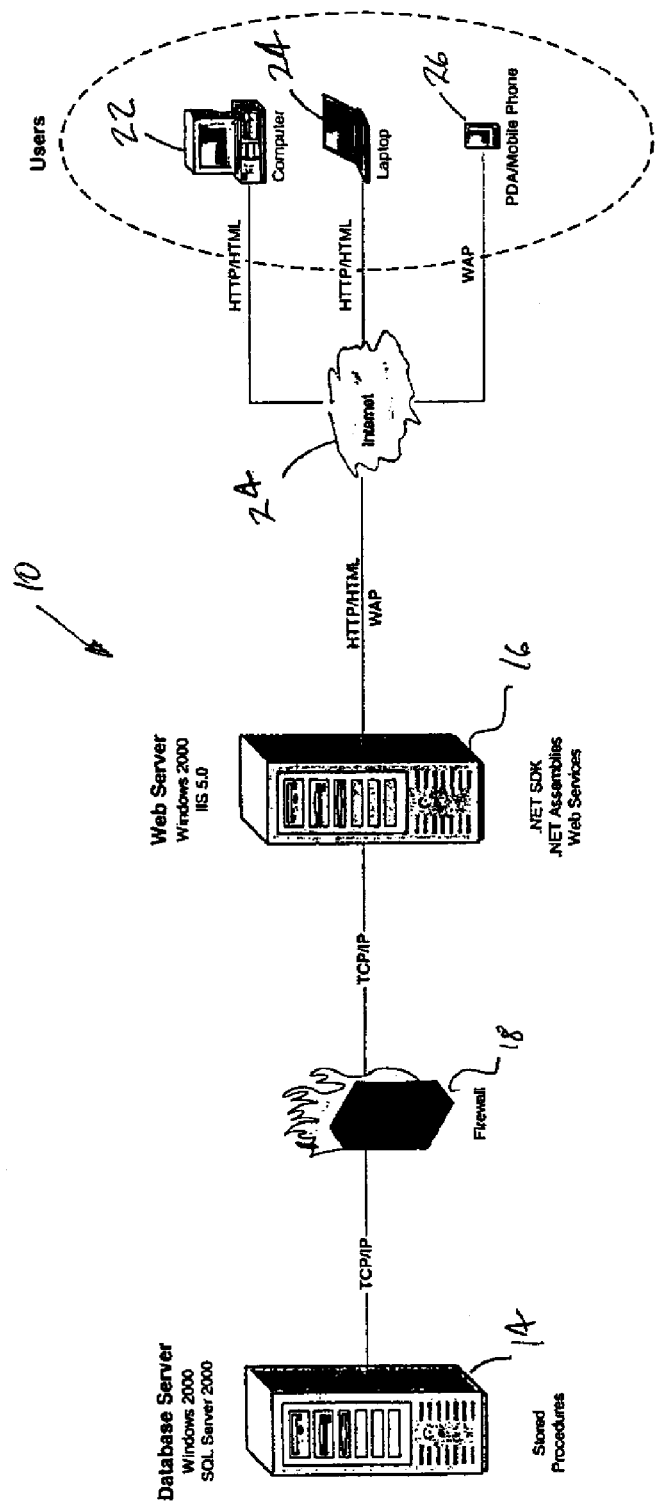
FIG. 1 is a schematic of a network architecture for a web-accessible version of the philanthropy management system.
Figure 2:
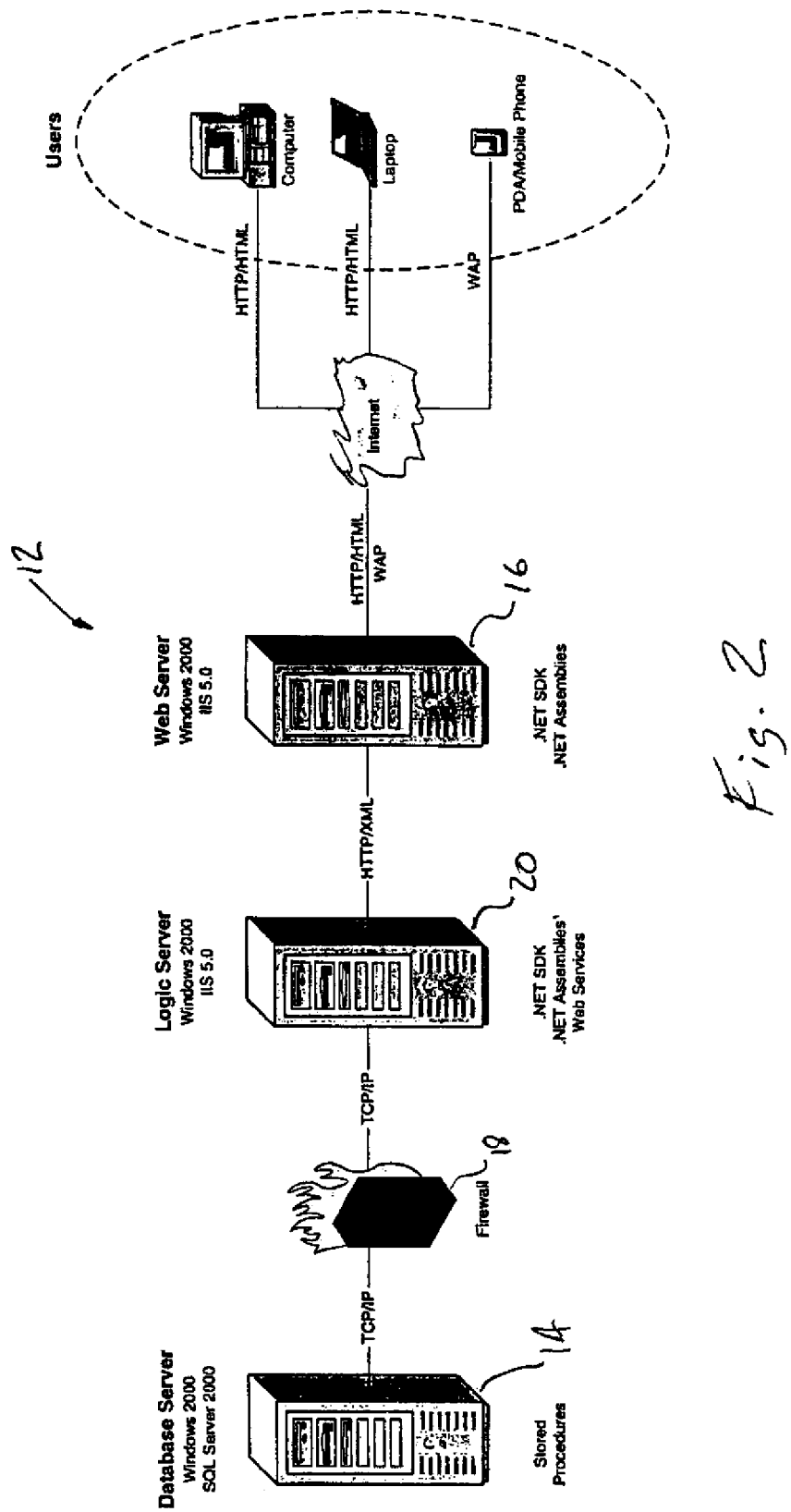
FIG. 2 is a schematic of an alternative network architecture for a web-accessible version of the preferred philanthropy management system.

For example, FIG. 1 shows one preferred PC-based system architecture, generally 10, for a web-based version of the preferred philanthropy systems and methods. FIG. 2 shows an alternative PC-based architecture, generally 12, to accomplish the same objects, but obviously the present systems and methods also may run on different architectures, such as LAN, WAN, Stand-alone PC, stand-alone, clustered, or networked mini or mainframe computers, etc. This is only one of many instances in which the invention, even as shown only in FIG. 1, is certainly not limited to the preferred embodiment of the invention. Again, the following disclosure is of the preferred embodiments, but not the only embodiments.

In the preferred embodiment, a philanthropy support business preferably provides a philanthropy management web-site that can be accessed by philanthropists, their philanthropic foundations, assistants, counselors, and consultants, and by entities seeking philanthropic resources, such as donations from philanthropists. The web-site provides access to two systems. One is a browser-based charitable portfolio management system, shown in FIGS. 3-35, and the other is a browser-based charitable project assessment system, shown in FIGS. 36-72.

Figure 3:
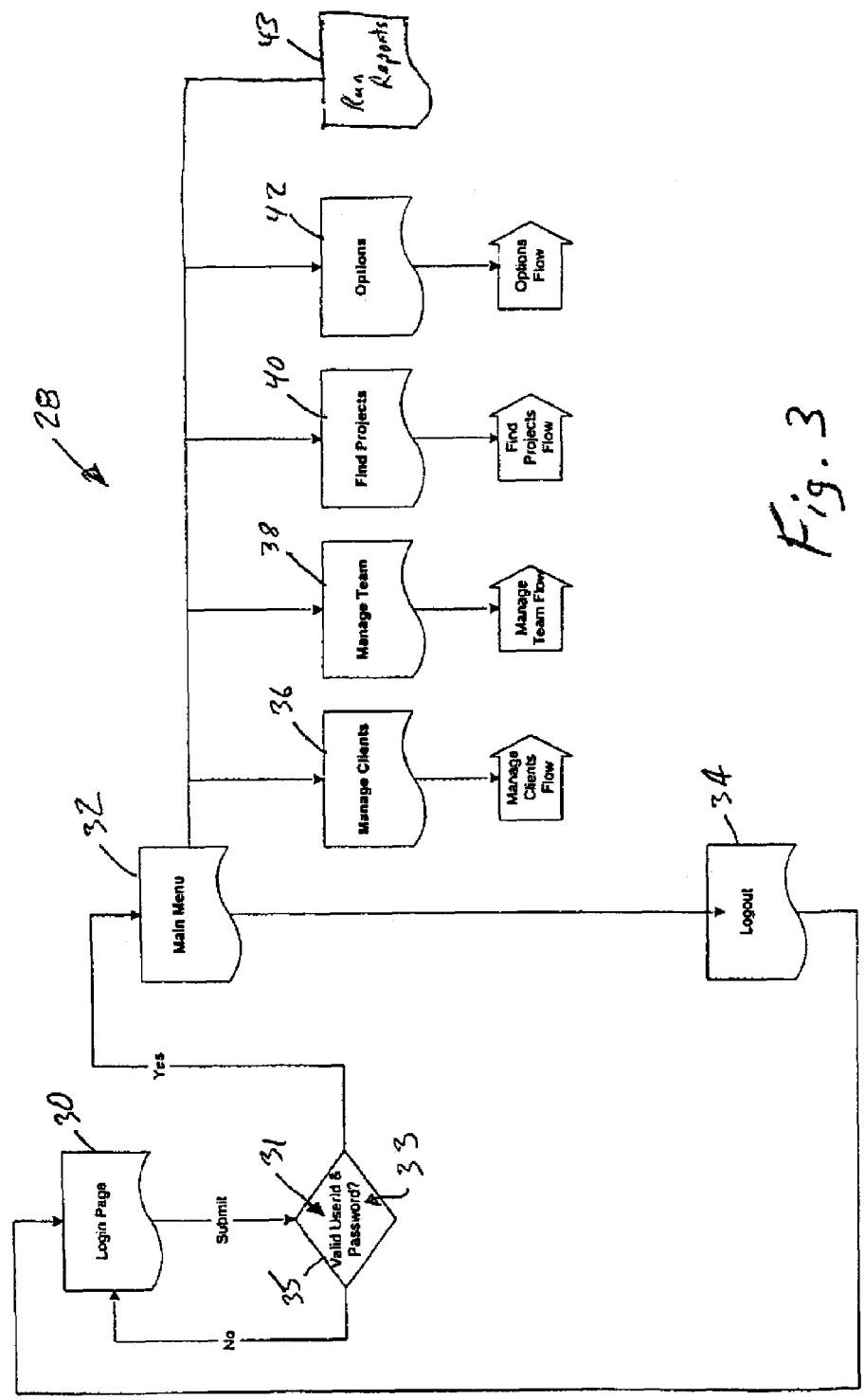
FIG. 3 is a flow chart for the "login" and "main menu" procedure in the portfolio management portion of the preferred philanthropy management system.
Figure 72:
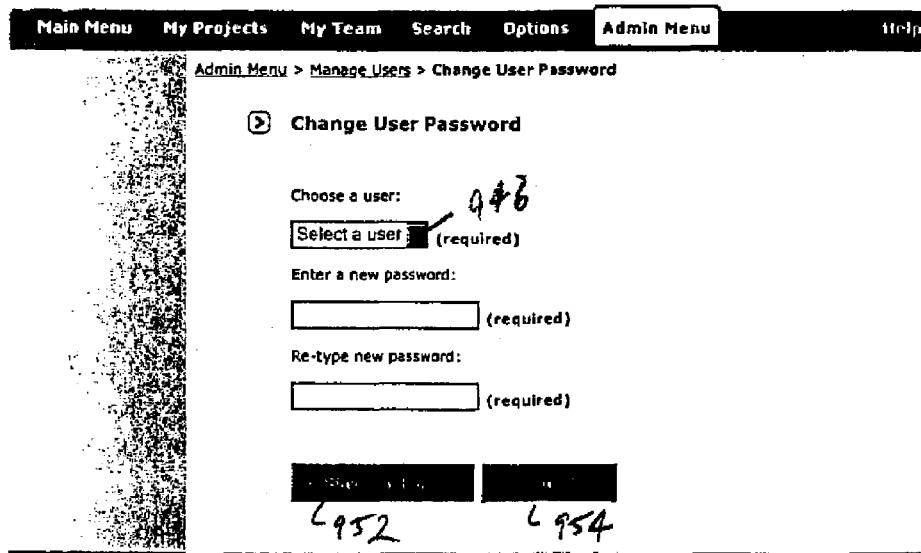
FIG. 72 is a screen shot of the "edit user account" browser page of the "manage users" procedure of FIG. 43.

With reference now to FIG. 1, the philanthropy management web-site and related systems shown in FIGS. 3-72 are hosted on at least two primary computers 14, 16. One primary computer, the web server 16, runs Windows 2000 Server SP2 and Internet Information Server 5.0. (Version numbers throughout this application were current at the time of original filing of this application, but it is contemplated that the present systems will be upgraded over time to keep them current and more readily maintainable.) The other primary computer, the SQL database server 14, runs Windows 2000 Server SP2 and SQL Server 2000 database procedure.

Preferably, a firewall system 18 is located between the web sewer 16 and SQL database server 14 in order to protect the database server from entities that access the web server 16 and general Internet traffic. The firewall system 18 is configured to allow only connections from the designated web server 16 and conventional administrative computing consoles (not shown).

With reference now to FIG. 2, a third logic server system 20 can be placed between the web server 16 and firewall system 18 to communicate through the firewall 18 with the SQL database server 13. The logic server hosts web services and components as needed, in order to reduce processing load on the web server 16 and database server 14. In order to support load balancing as network traffic demands, the web server 16 can be supplemented by yet additional web servers (not shown) arranged in a "web farm" or "cluster" configuration. The same strategy may be employed on the database server 14 side of the overall system 10 for load balancing of the database server functions.

All servers 14, 16, 20 communicate with each other through HTTP and TCP/IP protocols. Preferably, the servers 14, 16, 20 pass information as XML as much as possible.

With reference to both FIGS. 1 and 2, client computers of various types, e.g., 22, 24, may connect to the web server 16 and any supporting web farm web servers (not shown) via the public Internet 24 through HTTP and TCP/IP protocols. Also, PDA's (personal desktop assistant computers) and mobile phone computing devices, generally 26, can connect to a special version of web pages specifically designed for smaller screens over the WAP (wireless access protocol).

Figure 11:
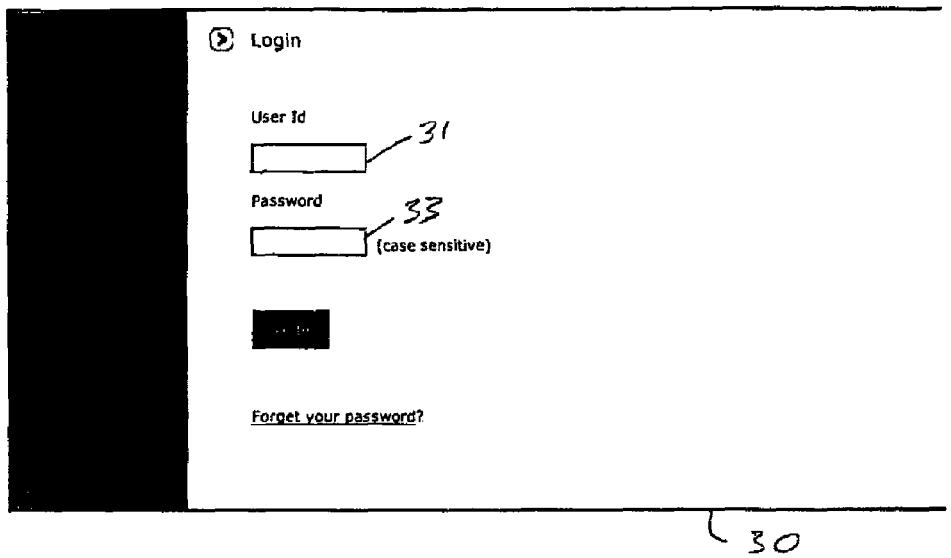
FIG. 11 is a screen shot of the "login" web, or browser, page provided by the "login" procedure of FIG. 3.

With reference now to FIGS. 3 and 11, the charitable portfolio management system provides a login and main menu procedure, generally 28, that provides a user login browser page or screen 30. Through the login screen 30, a remote or other user, e.g., 22, 24, or 26, can enter a prearranged user name or i.d. 31 and password 33 in order to gain access to the charitable portfolio management system.

Figure 12:
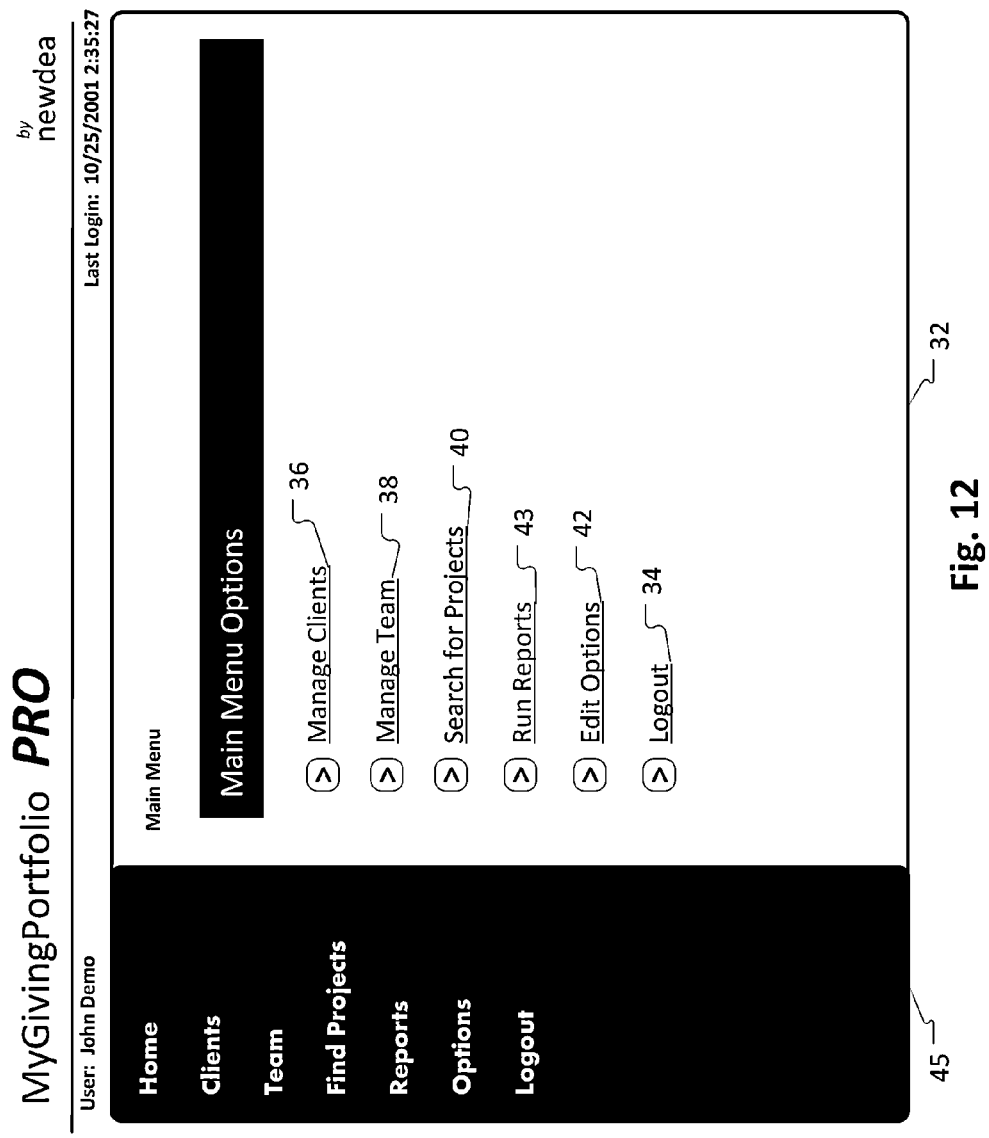
FIG. 12 is a screen shot of "main menu" browser page provided by "main menu" procedure of FIG. 3.
Figure 13:
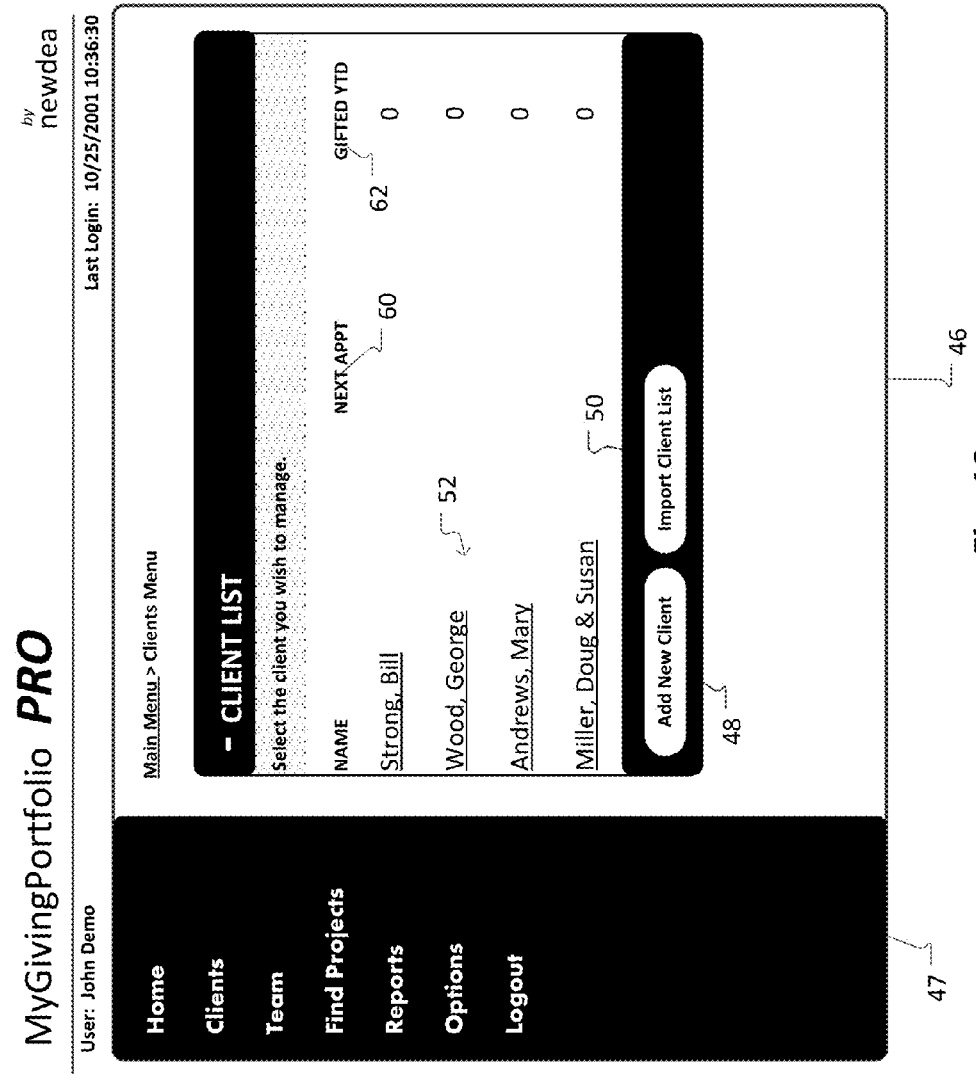
FIG. 13 is a screen shot of the "client menu" browser page provided by "managing clients" procedure of FIG. 4.

With reference now to FIGS. 3 and 12, once the password has been entered and validated 35, the user is presented with a main menu browser page 32. The main menu screen 32 includes with the choice of clicking on logout web page button 34, a manage clients button 36, a manage team button 38, a find projects button 40, an options button 42, and a reports button 43. The main menu page 32 also includes a second listing and set of these same options (the "main menu options") vertically on the left side 45 of the main menu page 32.

If the user clicks on the logout button 34, then, as shown in FIGS. 3 and 11, the main menu procedure 28 presents the user with the login web page 30.

With reference now to FIGS. 3 and 12, when the user clicks on the manage clients button 36, the manage clients procedure 44 presents the user with the manage clients, also called "clients menu" browser page, generally 46. The clients menu page 46 provides the user with choice of clicking on a new client button 48, an import client list button 50, or a client name, generally 52 (which calls up the edit existing client web page 53 of FIG. 4). The clients menu browser page 46 also provides the user the option of deleting a client 54 by right clicking on a client name and clicking on a pop-up delete query (not shown) and then confirming the intent to delete by hitting the enter key 58. The client menu browser page 46 also automatically presents the next appointment date for each client 52 and the amount the client has gifted (i.e., donated) year to date 62. The client menu browser page 46 also presents the main menu options vertically on the left side 47 of the main menu browser page 46.

Figure 4:
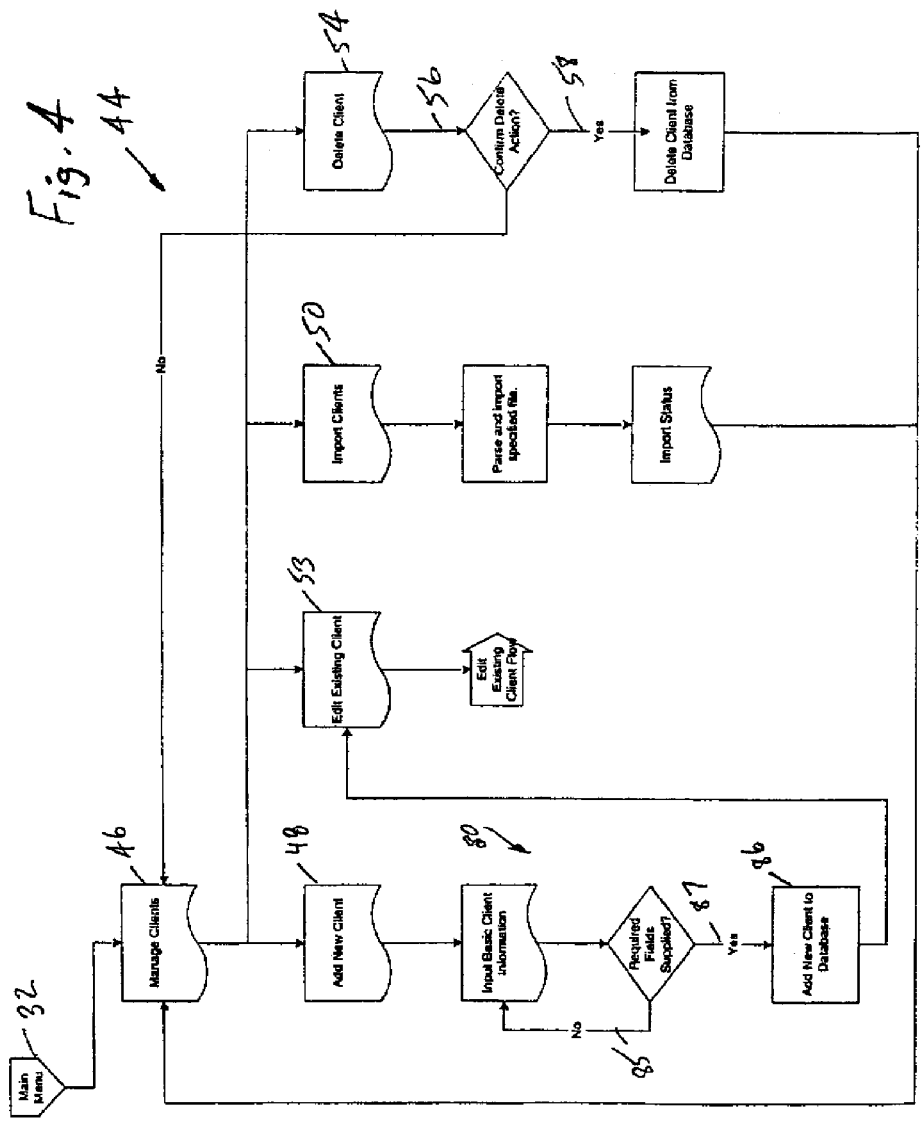
FIG. 4 is a flow chart of the "managing clients" procedure in the portfolio management portion of the philanthropy management system.
Figure 15:
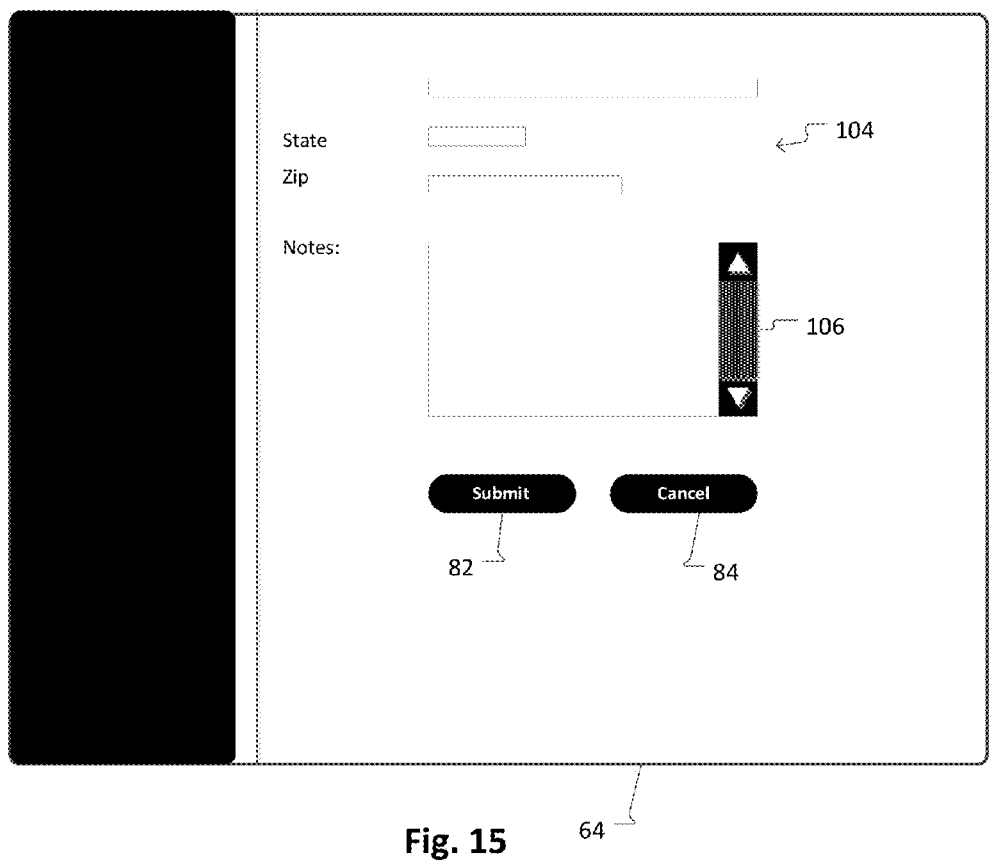
FIG. 15 is a screen shot of the lower portion of the "new client menu" browser page of FIG. 14.

With reference now to FIGS. 4, 14, and 15, if the user clicks on the add new client button 48 in the clients menu page 46, the manage clients procedure 44 presents the user with a new clients browser page 64. The new clients browser page 64, and manage clients procedure 44, provides the user with the option of clicking on a cancel button 84 to cancel the procedure and return to the preceding clients menu browser page 46 described above. The new clients browser page 46 also presents the main menu options on the left side 89 of the new clients browser page 64.

In order to enter a new client into the system, the manage clients procedure 44 requires that the user must enter certain minimum client data 80—at least a first name 66, last name 68, home phone number 70, street 1 address 72, city 74, state 76, and zip code 78 for the new client—prior to clicking on the submit button 82. The manage clients procedure 44 cycles the user back 85 to the new client browser page 64 if the user hits the submit button 82 without including at least this required information.

Figure 5:
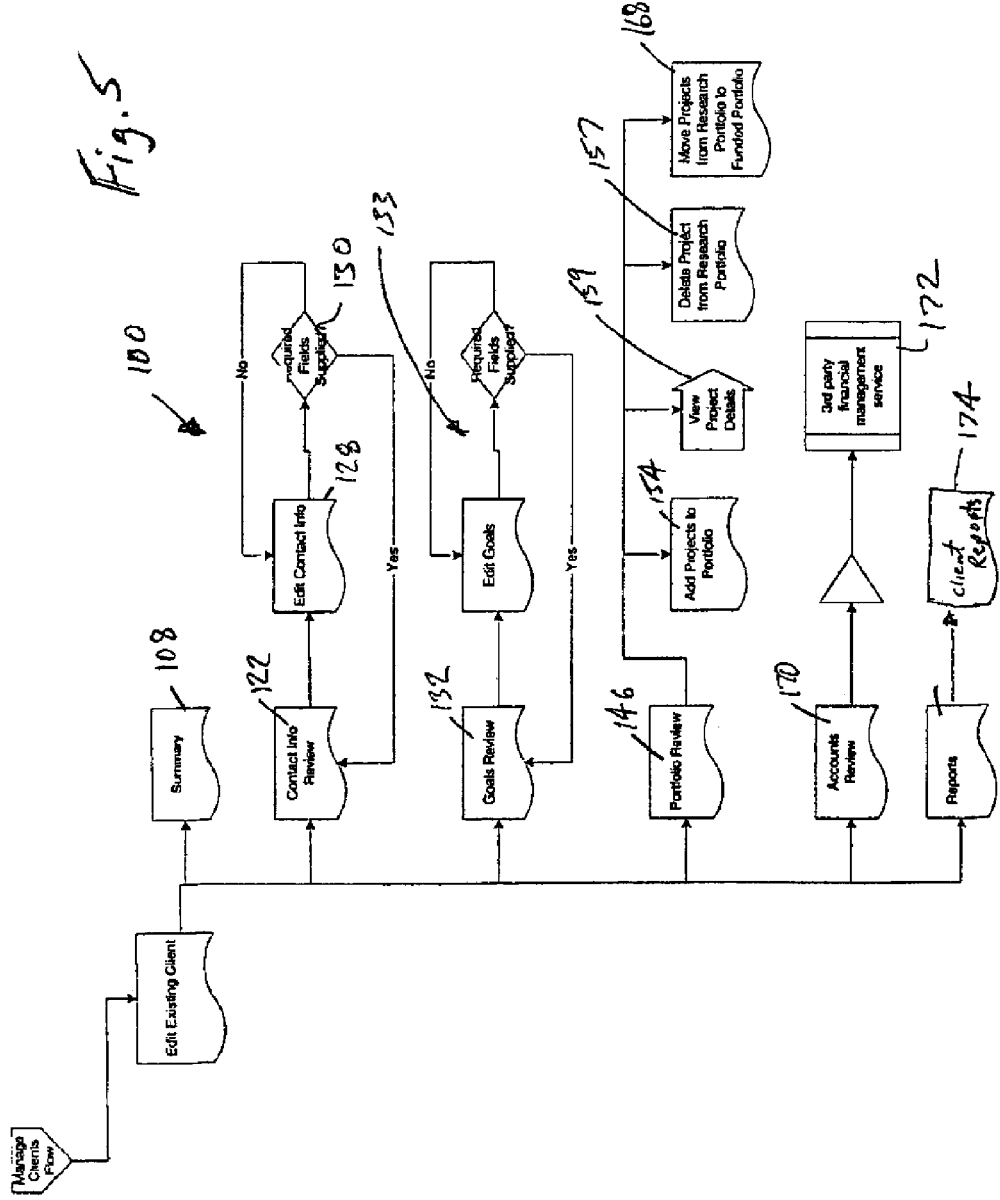
FIG. 5 is a flow chart of the "edit existing client" procedure in the portfolio management portion of the philanthropy management system.
Figure 16:
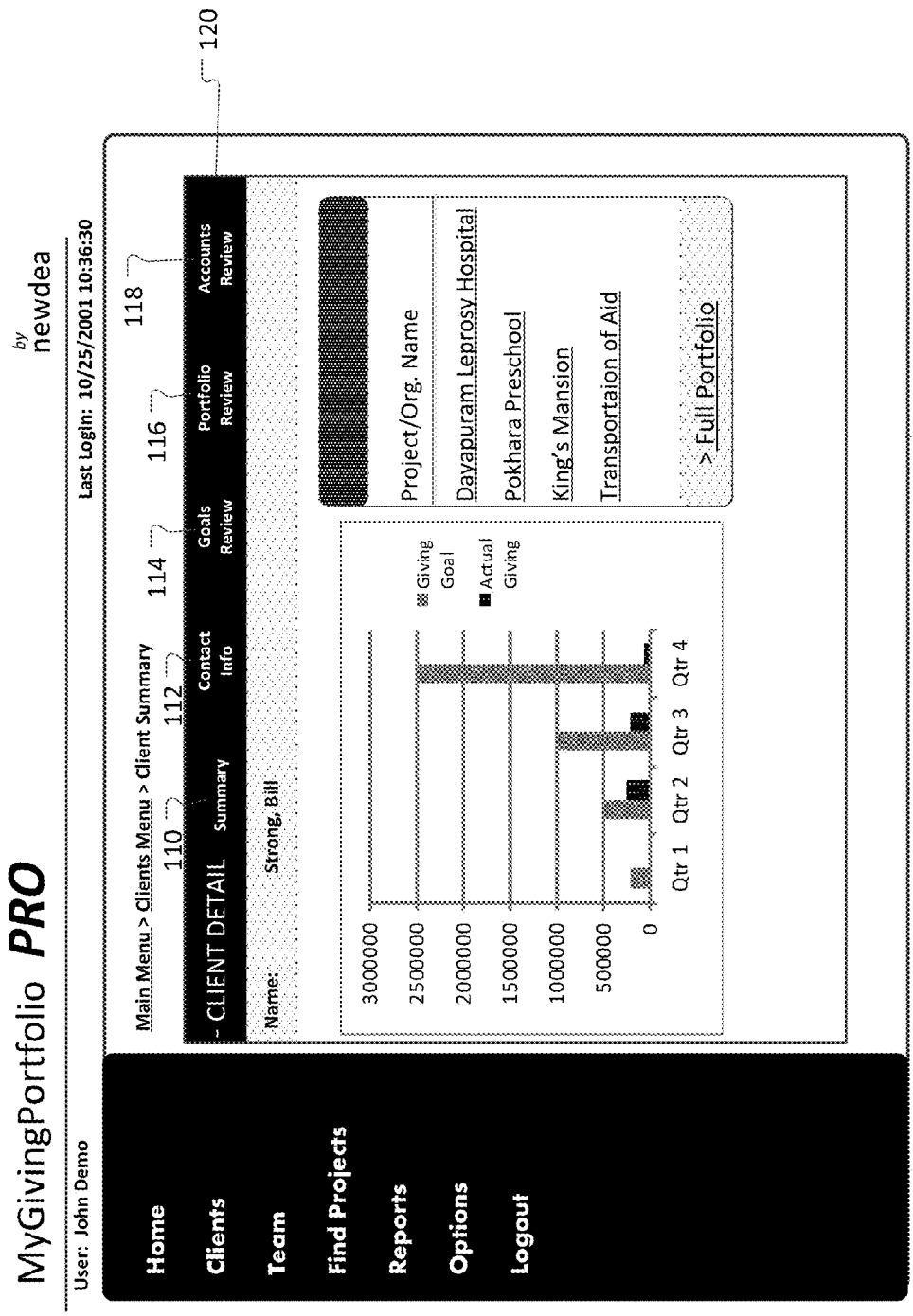
FIG. 16 is a screen shot of the "client summary" browser page provided by the "edit existing clients" procedure of FIG. 5.

If this required information is entered 87, the manage clients procedure 44 adds this information to the SQL database 86 running on the SQL database server 14 in FIG. 2 (or 3). In that event, if additional information also has been entered (such as the new client's middle initial 90, work phone 92, mobile phone 94, fax phone 96, e-mail address 98, e-mail format 100, street 2 address 102, work address 104, or notes 106, this additional information. to the extent entered by the user, is also stored in the SQL database. Upon entry of new client information into the SQL database, the edit existing client procedure commences and presents the user, as shown in FIGS. 5 and 16, with client summary browser page 108 for the newly added client. Unlike the screen shown in FIG. 16, however, upon entry of a new client into the database, at first there will not be any data shown for the particular newly added client, as it will not yet have been entered into the database for depiction on the client summary browser page 108.

Note, however, that, as data is entered into the database for the client as further shown and described below, the edit existing clients procedure automatically retrieves from the SQL database data for depiction of the client summary browser page 108 when accessed by the user in connection with a particular client also as further shown and described below. That automatically retrieved and depicted data on the client summary browser page 108 includes a chart of the client's actual giving and goals for giving through the year as well as a listing of the projects and organizations to which the client has donated.

The client summary browser page 108 also includes the main menu options on its left side 110. In addition, the client summary page 108 provides the user with the option of clicking on horizontally aligned file-like buttons for the summary page 110, the contact info page 112, the goals review page 114, the portfolio review page 116, the accounts review page 118, and the reports menu 120 (the "horizontal client data buttons"). The user may click on these buttons to activate associated procedures, described below, in any order desired by the user.

Figure 17:
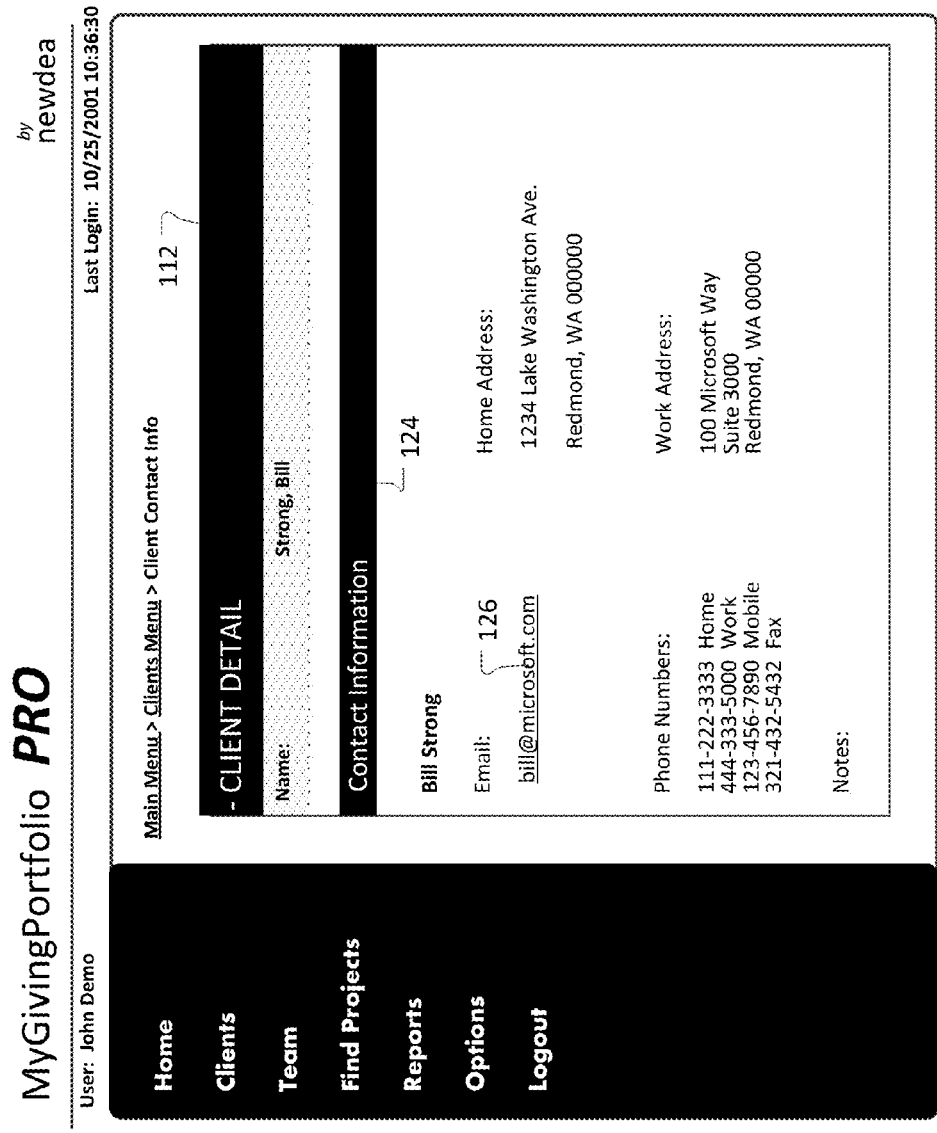
FIG. 17 is a screen shot of the "client contact info" browser page provided by the "edit existing clients" procedure of FIG. 5.

When the user clicks on the contact info page 112, the edit existing client procedure 100 presents, as shown in FIGS. 5 and 17, the client contact info browser page 122. The client contact info page 122 presents the data previously entered for the client into the database. The client contact info page 122 also includes the horizontal client data buttons and the main menu options on the left side of the client contact info page 122.

If the user clicks on the contact information bar 124 the user can then edit that data in a client contact info browser page 128 similar to that show for the new client page (64 in FIG. 14). The user can then revise the client data in the client contact info browser page and save data, if the required fields are included 130, in a fashion similar to that described above for the new client page. Upon completion of the entry of revised data for the client, the edit existing client procedure 100 presents the user with the client contact info page 122.

Figure 18:
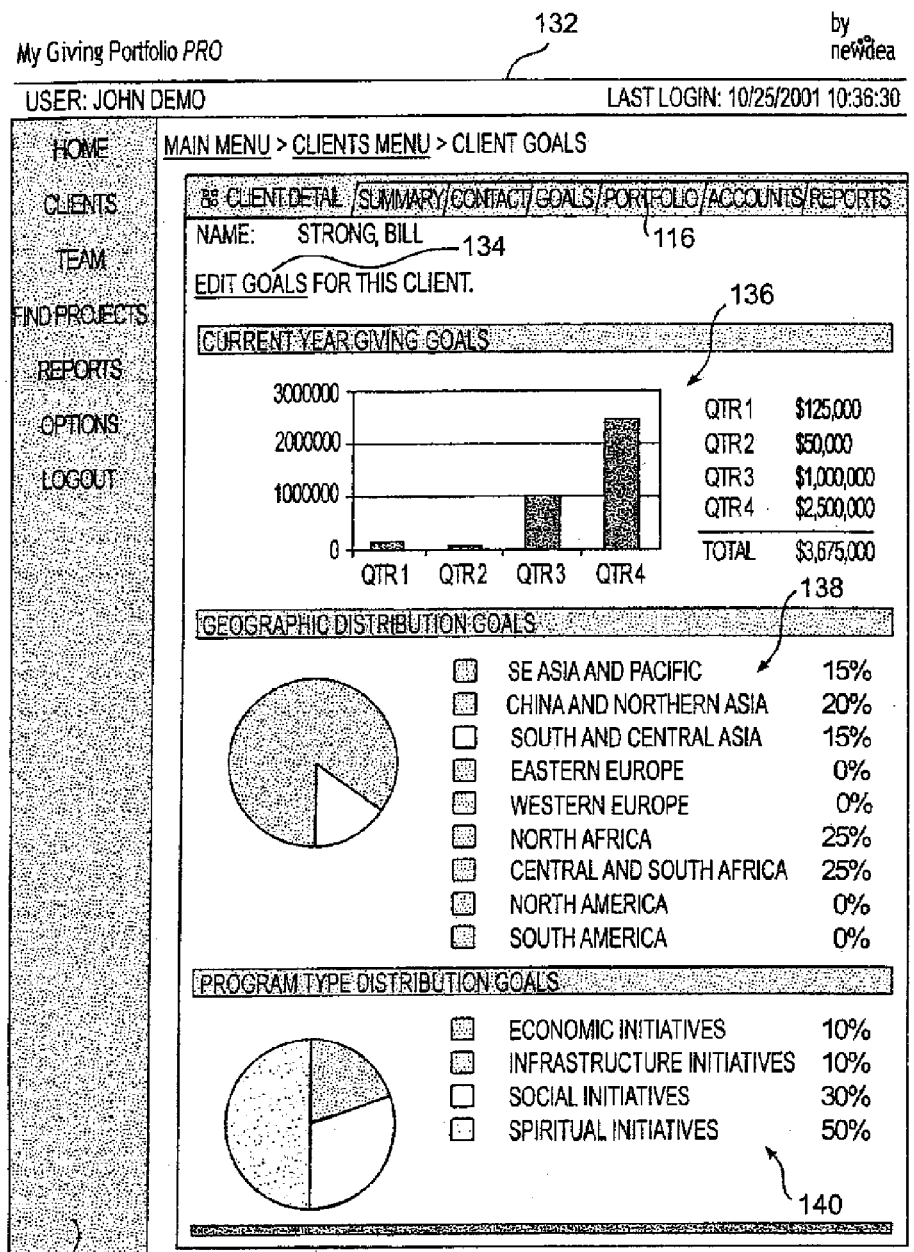
FIG. 18 is a screen shot of the upper portion of the "client goals" browser page provided by the "edit existing clients" procedure of FIG. 5.
Figure 19:
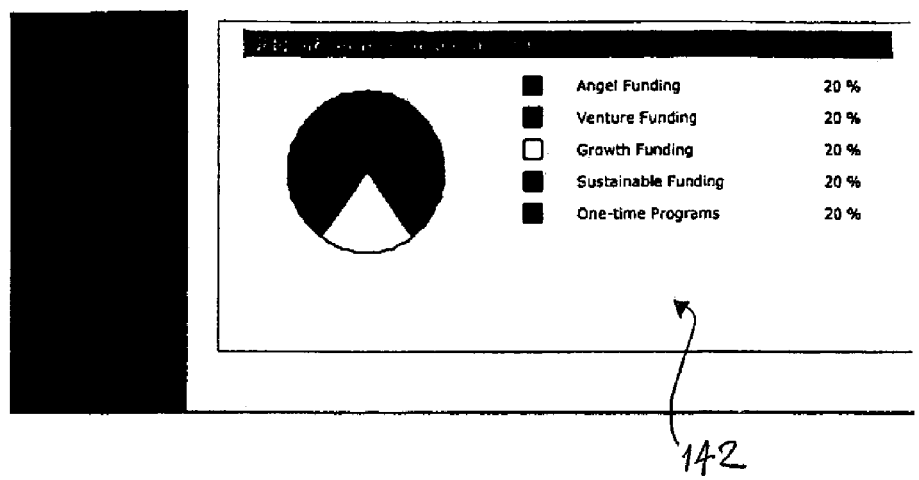
FIG. 19 is a screen shot of the lower portion of the "client goals" browser page of FIG. 18.

The user may then, if it desires, click on the goals review button 112, in response to which the edit existing client procedure 100 presents the user with the client goals browser page 132 as shown in FIG. 18. The user may then click on the "edit goals" section 134 of the page 132, and in response, the edit existing client procedure 100 presents the user with an edit goals browser page (not shown). Through this edit goals page, the user may enter and save client goal data, generally 133, in the SQL database as described above for the client contact information. Upon entry of the goals data for the client in this manner, the user is returned to the client goals browser page 132. This page 132 depicts a bar graph and quarterly statement of current year giving goals, generally 136, pie chart and listing of geographic distribution giving goals for the year, generally 138, pie chart and listing of program type distribution goals for the year, generally, 140, and as shown in FIG. 19, pie chart and listing of stage of growth distribution goals for the year, generally 142.

Figure 20:
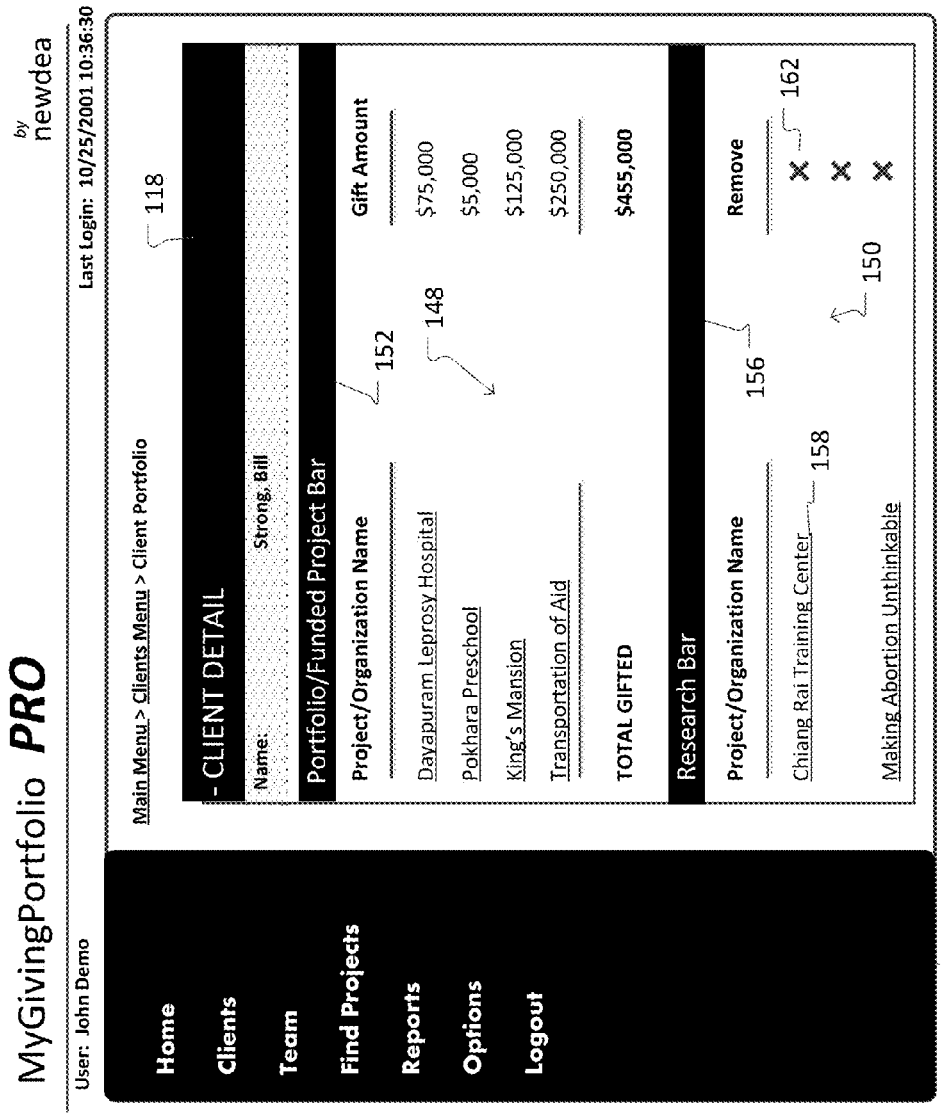
FIG. 20 is a screen shot of the "client portfolio" browser page provided by the "edit existing clients" procedure of FIG. 4.

With reference now to FIGS. 5 and 18, the client goals page 132 includes the horizontal client data buttons and, also, the main menu options on the left side 139 of the client goals page 132. The user may then, if it desires, click on the portfolio review button 116. In response, the edit existing client procedure 100 presents the user with, as shown in FIGS. 5 and 20, the client portfolio browser page 146.

Figure 9:
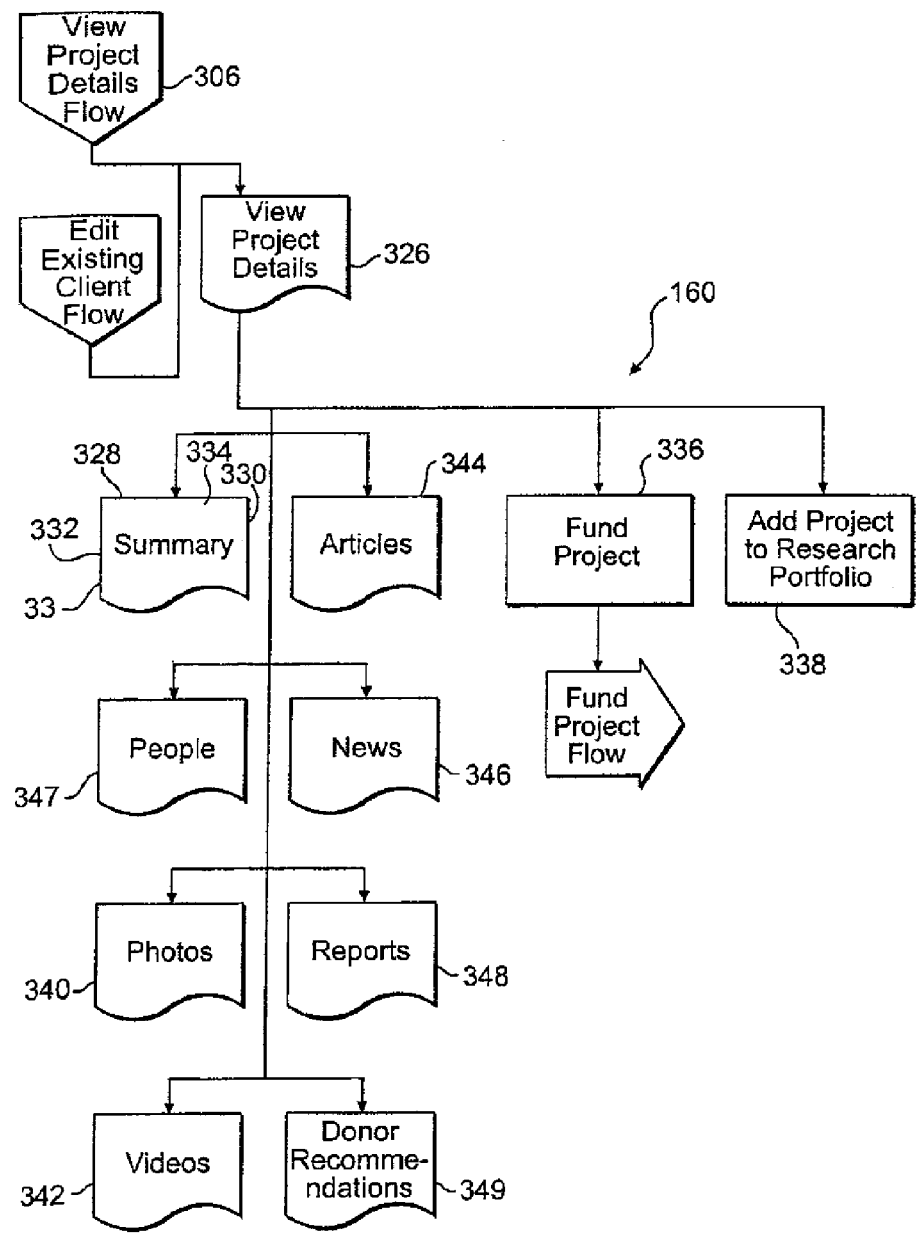
FIG. 9 is the "view project details" procedure in the portfolio management portion of the philanthropy management system.

The client portfolio page 146 has a funded projects list section 148 and a potential project list section 150. The user may click on a portfolio/funded project bar 152 or research bar 156, and in response, the edit existing client procedure 100 provides the user with an add projects to portfolio browser page 154 and associated procedures for adding and saving project data as described above for other data entry and saving functions. The user may also click on any listed project, e.g., 158, and in response, the edit existing client procedure 100 calls 159, as shown in FIG. 9, the view project details procedure, generally 160.

Referring back to FIGS. 5 and 20, the user may click on a remove label, e.g., 162, adjacent a listed research project, e.g., 158, in the research section 150. In response, a delete project procedure 157 deletes the adjacent project, e.g., 158, from the page 146.

In addition, the user may right click on a listed research project, e.g., 158. In response, a move projects procedure 168 moves the selected research project 158 into the portfolio projects list section 148 of the client portfolio page 146.

Figure 21:
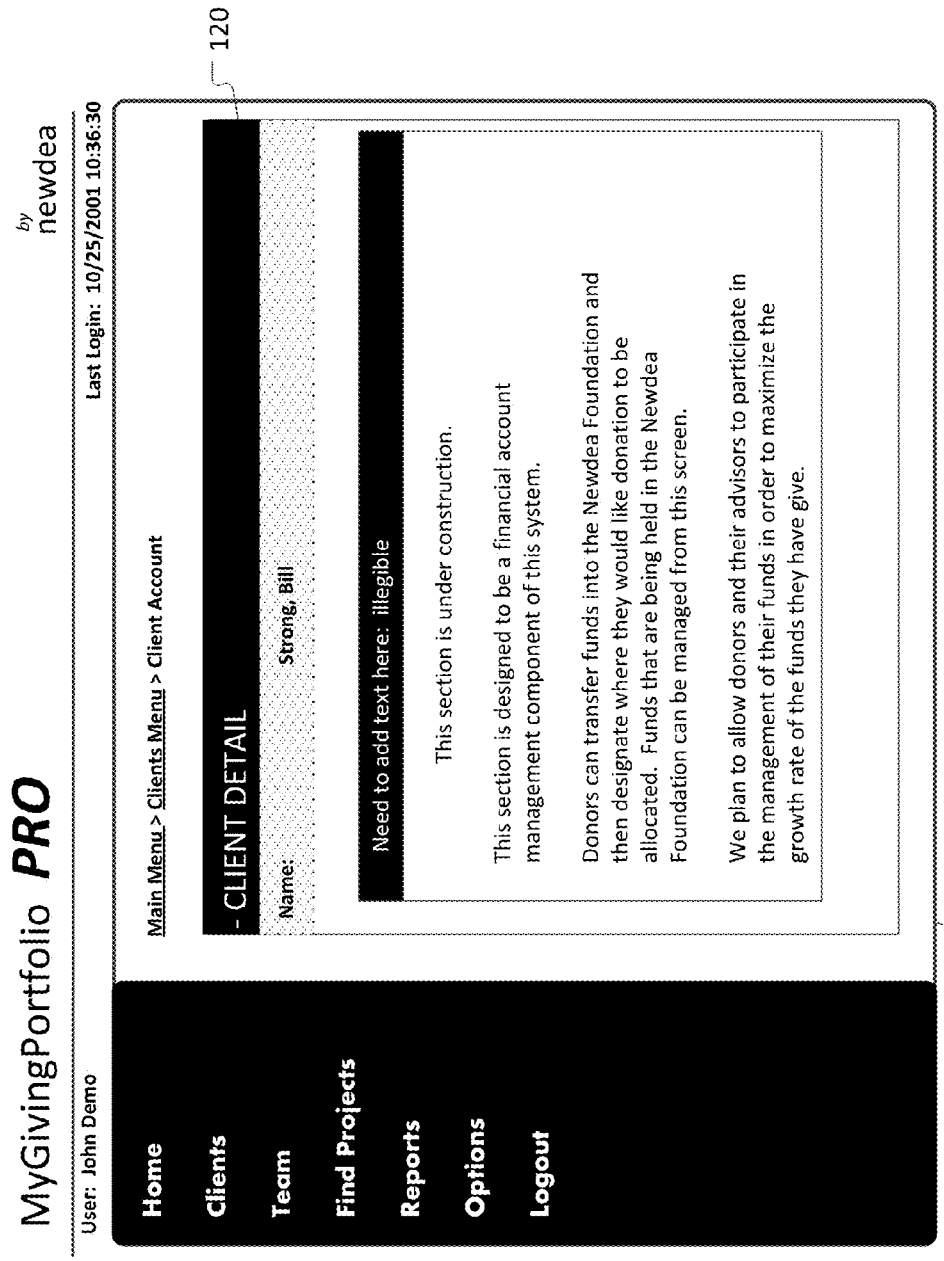
FIG. 21 is a screen shot of the "client account" browser page provided by the "edit existing clients" procedure of FIG. 4.

The user may, if it desires, click on the accounts review button 118. In response, and as shown in FIGS. 5 and 21, the edit existing client procedure 100 presents the user with an accounts review browser page 110. The accounts review page 170 provides the user with funds management functions. These functions include transfer of funds from a third party financial entity into a third party foundation funds management service 172 associated with the business or entity providing the present philanthropy management system and services. Once the funds are received by the foundation funds management service as shown on this page 170, the funds can be managed from this page 170 in order to, for example, try to maximize the growth of the funds transferred into the foundation funds management service.

Figure 22:
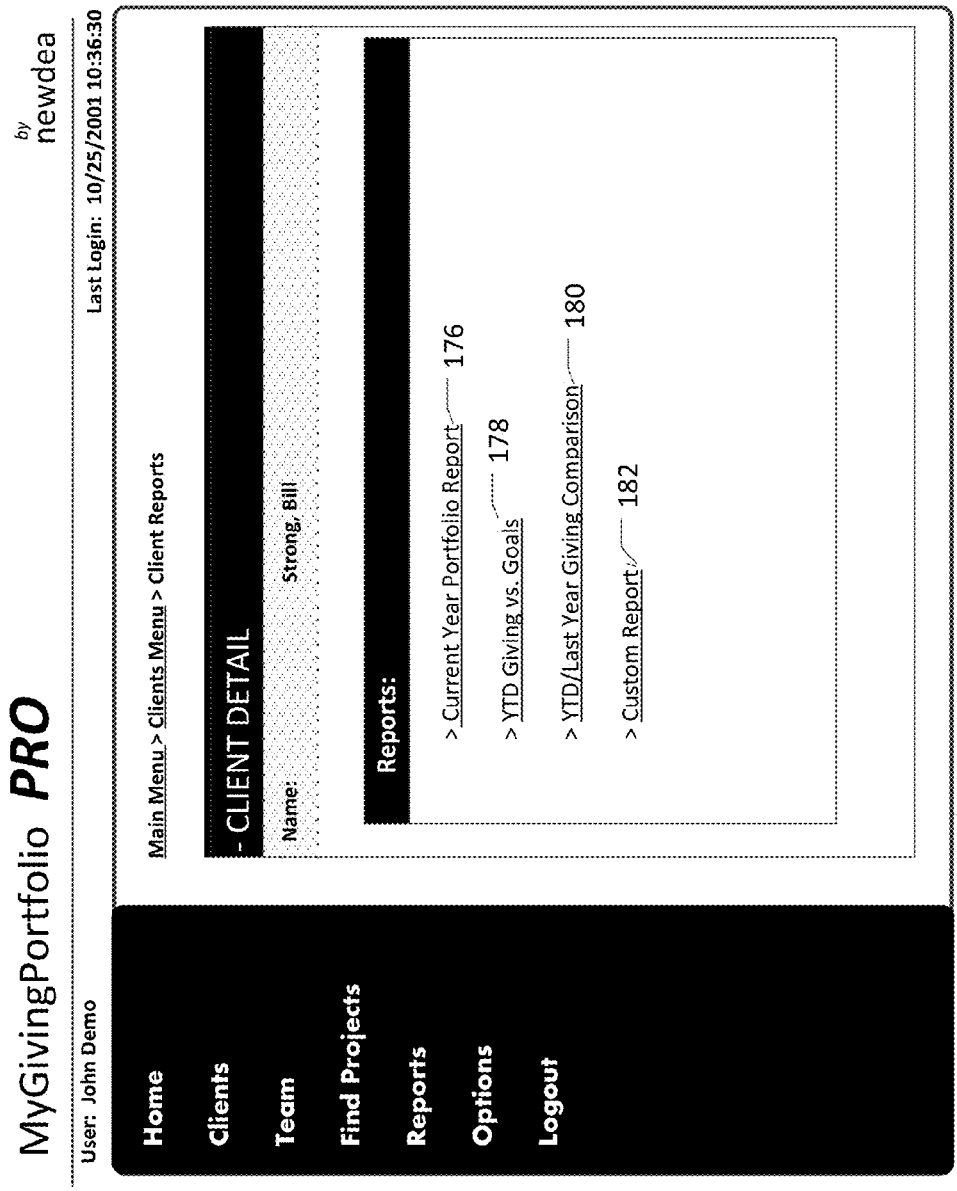
FIG. 22 is a screen shot of the "client reports" browser page provided by the "edit existing clients" procedure of FIG. 4.

The user can, if desired, click on the reports button 120. As shown in FIGS. 5 and 22, in response the edit existing client procedure 100 presents the user with a client reports browser page 174. The user may then click on any listed report in order to download it (as either a PDF or Microsoft Word document) or have it displayed on screen and printed through conventional browser page printing commands. The listed reports include: (i) a current year portfolio report 176; (ii) a year-to-date giving versus goals report 178; (iii) year-to-date and prior-year giving comparison report 180; and (iv) a custom report 182.

Figure 6:
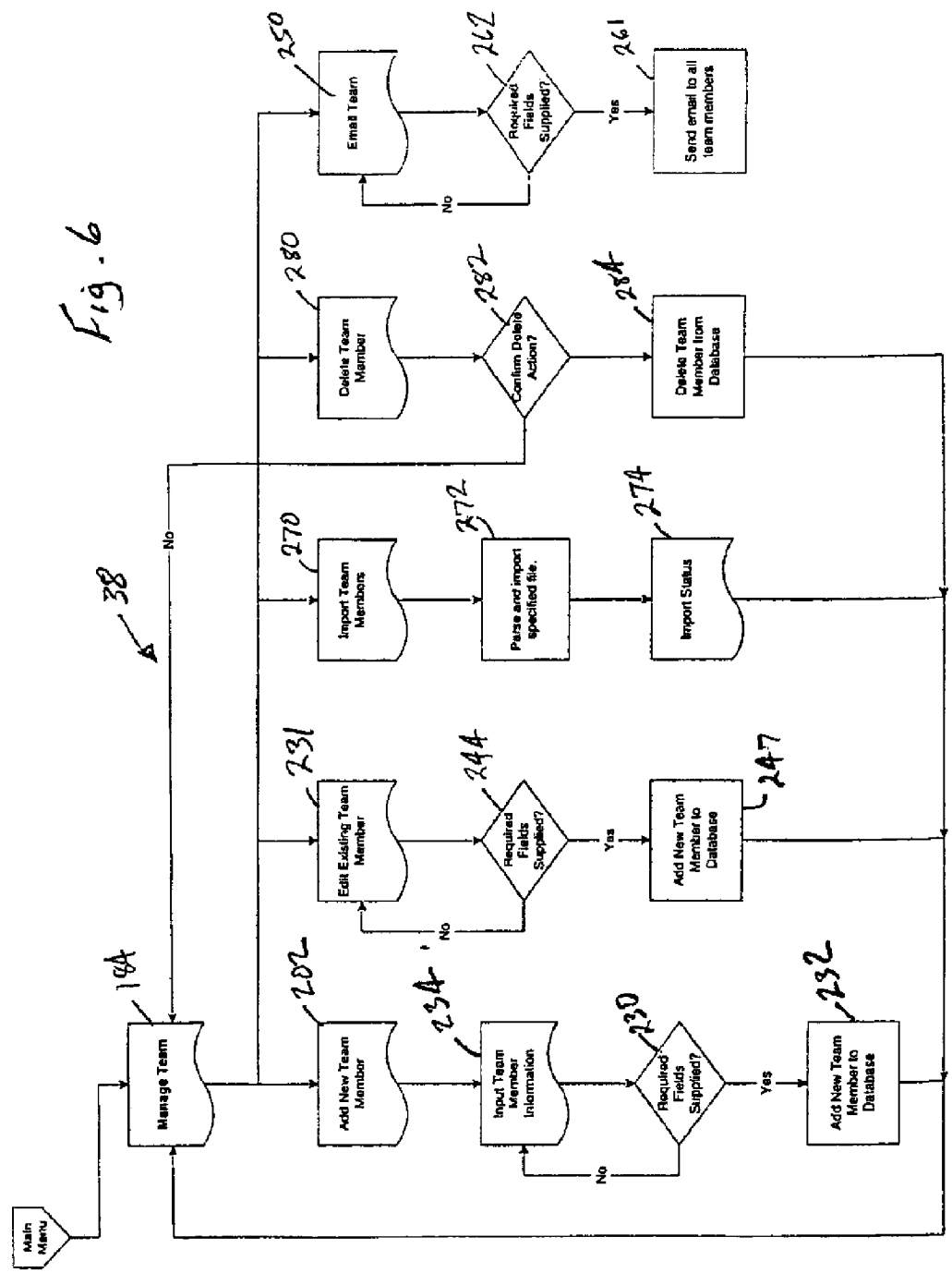
FIG. 6 is a flow chart of the "team member" procedure in the portfolio management portion of the philanthropy management system.
Figure 23:
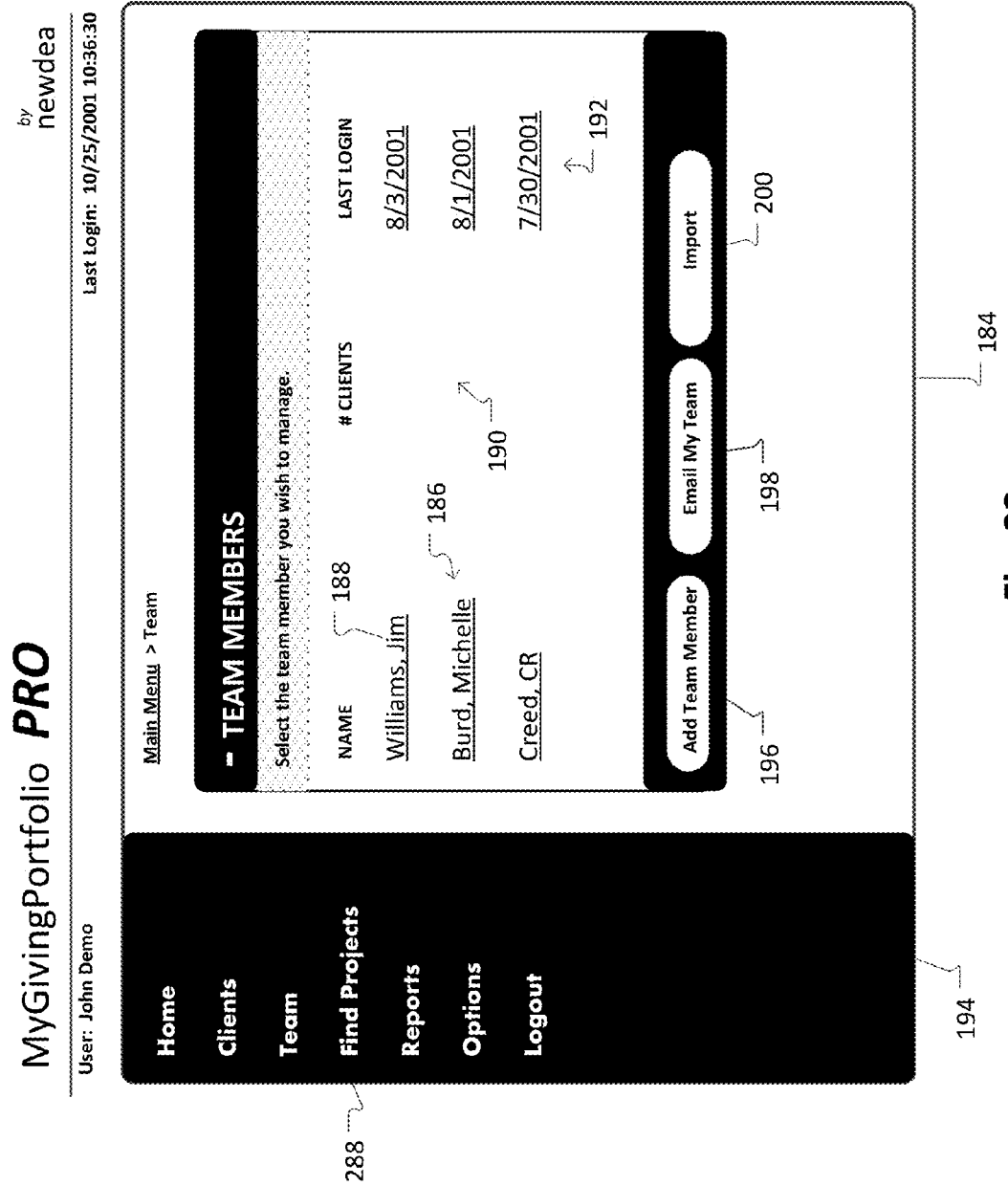
FIG. 23 is a screen shot of the "team" browser page provided by the "team member" procedure of FIG. 5.

With reference now to FIGS. 3 and 23, the user may click on the manage team button 38 on the main menu page 32. The login and main menu procedure 28 then initiates the manage team procedure 38. With reference now to FIGS. 6 and 23, the manage team procedure 38 then presents the user with the team browser page 184. The team browser page 184 presents a list of the management team members, generally 186, and for each team member, e.g., 188, the number of clients for the team member, generally 190, and the last login date of the team member, generally 192. The team browser page 184 also includes the main menu options on the left side 194, an add team member button 196, an e-mail my team button 198, and an import button 200.

Figure 24:
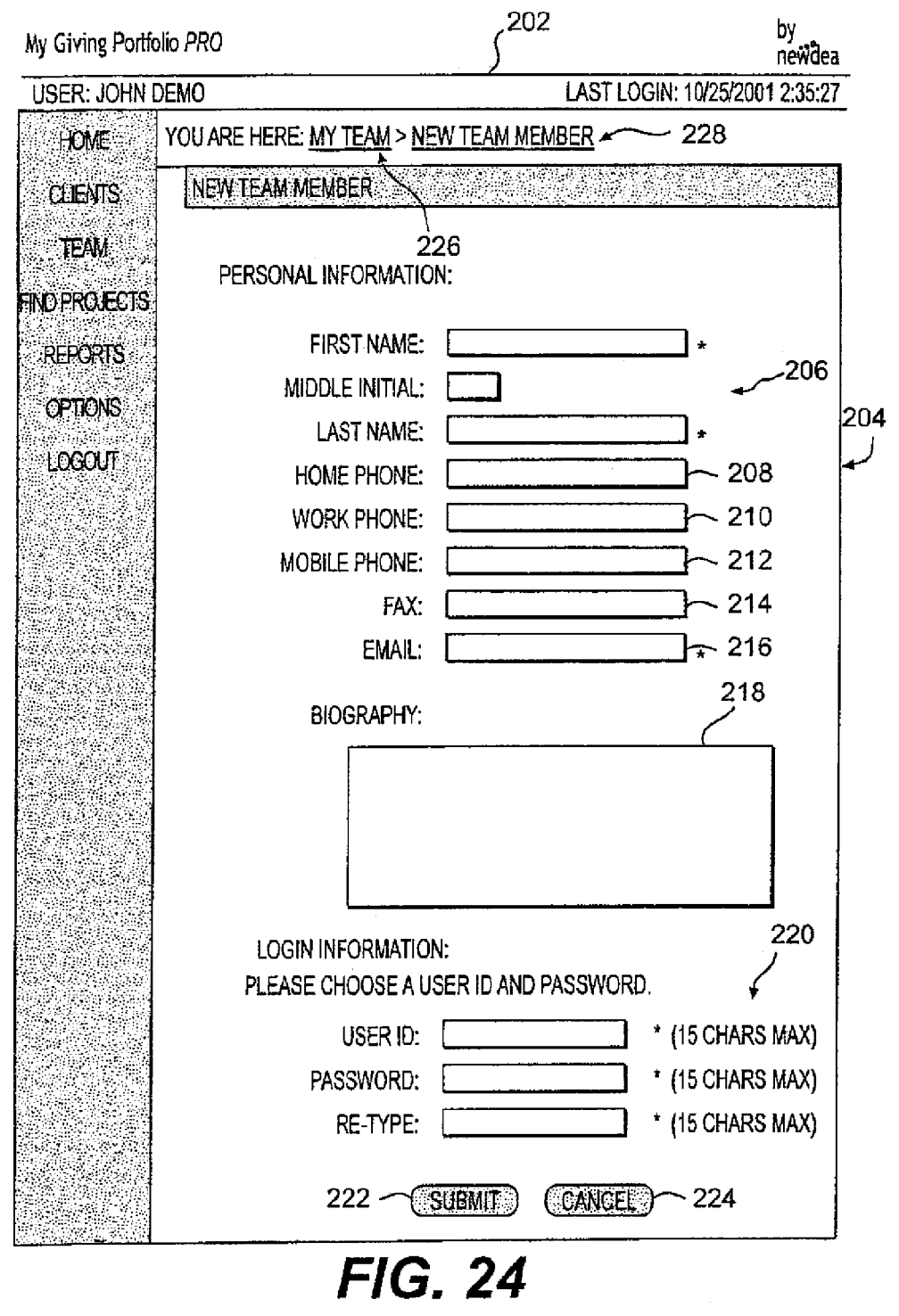
Figure 25:
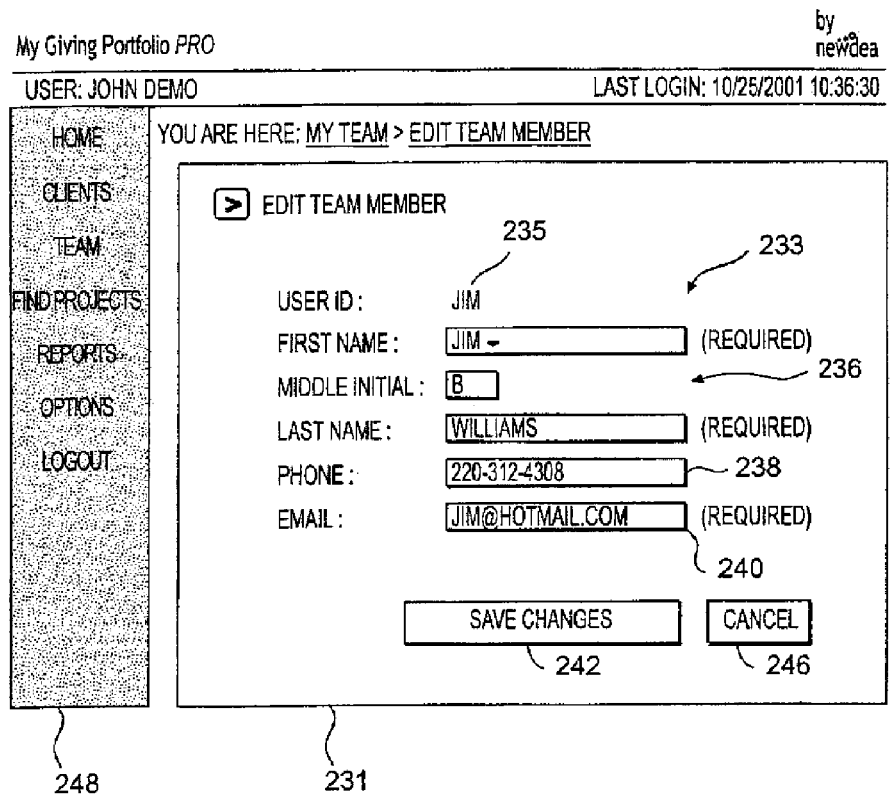
FIG. 25 is a screen shot of the "edit team member" browser page provided by the "team member" procedure of FIG. 5.

If the user clicks on the add new team member button 196, the manage team procedure 38 presents the user with, as shown in FIGS. 6, 24, and 25, the add new team member page and function 202. The new team member page 202 allows the user to enter 234 and save in the SQL database a variety of information, generally 204, about a team member. The information includes: name, 206, home phone 208, work phone 210, mobile phone 212, fax number 214, e-mail address 216, biography notes 218, and login user id and password 220. The user clicks on the submit button 222 in order to save information entered on this new team member page 202, and the entered information is saved by the new team member function 202 in the SQL database 232 provided all required information is present in the entered information 230. The user may click on the cancel button 224 to terminate saving of any information from the new team member page 202, and thereby return to the manage team page 184 shown in FIG. 23.

With reference to both FIGS. 23 and 24, the user also may return to the team page 184 by clicking on the my team indicia 226. The my team indicia 226 is a part of the browser page history trail 228 shown at the top of the browser page 202. This same type of browser page history appears at the top of all browser pages provided by the present system except the main menu page as shown in FIG. 12. The user may click on any of the various page indicia in the browser history trail 228 and thereby pull up the selected page.

With reference now to FIGS. 6, 23, and 25, the user may click on the name of a particular team member, e.g. 188, and the team procedure 38 responds by presenting the user with the edit team member browser page 230. This page 230 procures from the SQL database and displays information, generally 233, about that particular team member. This information 233 includes the particular team member's user id 235, name 236, phone number 238, and e-mail address 240. The user may edit any of this information, 233, and then click on the save bar 242 to save the information into the SQL database 247 provided the required information as indicated on the page 231, is present. The user may also click on the cancel bar 246, which returns the user to the my team page 184. The edit team member page 231 includes the main menu options on the left side 248 of the page 231.

Figure 26:
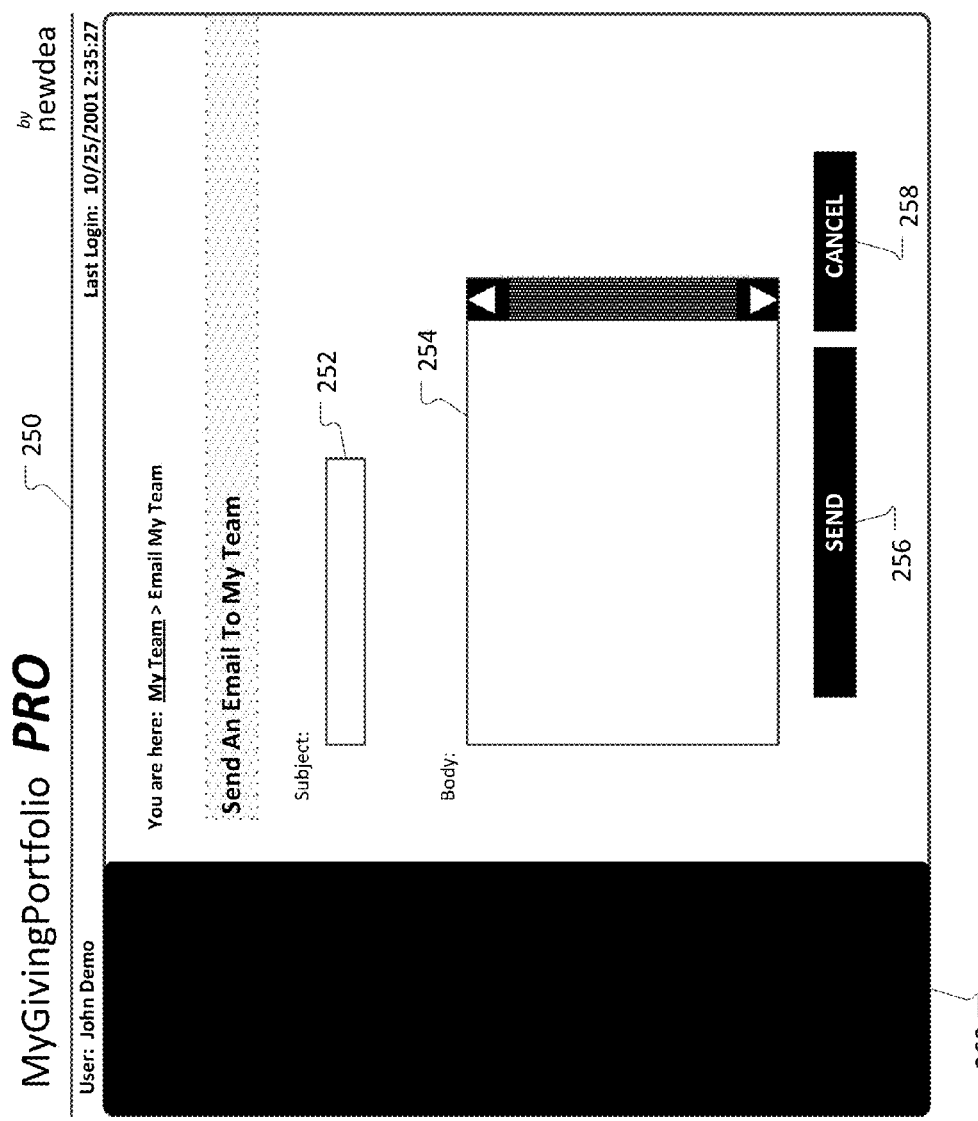
FIG. 26 is a screen shot of the "email my team" browser page of the "team member" procedure of FIG. 6.

With reference now to FIGS. 6, 23, and 26, from the team page 184, the user may click on the e-mail my team button 198. The team procedure 38 responds by presenting the user with the email team browser page and procedure 250. The e-mail page includes a subject field 252 and message body field 254, along with send message 256 and cancel 258 buttons. Although not shown in FIG. 26, this page 250 may also include the main menu options on its left side 260. The user may send 261 an e-mail to the team members listed on the team page 184 by clicking on the send message button 256 provided at least one team member is listed on page 184 and there is data included in, e.g., the subject field 262. The user may also cancel sending ant message by clicking on the cancel button 258 and thereby return to the team page 184.

With reference now to FIGS. 6 and 23, the user may import data regarding one or more team members by clicking the import team member button 200. When the user does so, the import team member function 270 presents the user with a file import browser page (not shown) in which the user enters the name a file of team member data 272. When the user then hits the enter key or import button on the file import page, the import team member function then parses the specified file 272 and imports the data from the file provided it is in the proper format. When the import is completed or otherwise terminated, the import team member function 270 reports the completed or otherwise terminated import and returns the user to the team page 184.

From the team page 184, the user may delete any listed team member 186 by right clicking on the name of the particular team member, e.g., 188. This presents the user with a delete query 280, and if the user clicks on the delete query and then confirms the deletion 282, the particular team member, e.g., 188, will be deleted from the listing 186 on the team page 184. If the user does not confirm the deletion 282, the user is presented with the team page 184 by the delete team member function 280.

Figure 7:
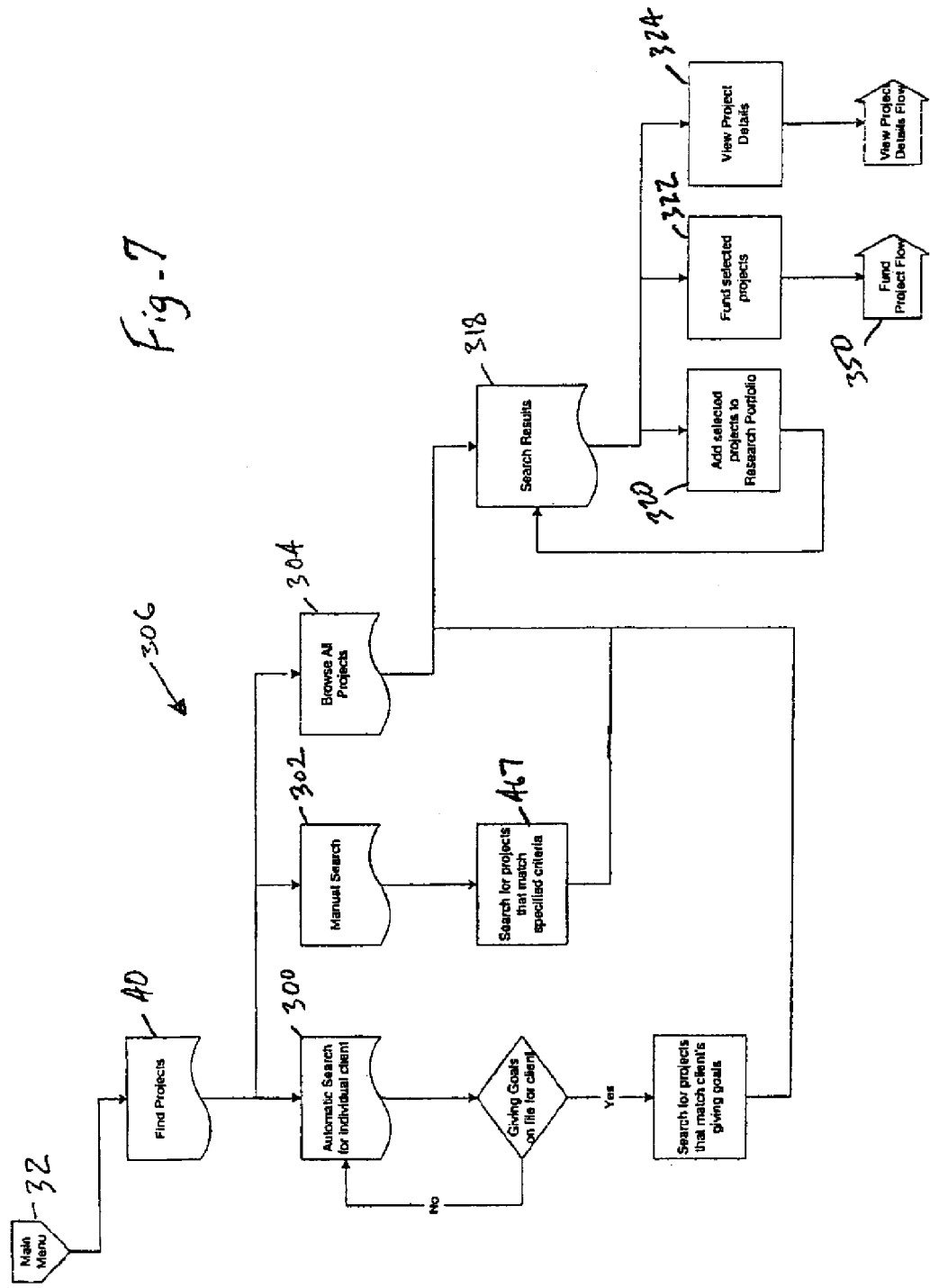
FIG. 7 is a flow chart of "find projects" procedure in the portfolio management portion of the philanthropy management system.
Figure 27:
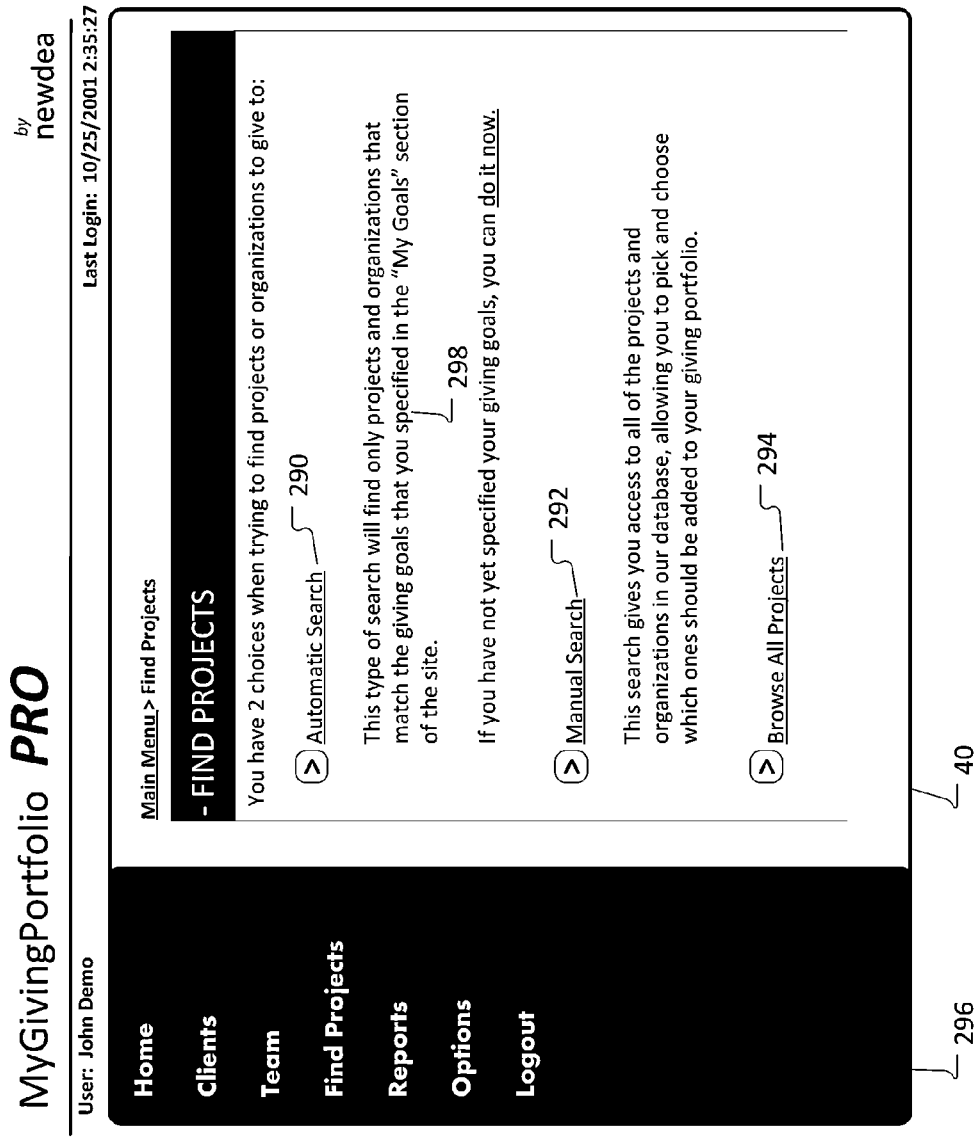
FIG. 27 is a screen shot of the "find projects" browser page of the "find projects" procedure of FIG. 7.

If the user clicks on the find projects indicia 288 on the main menu options on the left side 194 of the team page 184, the login and main menu procedure 28 of FIG. 3 is called. The login and main menu procedure then calls the find projects procedure, which displays the associated find projects browser page 40 as shown in FIGS. 7 and 27. With continuing reference to FIGS. 7 and 27, the find projects browser page 40 presents the user with automatic search indicia 290, manual search indicia 292, and browse all projects indicia 294, as well as with the main menu options 296. The automatic search indicia 290 and manual search indicia 292 include associated text explanations, e.g., 298, of the automatic search 300 and manual search 302 functions that are called by clicking on the automatic search 290 and manual search 292, respectively. The browse all projects function 304 is called when the user clicks on the browse all projects indicia or label 294.

Figure 28:
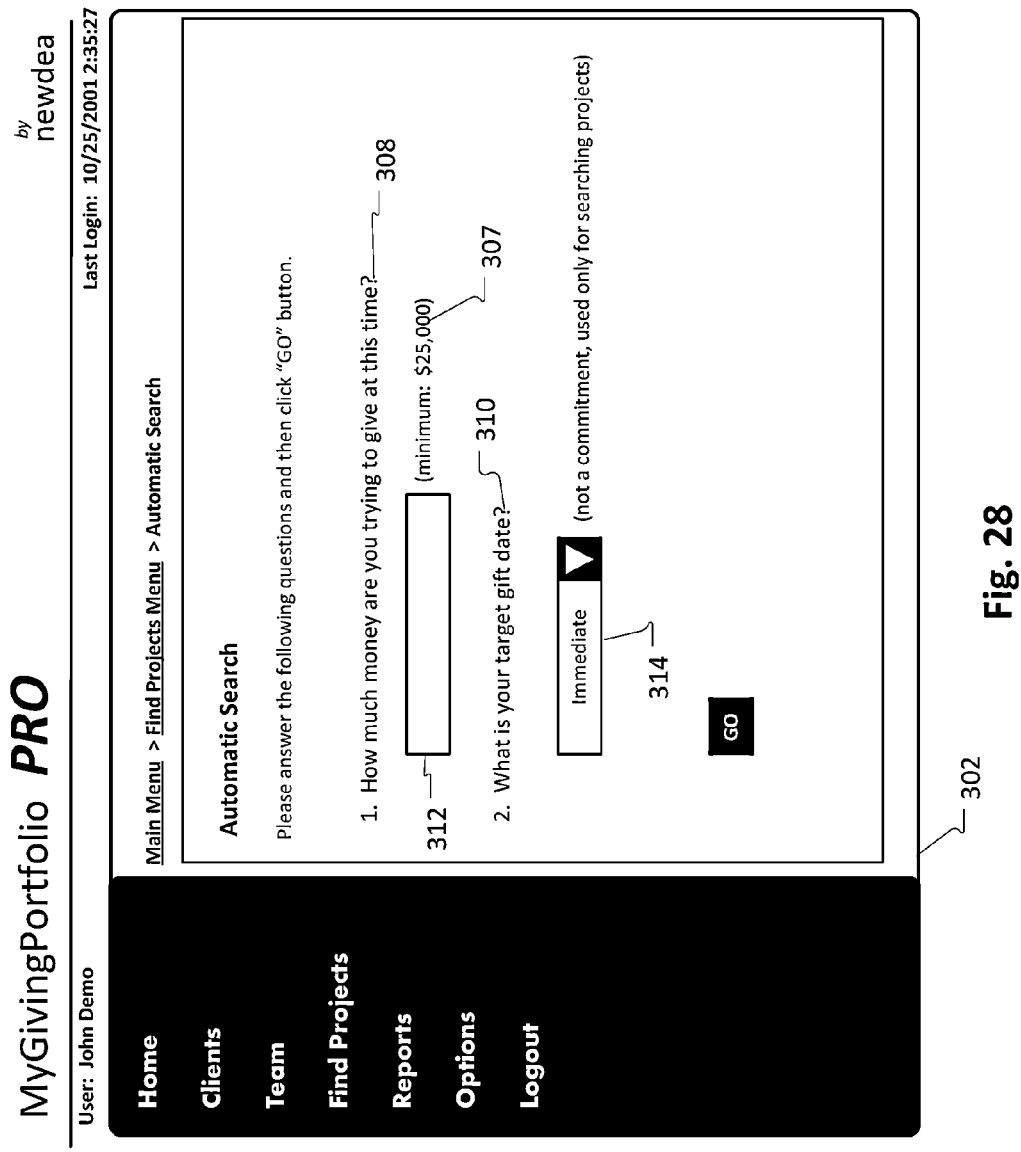
FIG. 28 is a screen shot of the "automatic search" browser page of the "find projects" procedure of FIG. 7.

With reference now to FIGS. 7 and 28, if the user clicks on the automatic search indicia 290, the find projects procedure, generally 306, calls the automatic search procedure 300, which presents the user with the automatic search browser page 302. This page 302 presents two queries: (i) how much money the user seeks to give at this time (with associated minimum amount indicia 307) 308; and (ii) what is the target gift date 310. When the user enters the requested answers into the associated fields 312, 314 respectively, and clicks on the go bar 316 on the automatic search page 302, the automatic search function 300 conducts a search of projects in the SQL database and presents the user with the search results browser page 318. The search results page 318 lists projects meeting the search criteria and presents the user with three options 320, 322, 324 for each listed project. By clicking on a particular listed project, a drop down menu provides the user with the three options: (i) add selected project to research portfolio indicia 320; (ii) fund selected project 324; and (iii) view project details 324.

Figure 31:
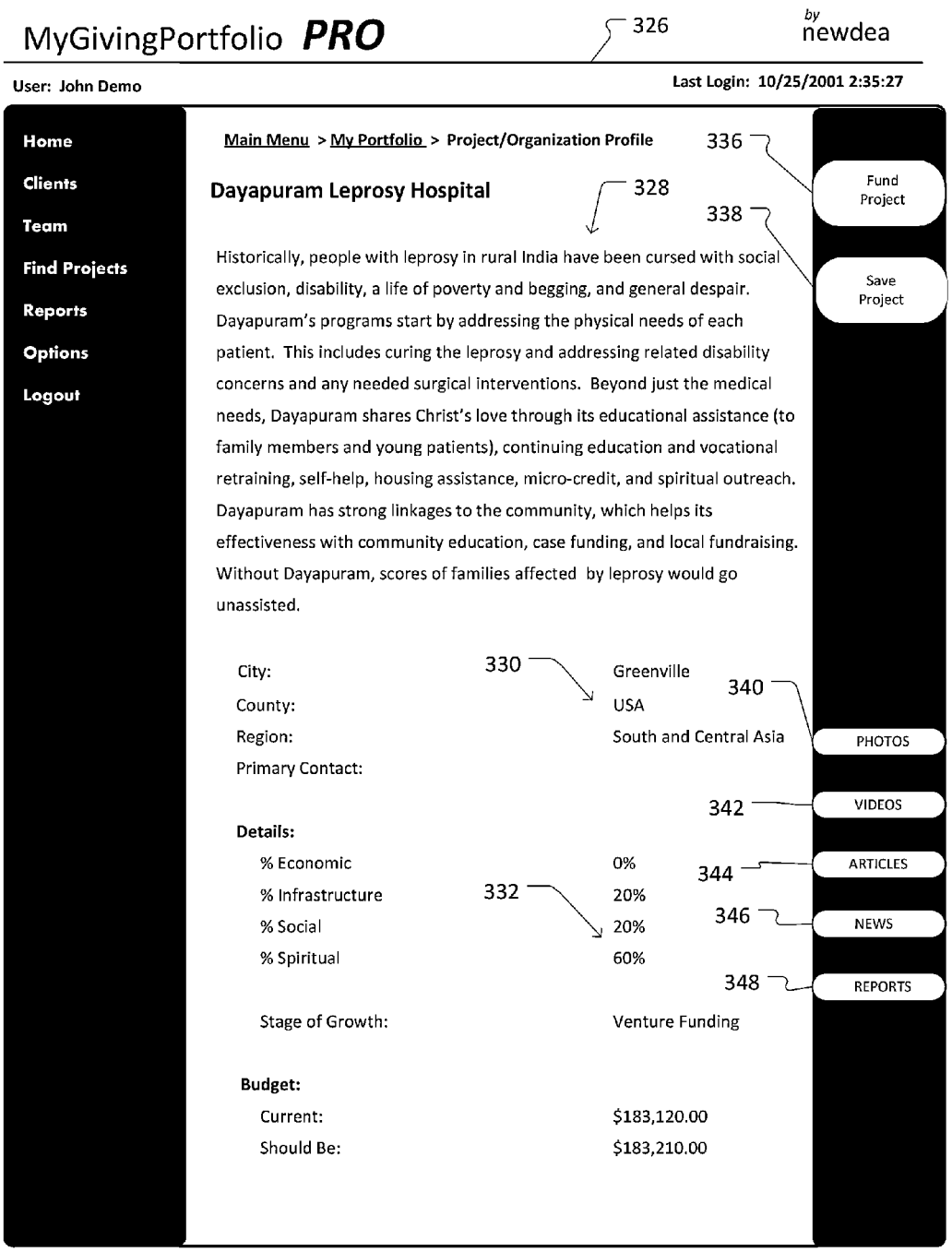
FIG. 31 is a screen shot of the "project/organizational profile" browser page of the "view project details" procedure of FIGS. 7 and 9.

If the user clicks on the view project details option 324, the find projects procedure 40 calls up the view project details procedure 160 of FIG. 9. With reference now to FIGS. 9 and 31, this procedure 160 accesses from the SQL, database data for the particular listed project and presents the user with the view project browser page 326. The view project page 326 displays for the particular listed project: a detailed project description 328; project location and primary contact data 330; project focus details (economic, infrastructure, social, and spiritual) 332; project growth stage 333; and current and expected budget data 334. This page 326 also presents the user with a fund project label 336, a save this project label 338, and buttons providing the user with access to photos 340, videos 342, articles 344, news 346, and reports 348 for the particular project shown on the page 326. Other information and functions that can be included are (i) a listing of people involved in the project 347, and (ii) other donor recommendations for this project 349. The view project page 326 also includes the main menu options on its left side 356.

Figure 10:
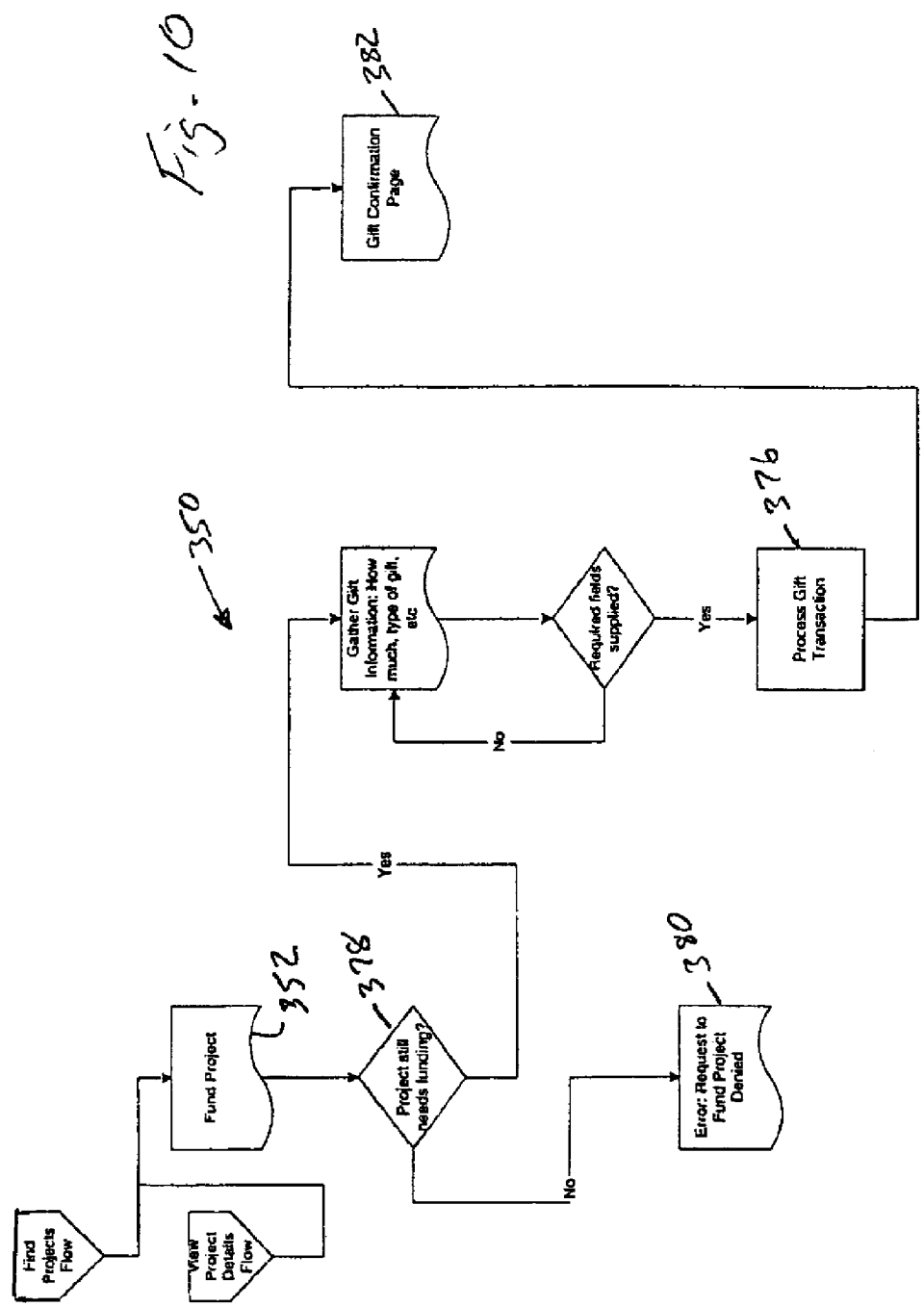
FIG. 10 is the "fund project" procedure in the portfolio management portion of the philanthropy management system.

If the user clicks on the fund the project button 336, the find projects procedure 306 calls the fund project procedure 350 as shown in FIGS. 7 and 10. The fund project procedure 350 first checks the SQL database to determine if the identified project requires funding 378. If so, the fund project procedure 350 presents the user with the fund project (give to a project/organization) browser page 352 for the particular projects shown on the project/organization profile page 326, as shown in FIG. 31. If not, the fund project procedure displays an error message indicating that the project is funded 380.

With continuing reference to FIGS. 10 and 32, the fund project page 352 displays the brief project description information 360, a donation amount field 362, and payment method query section 364. The payment query section 364 allows the user to select, by clicking one among three payment options: by deduction from the user's (or donor's) account 366; by wire transfer from an account 368 identified on the page 352; or by check 370 to an address identified on the page 352. After entering an amount and identifying the payment method, the user may click on the submit button 372, which causes this amount to be recorded in the SQL database as a donation 376 to the identified project on the page 352. The fund project procedure 350 then issues a donation/funding confirmation message page or window 382. The user may instead click on the cancel button 374, and the fund project procedure 350 responds by presenting the user with the prior project/organization profile window 326 of FIG. 31. The fund project page 352 also includes the main menu options on its left side 384.

Figure 8:
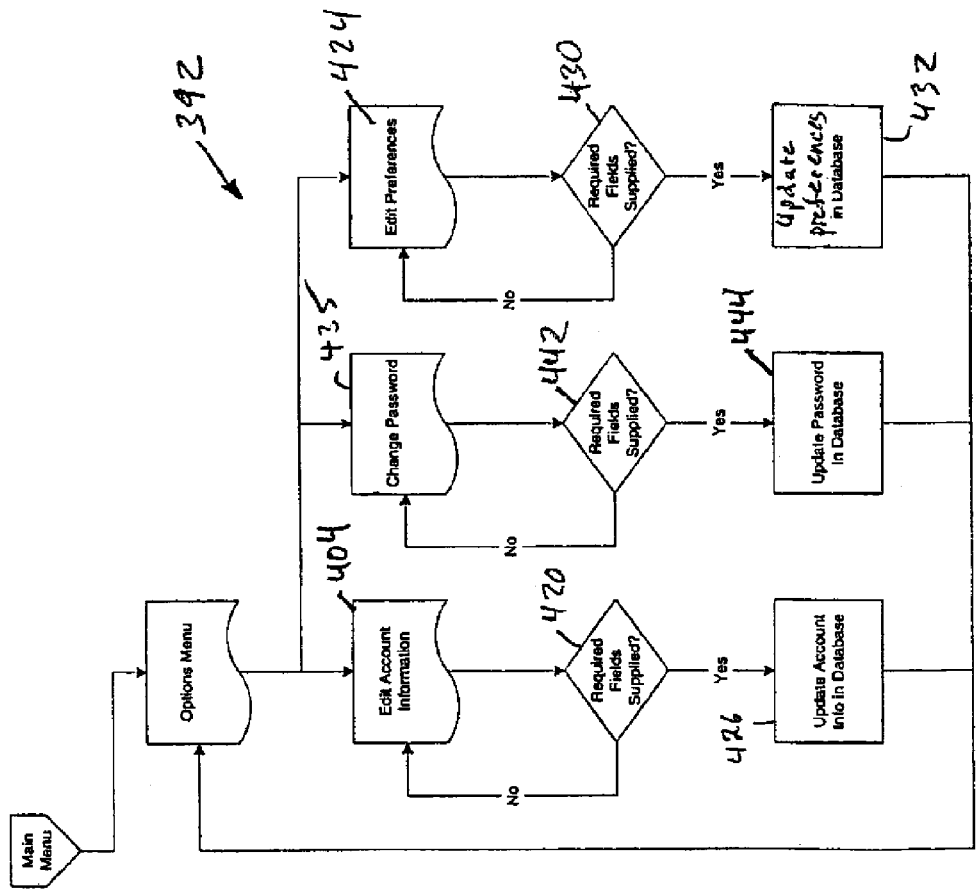
FIG. 8 is the "user options" procedure in the portfolio management portion of the philanthropy management system.
Figure 33:
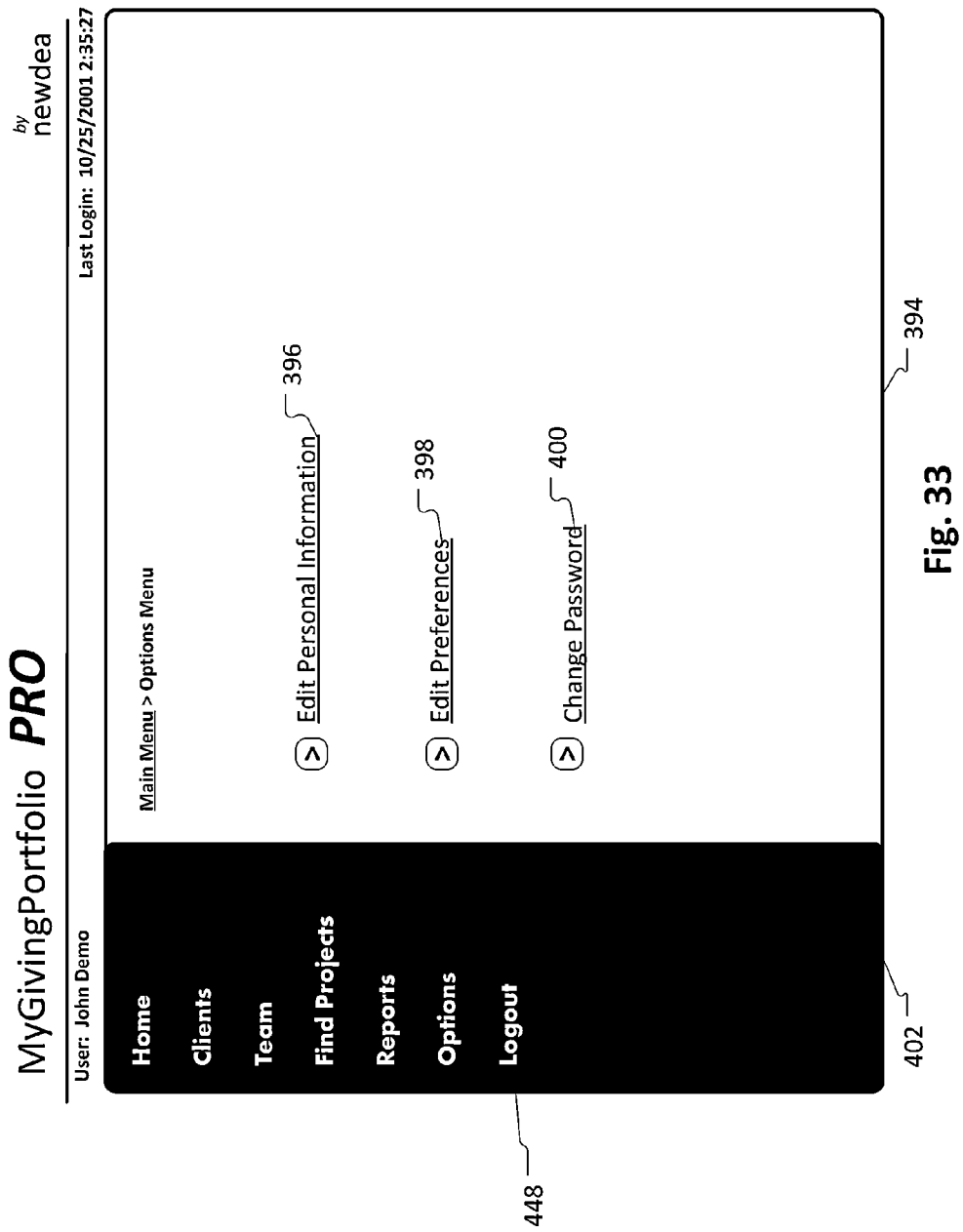
FIG. 33 is a screen shot of the "options menu" browser page of the "user options" procedure of FIG. 8.

The user may click on the options button 384 on this page 352 (or on the edit options label 42 the main menu page 33 of FIG. 12), and the login and main menu procedure 28 is called, which in turn calls the options menu procedure 392 of FIG. 8. With reference to FIGS. 8 and 33, the options menu procedure 392 displays the options menu browser page 394. The options menu page 394 presents the user with an edit personal information label 396, an edit preferences label 398, and a change password label 400. This page 394 also displays the main menu options on the left side 402.

If the user clicks on the edit personal information label 396, the options menu procedure 392 calls the edit account information function 404, which displays the edit personal info browser page 406 as shown in FIG. 34. With reference now to FIGS. 8 and 34, the options menu procedure 392 procures the user's account information from the SQL database and displays that information in the edit personal info page 406. This information includes the user's name 408, address 410, phone number 412, e-mail address 414, and e-mail format 416. The user may then edit the field, e.g., 414, and click on the submit button 418. The edit account information function 404 stores in the SQL database the updated information 426 shown in the page 406 provided the minimally required fields are included 420. The user can instead click on the cancel button 422, and the options menu procedure 392 returns the user to the options menu page 394 of FIG. 33.

Figure 29:
FIG. 29 is a screen shot of the "manual search" browser page of the "find projects" procedure of FIG. 7.

With reference now to FIGS. 7 and 27, if the user clicks on the manual search label 292, the find projects procedure 306 calls the manual search function 302 and presents the user with the manual search browser, or web, page 462 as shown in FIG. 29. With reference now to FIGS. 7 and 29, the manual search page 462 includes a search field 464 in which the user may enter a search term. The user may then click on the search bar 466, and the manual search function 302 will search the SQL database for one or more projects including the search term in the text fields for them 467. The results of the search are then presented to the user via the search results function 318 as discussed above.

In the manual search page 462, the user may refine the search by clicking on a listed geographic region 468, a listed project focus or main objective 470, and a listed stage of growth of the project 472. The user may initiate a SQL database search for projects and organizations meeting the selected criteria by clicking on the search bar 466.

With reference again to FIGS. 7 and 27, if the users clicks on the browse all projects label 294, the find projects procedure 306 calls the browse all projects function 304. With reference now to FIGS. 7 and 30, the browse all projects function 304 displays the browse all projects browser page 474. The browse all projects page 474 presents the user with a listing of projects and organizations seeking charitable funding in the SQL database. For additional projects in the SQL database (not shown), the user may click on the next page 480 and previous page 482 bars on the page 474. The user may view the details of any listed project by clicking on the box adjacent the project name, e.g., 483, and clicking the add to my research bar 484. The user may also choose to give to selected projects, e.g., 483, by clicking on the give to selected projects bar 486. Clicking on the add to my research bar 484 calls the add selected projects function 320 in the find projects procedure 306, and clicking on the give to selected projects bar 486 calls the fund selected projects 322 in that procedure 306.

With reference now to FIGS. 8 and 33, if the user clicks on the edit preferences label 398, the options menu procedure 392 calls the edit preferences function 424 and presents the user with the edit preferences browser page (not shown). The edit preferences page may include information indicating the user's donation preferences in order for the SQL database to utilize this preference information in ordering projects when the user conducts project/organization searches for possible giving as described above. If the user enters required information 430, the edit preferences function 424 stores the preference information for the user in the SQL database 432 and returns the user to the options menu 394 of FIG. 33. Otherwise and with reference to FIGS. 8 and 34, the edit preferences function 424 does not store the information and continues to present the user with the edit personal info page 406.

Figure 35:
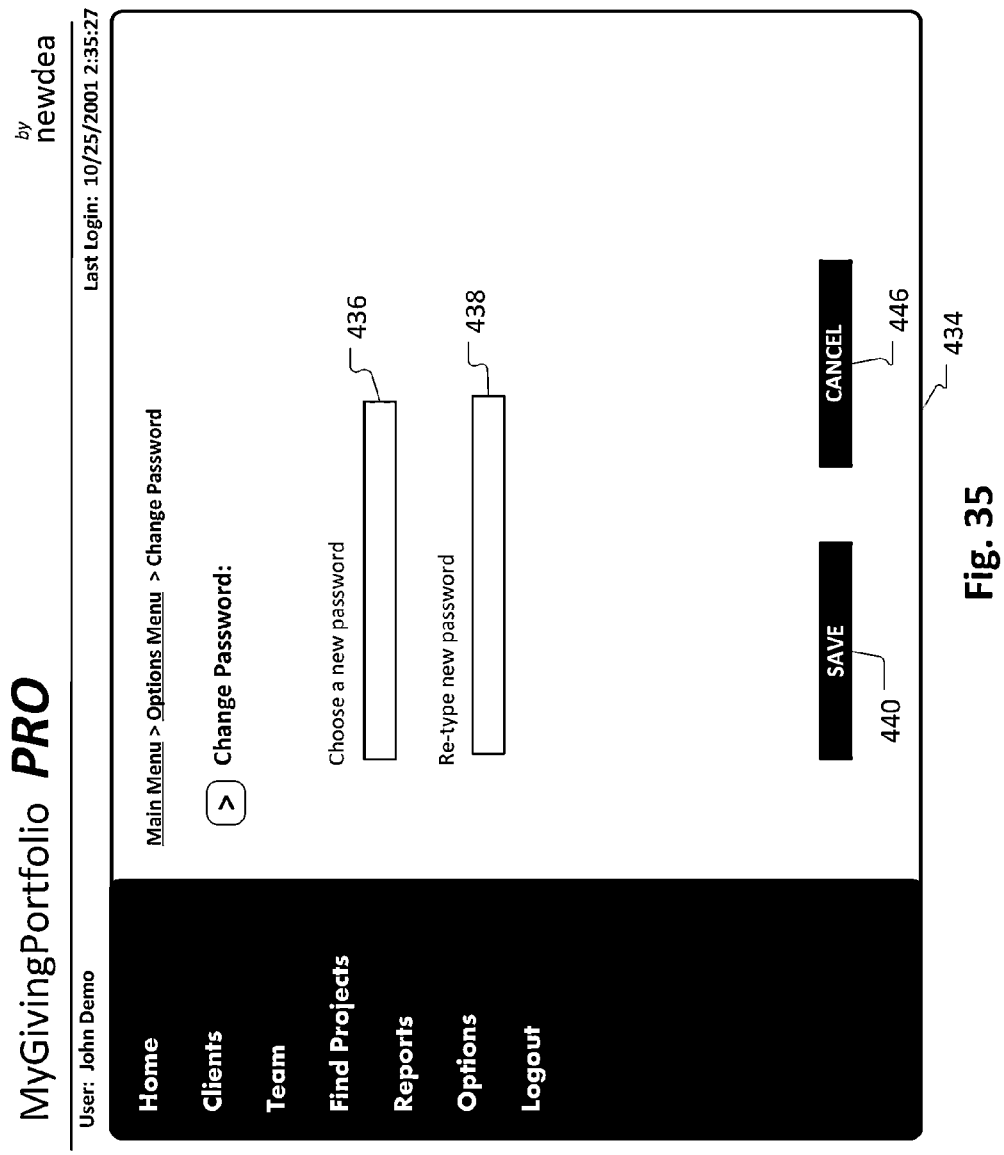
FIG. 35 is a screen shot of the "change password" browser page of the "user options" procedure of FIG. 8.

With reference again to FIGS. 8 and 33, if the user clicks on the change password label 400, the options menu procedure 392 calls the change password procedure 435 and presents the user with the change password browser page 434 in FIG. 35. With reference to FIGS. 8 and 35, the user can change the password by correctly entering and re-entering a new password 436, 438 and then clicking on the save label 440. If the user has correctly entered the information 442, the change password function 435 stores the changed password in the SQL database. If the information is incorrect 442, the change password function 435 continues to display the change password page 434. If the user clicks on the cancel button 446, the options menu procedure 392 returns the user to the options menu 394 in FIG. 33.

The user may logout from any page, e.g., 394, by clicking on the logout button 448 in the main menu options.

Business and operational functions or features that can be provided by the above-described charitable portfolio management system (either as described above or by modification of the above-described systems) are:
- secure, password protected access;
- web-based, browser independent and accessible from any Internet-enabled device;
- provides alternative text for images presented on web pages, making the site more user friendly including to those who may need to have web page text read to them by automated readers in order to maneuver through the site;
- ability to input giving goals that specify objectives such as: geographic giving objectives; types of projects sought; and acceptable levels of risk, all of which can be entered by or for the philanthropist;
- ability to view giving goals in chart format, such as a pie chart showing the percentage of giving the donor seeks to donate to various geographical regions, or a bar chart depicting planned giving by quarter for the year;
- ability to conduct general or detailed searches for projects or organizations that seek funding, from simple browsing through projects, to advanced criteria-based searching, to fully automated searching using giving goals as the criteria;
- ability to create and maintain at least three giving portfolio categorizations: (i) funded portfolio listing of links to "project profiles" for projects or organizations to which the user has donated in the current calendar year; (ii) research portfolio containing link to "project profiles" of projects or organizations the user can research; and (iii) ready to fund portfolio containing links to "project profiles" for projects or organizations that the user has researched and selected for funding;
- ability to freely move project links from the research portfolio to the ready to fund portfolio;
- ability to deposit links to "project profiles" in the research portfolio and/or ready to fund portfolio at any time;
- ability to sort folder contents for the funded, research, and ready to fund portfolios alphabetically (both ascending and descending);
- ability to run browser viewable and downloadable reports (as PDF or Microsoft Word files) depicting giving portfolio allocations and positions;
- ability for users to receive e-mail notification when news is released for a project or organization that is in a user's funded portfolio, with a link to the news appearing beside the name of the project/organization;
- ability to input transactions into the system if completed outside the system;
- ability to submit comments on projects/organizations so that others using the system can view them;
- ability to track and manage money (including using a variety of investment options) that the user may donate in the future, as well as ability to track, including through downloading of PDF or Microsoft Word reports, financial transactions with the system, including transaction date, amount, type, and status;
- ability to view, and download, as PDF or Microsoft Word documents, project profiles for each project or organization to which the user has donated funds;
- ability to request project or organization assessment reports from system administrators, such reports can then be e-mailed to the users when available;
- ability to indicate a coach for the client on the client detail page;
- ability to manage a list of their clients in the system, including ability to add, edit, and delete clients, with each client having personal portfolios manageable by the user and others to whom the user has given permission;
- ability to view and export philanthropic prospectus and other reports that are co-branded with the user's business name and logo;
- ability to manage (add, delete, or edit information about) a team of users, each of whom can maintain their own list of clients in the system;
- a team member's clients can be inherited by the team manager when the team member's account is deleted or diverted; and team managers can manually reassign clients among team members or themselves at any time;
- ability for team managers to assign a commission percentage to the manager for transactions by team members;
- ability for users to designate a commission fee to them from their clients when they perform transactions with the system;
- automatic advising of coaches when new reports are available for projects or organizations that their clients have funded;
- ability to restrict team managers from editing team members or clients unless permissioned to do so by the team members; and
- ability to restrict coaches or donors from gaining access to secure projects until approved.

Figure 36:
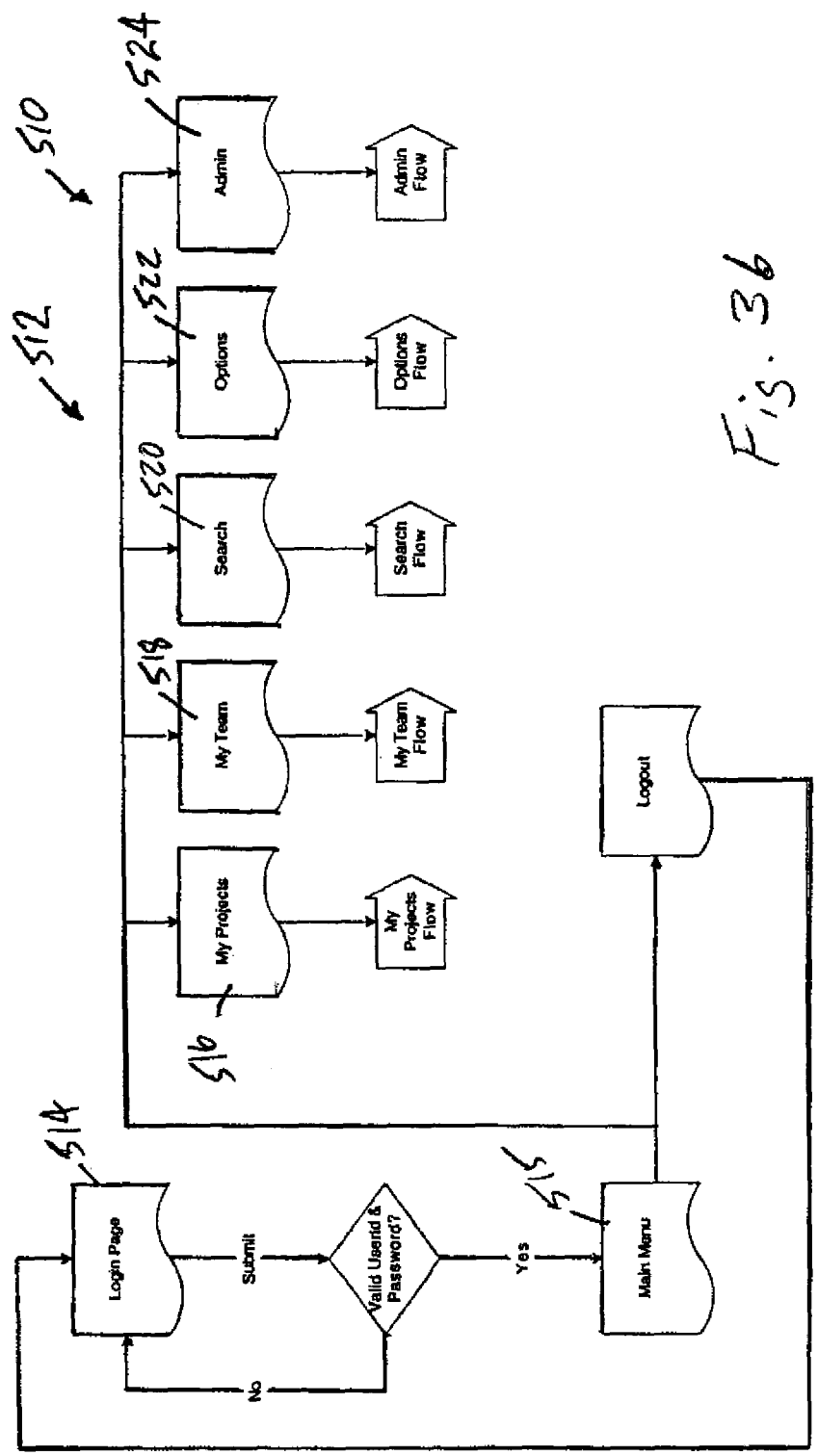
FIG. 36 is a flow chart for the "login and main menu" procedure in the project assessment portion of the philanthropy management system.

With reference now to FIG. 36, the preferred system, apparatus, and method includes a project assessment system, apparatus, and method, generally 510. This system, apparatus, and method 510 is initiated by a login and main menu procedure 512. This procedure includes a login function 514, a main menu function, 515, a my projects function 516, a my team function 518, a search function 520, an options function 522, and an admin function 524. When the user first accesses the project assessment, such as by clicking on project assessment label (not shown) on one or more introductory web-site page (not shown) for a business or entity supporting this system, the user is presented with the login browser, or web, page 526. This page 526 operates similarly to the login page 30 of FIG. 11, and upon entry of an appropriate user name and password approved by the SQL database, the login and main menu procedure 512 of FIG. 36 calls the main menu function 515. In turn the main menu function 515 displays the main menu browser page 528 as shown in FIG. 47.

Figure 47:
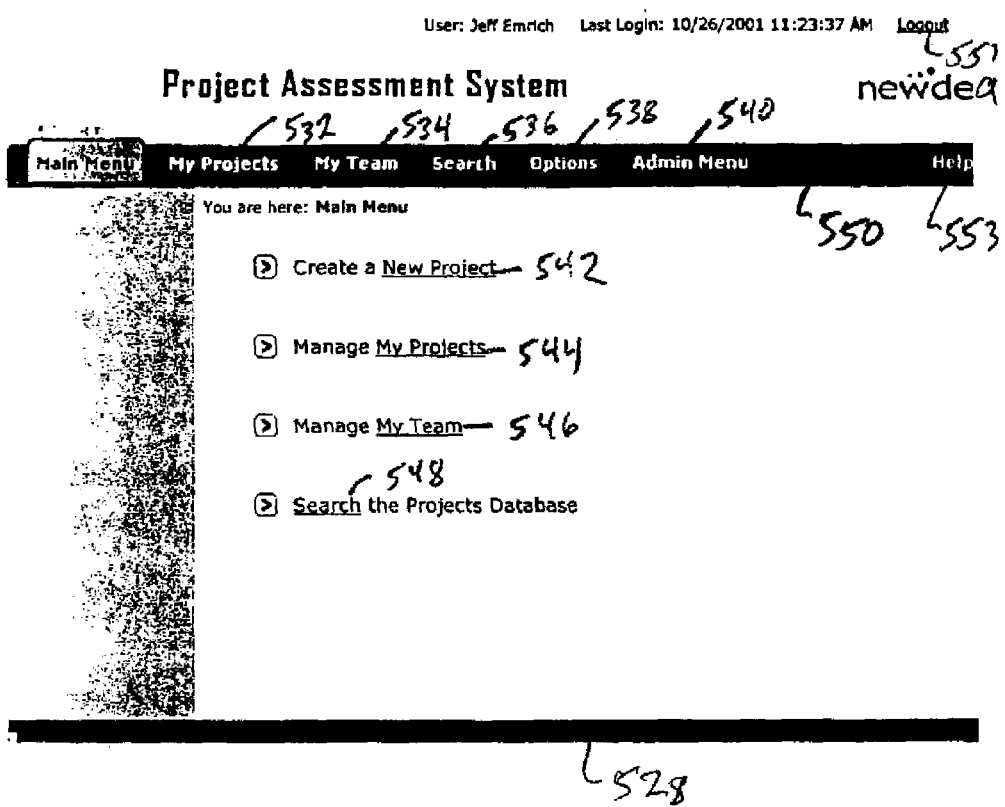
FIG. 47 is a screen shot of the "main menu" browser page for the "login and main menu" software of FIG. 36.

With continuing reference to FIGS. 36 and 47, the main menu page 528 includes a horizontal, upper main menu bar 530 that includes my projects 532, my team 534, search 536, options 538, admin menu 540, logout 550 (not shown), and help 551 indicia (collectively the "assessment main menu options"). The main menu page 528 also includes lower, vertically aligned new project indicia 542, my projects indicia 544, my team indicia 546, search indicia 548, and logout indicia 550.

The main menu page 528 (and other pages shown in FIGS. 48-72) includes a logout label 551 and help label 553 (on which a user may click to logout or procure help information in a fashion well known to those skilled in the art). These logout and help features may also be included in the pages in the charitable portfolio portion of the overall system explained above.

Figure 37:
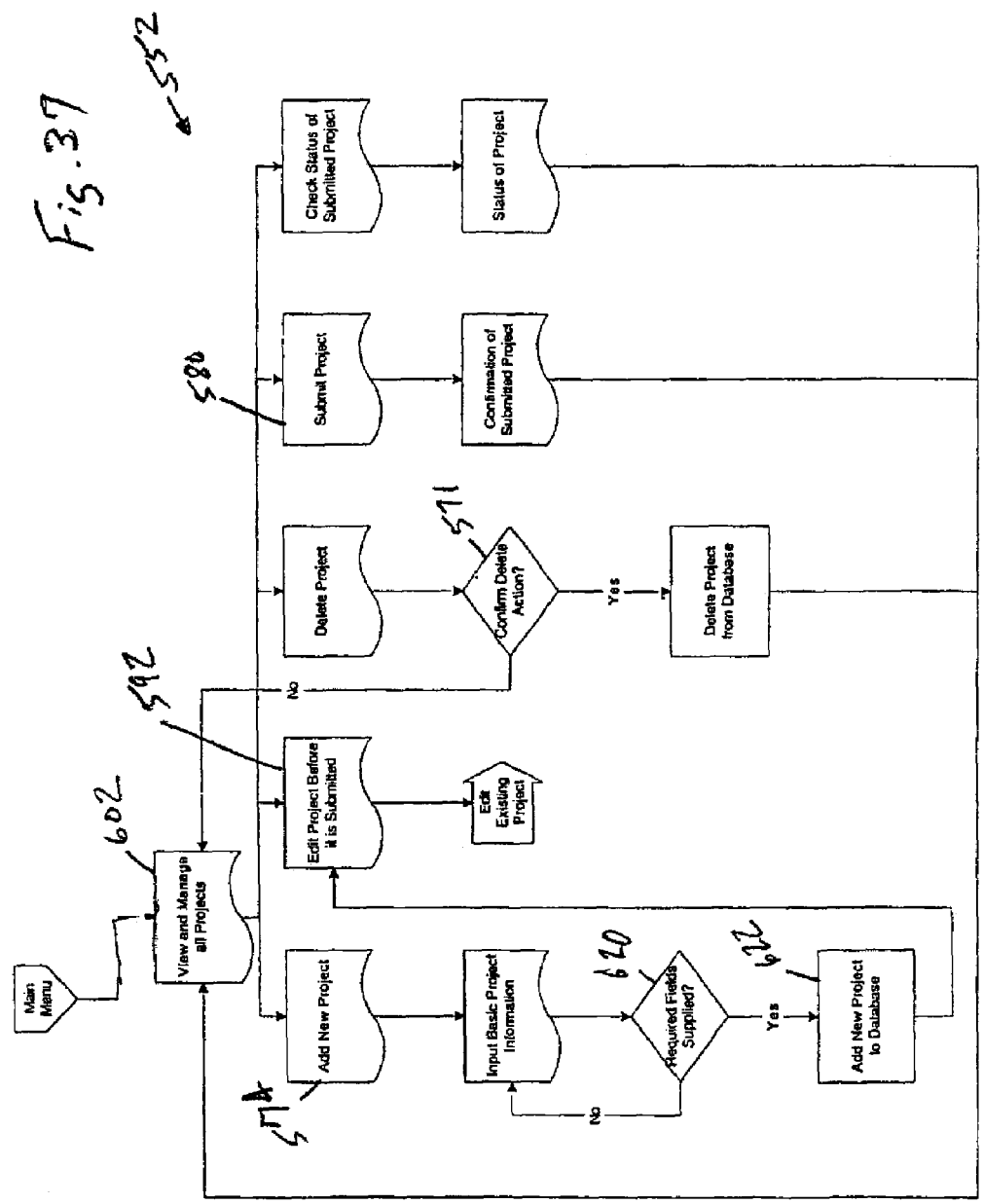
FIG. 37 is a flowchart for the "my projects" procedure in the project assessment portion of the philanthropy management system.

If the user clicks on the my projects indicia 542, the login and main menu procedure 512 calls the my projects function 516, which calls the my projects procedure 552 of FIG. 37. This procedure 552 displays the my projects browser page 554 of FIG. 48.

Figure 48:
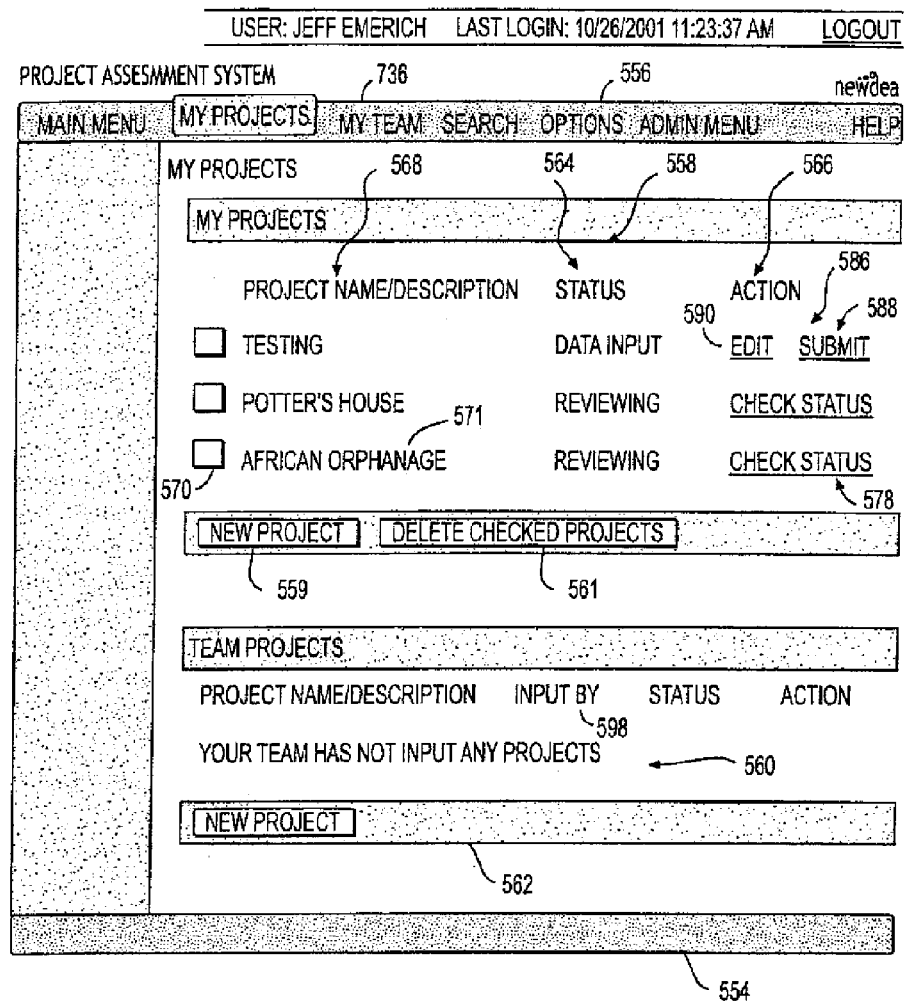
FIG. 48 is a screen shot of the "my projects" browser page for the "my projects" procedure of FIG. 37.

With reference now to FIGS. 37 and 48, the my projects page 554 includes the assessment main menu options, generally 556, and a my projects listing, generally 558, a team projects listing 560, an upper new project button 559, an upper delete checked projects button 561, and a lower new project bar 562. The my projects listing 558 lists all project or organization names previously selected by the user through the SQL database as well as project status, generally 564, and project action, generally 566, adjacent the project name listing, generally 568. By clicking on project box, e.g., 570, adjacent a particular listed project, e.g., 571, and then clicking on the delete checked project button 561, the particular listed project 571 and its associated information is deleted from the user's my project listing 558 when the user confirms the intention to delete that project 571. By clicking on the new project button 559 or the lower new project bar 562, the my projects procedure 552 calls the add new project function 574. This function 574 displays the new project (general) browser page 576 of FIGS. 49 and 50.

With continuing reference to FIGS. 37 and 48, the user may take action for a listed project by right clicking on the project action label or area, e.g., 578 adjacent a listed project, e.g., 571. Right clicking on this label 578 causes a drop down window (not shown) to provide project action options such as check status or edit/submit. If the user selects the check status label for example, the check status indicia appears in this label, e.g., 578. If the user then left clicks on the check status label, e.g., 578, the check status function is called 582, and the user is presented with a status display (not shown) for the project.

If the user instead selects the edit/submit label, e.g., 578, in the drop down window, the edit/submit status indicia appears in the label area, e.g., 586. If the user then clicks on the submit indicia, e.g., 588, my projects procedure 552 calls the submit project function 580. The submit function marks the project as submitted and submits it for review by project assessment personnel.

If the user has selected the edit/submit label for a project, and if the user then left clicks on the edit indicia 590, the my projects procedure 552 calls the edit project function 592. This procedure calls the edit existing project procedure 594 of FIG. 38, which displays the edit projects browser page 596 of FIGS. 51 and 52.

Still referring to FIGS. 37 and 48, a team projects section 560 of the my projects page 554 lists all projects selected by team members for listing on this page 554. For each listed project in this section 560, this section 560 also includes input by indicia (which team member) 598 and status and action indicia, generally 600. The status and action indicia, generally 560, operate as set forth above for the identically named indicia and labels in the my projects listing section 568 of the my project page 554.

If the user clicks on the new project bar 562 in the my projects page 554 or instead clicks on the new project indicia 542 on the main menu page 528 of FIG. 47, the my projects procedure 552 calls the add new project function 574. The add new project function displays the new project browser page 576 of FIG. 49.

With reference now to FIGS. 37, 49, and 50, the new project page 576 includes the assessment main menu options and (i) a new project instruction paragraph 604, (ii) a required project name field 606, (iii) a required project security field and associated drop down menu 608, (iv) a project mailing address section 610 with certain required fields, (v) a project shipping address 612, (vi) and general project contact information 614 including website, phone, and fax numbers. The new project page 576 also includes a create or next label 616 and a return to my projects label 618. The new project page 576 also includes a general info label 626, an organization label 628, a description label 630, a financial label 632, a classification label 634, a contacts label 636, and a media label 638 (collectively called the "edit project menu") on the left side 639 of the page 624.

In order to enter a new project into the SQL database and thereby make it available to others using the project assessment system and the above-described project management system (shown in FIGS. 3-35), a user must enter at least the required information on this page 576 and then click the next label 616 or the general label 626. The user can instead click on the return label 618 to return to the my projects page 554 of FIG. 48.

If the user clicks on the create or next label 616 or the general label 626, the my projects procedure 552 saves the entered information to the SQL database 622 provided the required fields are entered 620. After the save to the SQL database, the my projects procedure 552 calls the edit project procedure 592 of FIG. 38, which displays the edit project (general) browser page 624 shown in FIGS. 51 and 52.

Figure 38:
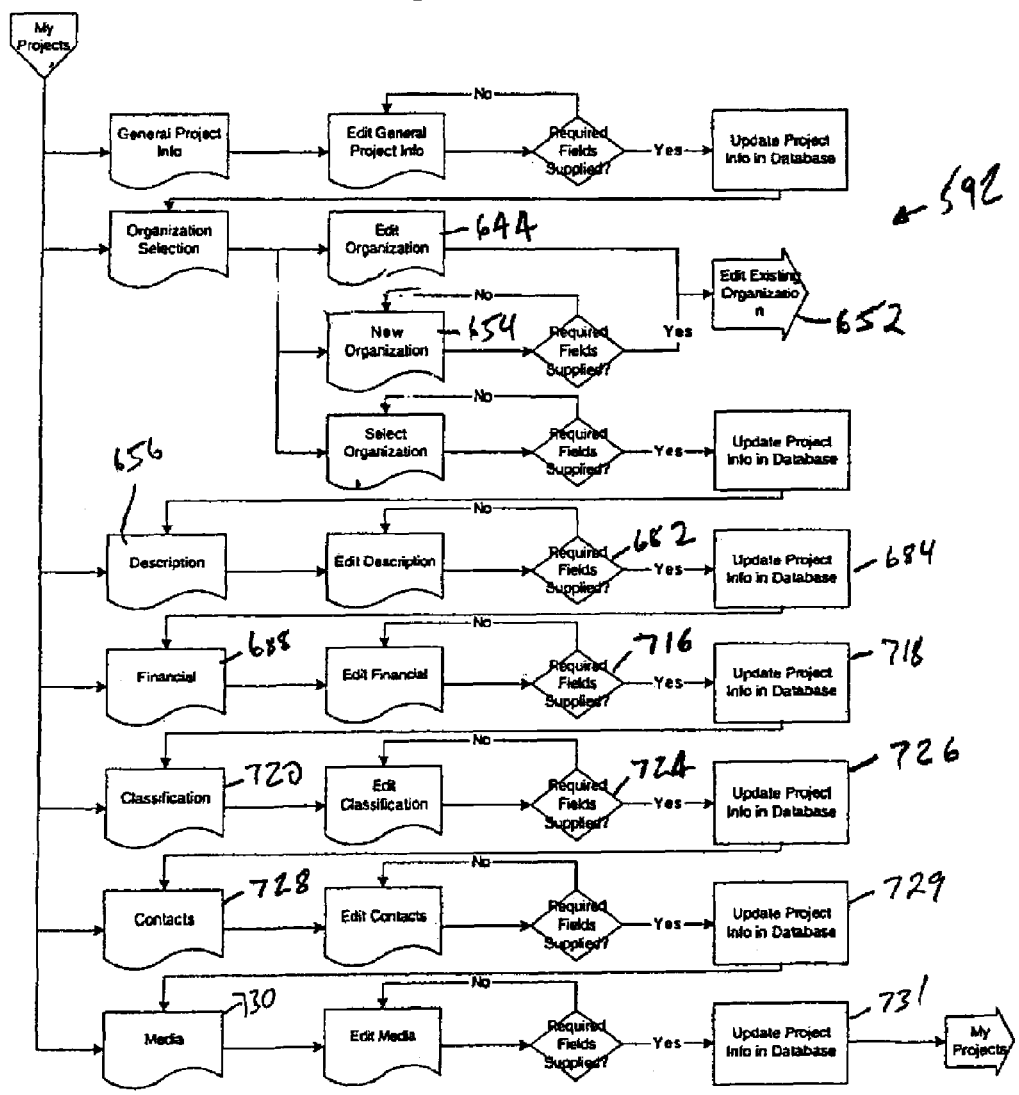
FIG. 38 is a flowchart for the "edit existing project" procedure in the project assessment portion of the philanthropy management system.
Figure 39:
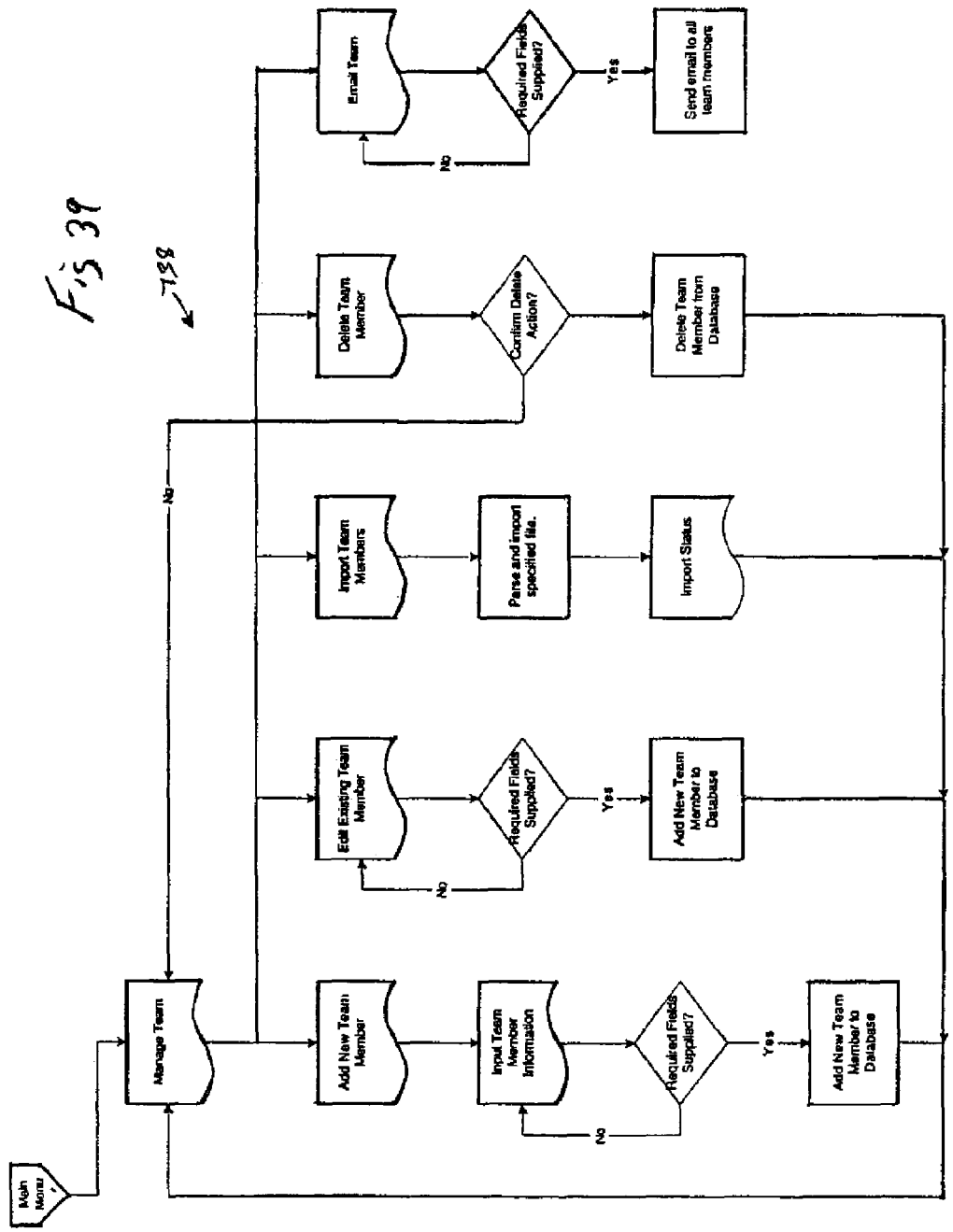
FIG. 39 is a flowchart for the "my team" procedure in the project assessment portion of the philanthropy management system.

With reference now to FIGS. 38, 51, and 52, this page 624 includes the assessment main menu, the edit project menu, and a page indicator arrow 627 showing that this general info, or edit project (general), page 624 is displayed on the user's screen. The edit project (general) page 624 also includes the project data, generally 640, entered and stored for the project through the prior data entry on the new project page 576 of FIGS. 49 and 50. The edit project (general) page 624 also includes the next label 642 and return to my projects label 644.

In this page 624, the user may edit the information shown on the page 624. If the user clicks on the next label 642 or clicks on any among the organization 628, description 630, financial 632, classification 634, contacts 636, or media 638 labels, the information remaining on the page 640 is stored in the SQL database provided the required fields are entered on the page 624. If the user has clicked on the next label 642 or the organization label 628 and the information 640 on the page 624 is stored in the SQL database in this fashion, the edit existing project procedure 592 calls the edit organization function 644. The edit organization function 644 displays the edit project (organization) browser page 646 as shown in FIG. 53.

Figure 53:
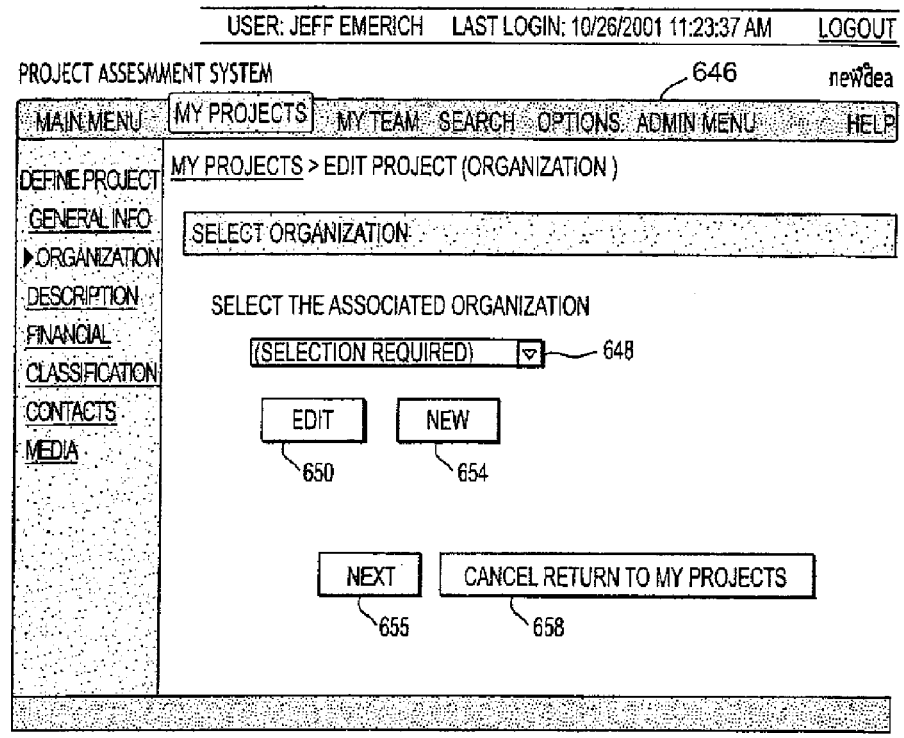
FIG. 53 is a screen shot of the "edit project (organization)" browser page of the "edit existing project" procedure of FIG. 38.

With reference now to FIGS. 38 and 53, the edit project (organization) page 646 includes the assessment main menu and the edit project menu as well as a organization selection field and associated drop down menu 648 of available organizations in the SQL database. By clicking on the drop down menu 648 and the desired organization in a drop down menu (not shown) that appears in response, the thus selected organization is saved to the SQL database for the project being edited as shown in the prior edit project general page 624 shown in FIGS. 51 and 52. The user may instead click on either: (i) the edit button 650, which calls the edit existing organization procedure 652; (ii) the new button 654, which calls the new organization function 653, which calls the manage organizations procedure 970 of FIG. 44; or (iii) the next button 655, which calls the description procedure 656. Of course, the user may instead click among other labels in the edit project menu on the page 646. Also, the user may click on the cancel, return to my projects page button 658, which returns the user to my projects page 556 of FIG. 48.

If the user clicks on the next button 655, the description function 656 presents the user with the edit project (description) browser page 660 of FIG. 54. With reference to FIGS. 38 and 54, this page 660 includes the assessment main menu and the edit projects menu and also includes project detail fields, generally 662. The project detail fields 662 includes fields for: project overview 664; a detailed description of the project for which funding is sought 666; a project problem statement 668; project (organization) constituency 670; activities and strategies detail 672; organizational authority structure detail 674; and project governance detail 676. The page 660 also includes a next button 678, a cancel/return to my project button 680, and the page indicator arrow 638 indicating the identity of the present page 660 on the user's screen.

After the user has entered the data sought by the project detail fields 662, the user may click the next button 678. As a result, provided required fields are entered 682, the entered information is stored in the SQL database for the associated project and organization 684. If the user then clicks on the next label 678, the description function 656 calls the financial function 688.

Figure 56:
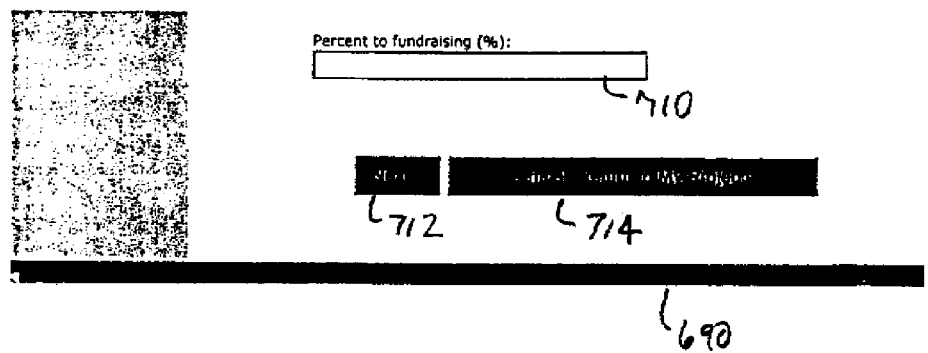
FIG. 56 is a screen shot of the lower portion of the "edit project (financial)" browser page of FIG. 55.

With reference now to FIGS. 38, 55, and 56, the financial function 688 displays the edit project (financial) browser page 690. This page includes the assessment main menu and the edit projects menu. It also includes financial data fields and selections, generally 692. The financial data includes fields for entry of: fiscal year start date 694, matching grant details 696, total funds requested 698, funding request period 700, project budget 702, annual expenses 704, operations expenses 706, program expenses 708, and fundraising expenses 710. This page also includes a next button 712 and cancel/return to my projects button 714.

After the user has entered information 692 in this page 690, including the required information 716, and clicks on the next button 712, the information entered on the page 692 is stored in the SQL database in association with the particular project to which the information relates 694. The financial function 688 then calls the classification function 720.

With reference now to FIG. 38, the classification function 720 displays a classification browser page (not shown) that includes the assessment main menu and the edit project menu as well as the next button (not shown) and cancel/return button (not shown) as described above. In this classification page, the user enters project classification information 722. The project classification information includes classification data about the geographic region(s) for the project, project focus, and funding stage, of the types shown in the project report on the manual search page 462 of FIG. 29. If the user has entered all required information in this classification page 724, the user may click on its next button (not shown), and the entered classification data is stored by the SQL database in association with the particular project for which data is being entered 726.

The classification function 720 then calls the contact function 728. The contact function 728 displays a contact browser page (not shown) that allows the user to enter and store to the SQL database contact information for the then involved project in addition to the contact information editable in other edit pages 729 such as shown in FIG. 65 below. Additional contact information can include bank wire instructions or information identifying how to contact other persons or entities possibly pertinent to the project.

When completed, the contact function 728 calls the edit media function 730. The edit media function 730 then calls an edit media browser page (not shown) that allows the user to edit and store to the SQL database, in association with the particular project then involved, various types of media such as photos, videos. articles, news, and reports 731 of the type that will then be retrievable for the project as shown in the project/organization browser page 326 of FIG. 31.

The media function 730 then calls the my projects procedure 552 of FIG. 37. The my projects procedure 552 then displays the my projects page 556 of FIG. 48. The user may then click on, for example, the my team indicia 736 on the my projects page 556. This calls the login and main menu procedure 512 of FIG. 36, and this procedure 512 calls the my team procedure 738 of FIG. 39. The my team procedure 738 then displays a team browser page (not shown) that looks much like, and operates much like, the team page 184 of FIG. 23 and team procedure 38 of FIG. 6.

Figure 40:
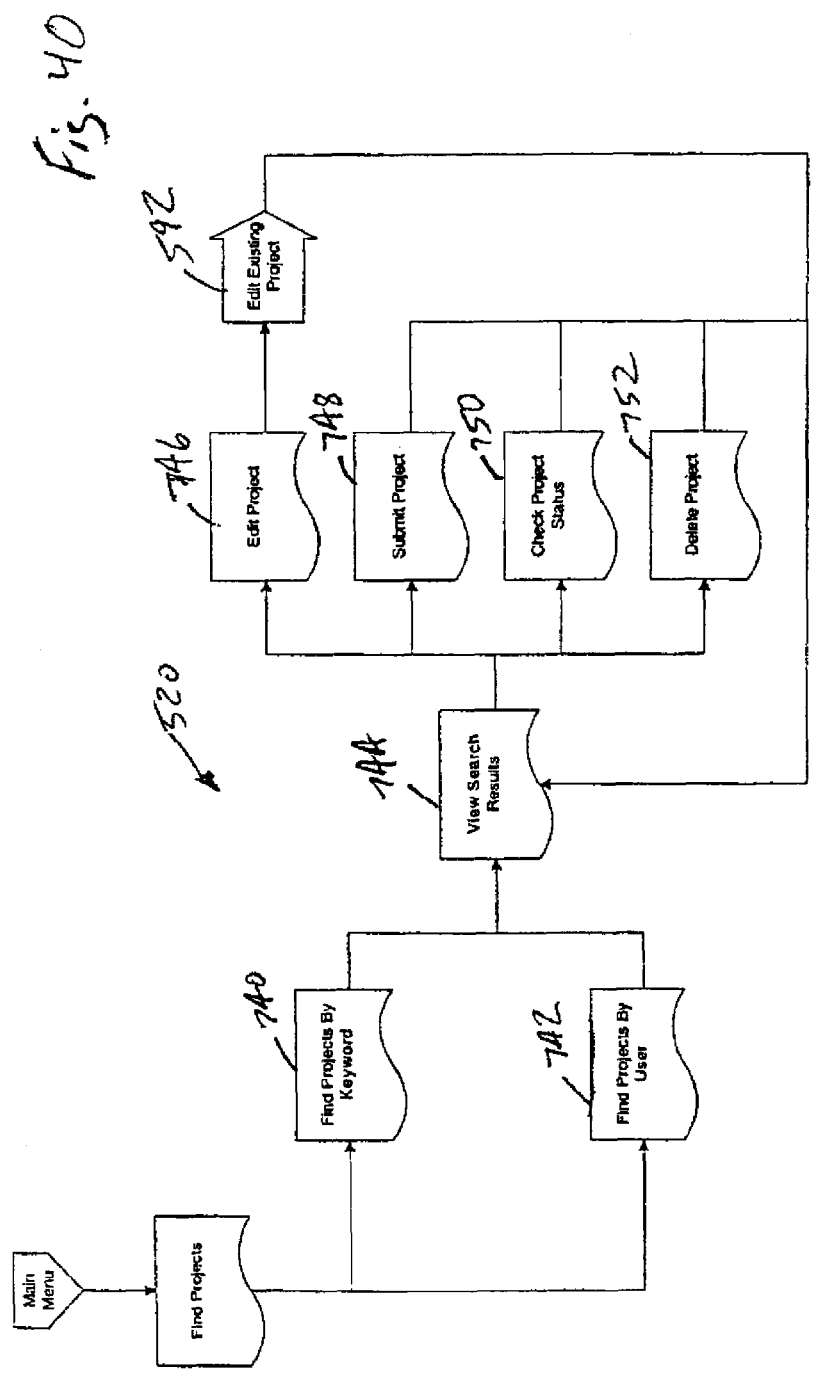
FIG. 40 is a flowchart for the "search for projects" procedure in the project assessment portion of the philanthropy management system.
Figure 41:
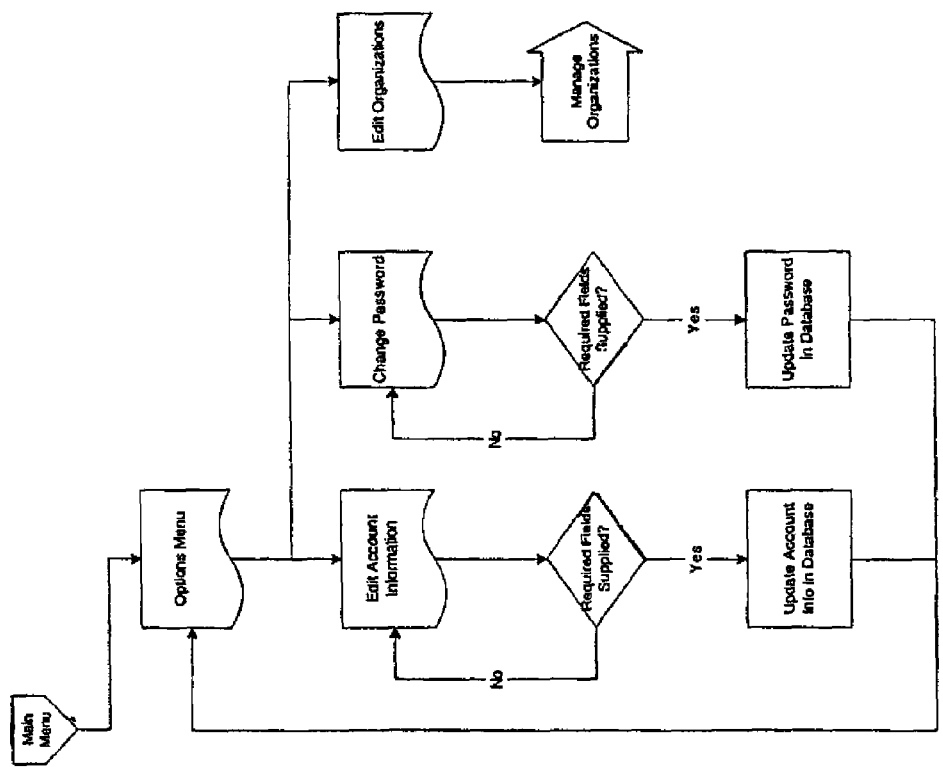
FIG. 41 is a flowchart for the "options menu" procedure in the project assessment portion of the philanthropy management system.

Referring now to FIGS. 36 and 47, if the user clicks on the search indicia 436 of on the main menu page 528 of FIG. 47 (or on any other page containing the assessment main menu), the search function 520 is called. With reference now to FIG. 40, the search function 520 displays a search browser page (not shown) that includes the standard assessment main menu and that allows the user to search for projects by keyword 740 or user name 742 (i.e., projects included in a portfolio of a given team member). When the user enters a keyword or user name and submits the search, the search for projects procedure 520 searches the SQL database for project(s), if any, meeting the search criteria (keyword or user name) and displays the names of the project meeting the criteria 744. This project display browser page 744 presents the user with options of: editing a particular project 746 (which calls the edit existing project procedure 592 of FIG. 38); (ii) submitting a project for funding 748; (iii) checking current project status 750; or (iv) deleting a selected project from the SQL database for the user's team.

If the user clicks on a project to edit it, the edit project function 746 calls the edit existing project procedure 592 shown in FIG. 38. If the user instead clicks on, for example, the admin menu indicia on the assessment main menu, the login and main menu procedure 512 is called, which in turn calls the system administration procedure 752 of FIG. 42.

Figure 42:
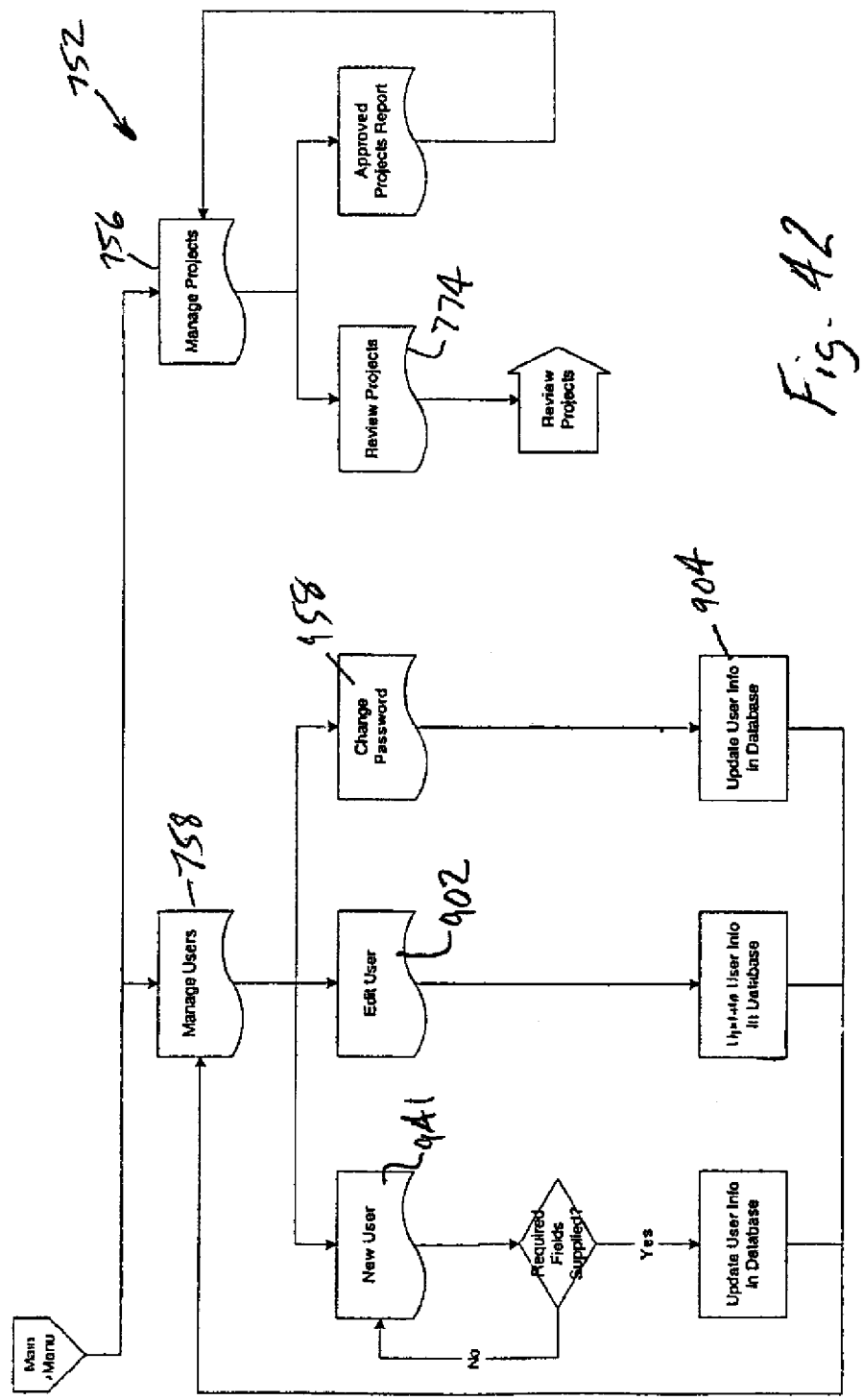
FIG. 42 is a flowchart for the "system administration" procedure in the project assessment portion of the philanthropy management system.
Figure 43:
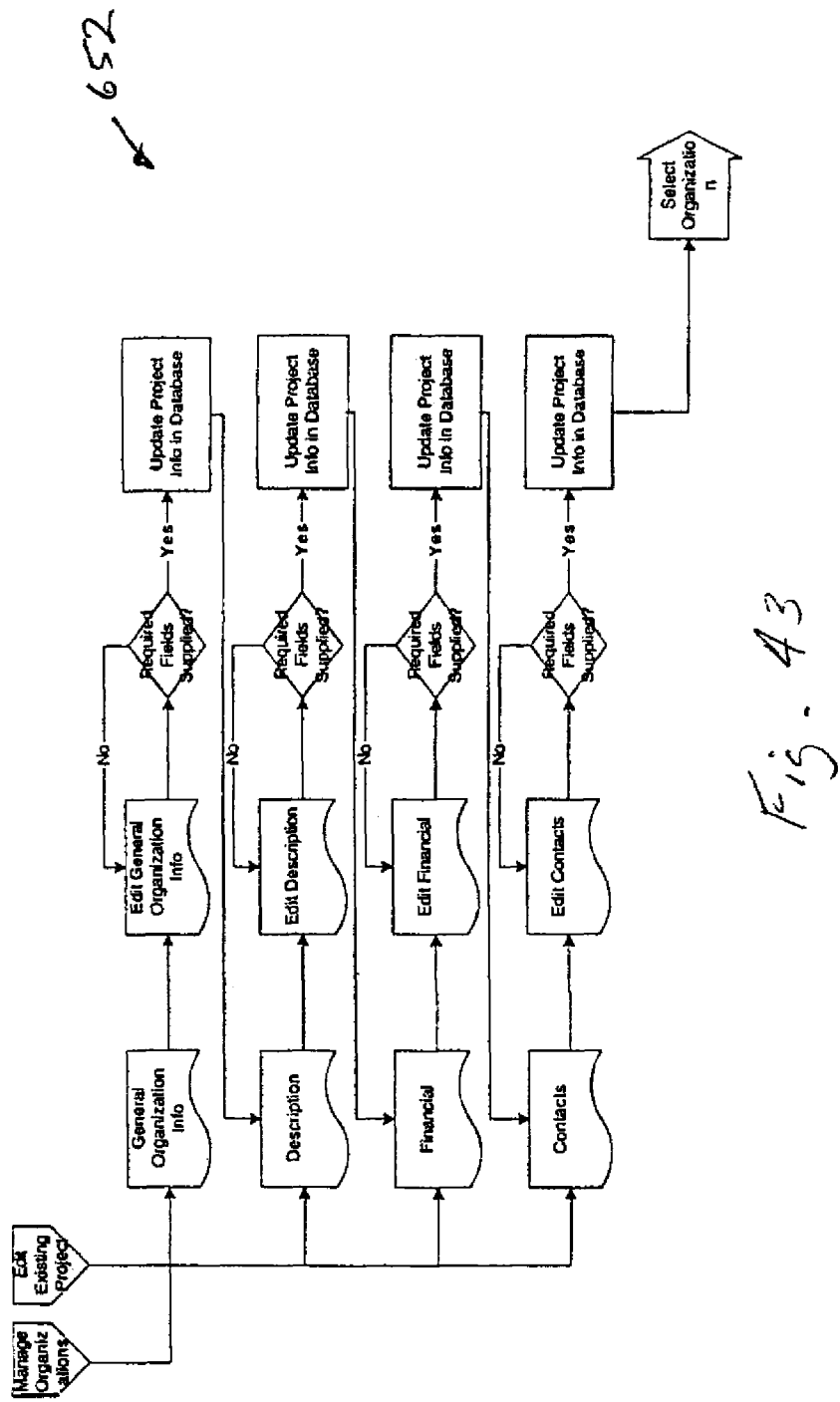
FIG. 43 is a flowchart for the "edit existing organization" procedure in the project assessment portion of the philanthropy management system.
Figure 57:
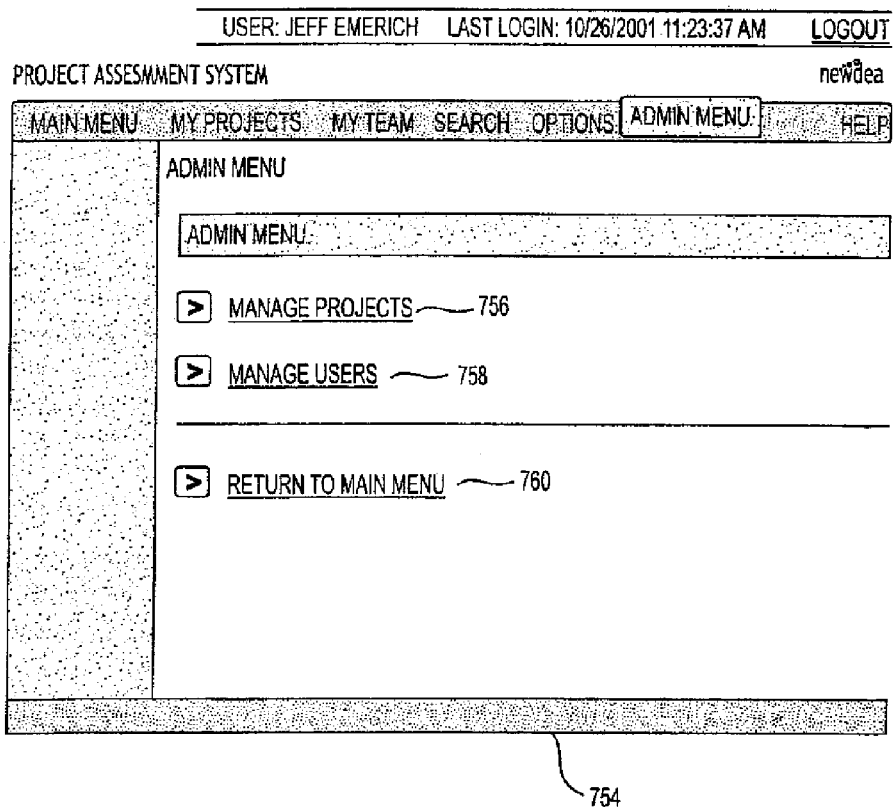
FIG. 57 is a screen shot of the "admin menu" browser page of the "system administration" procedure of FIG. 42.

With reference now to FIGS. 42 and 57, the administration procedure 752 first displays an admin menu browser page 754. This page 754 includes the assessment main menu and three action options: (i) a main projects label 756; (ii) a manage users label 758; and (iii) a return to main menu label 760. If the user clicks on the main projects label 756, the main projects function 756 displays the manage projects browser page 762 as shown in FIG. 58.

Figure 58:
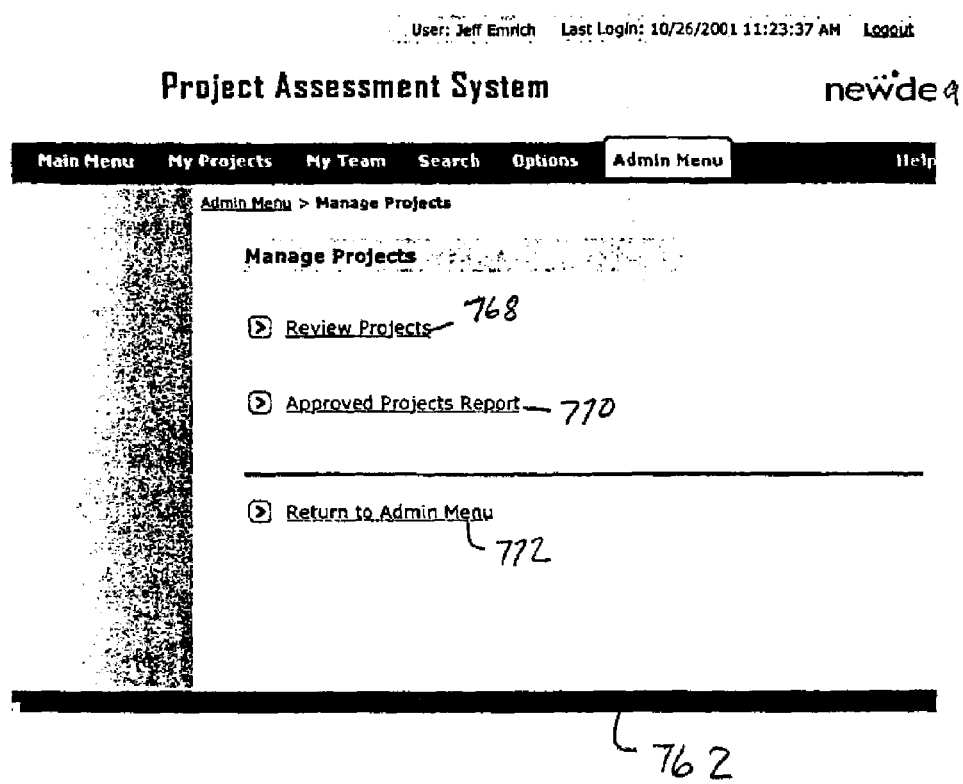
FIG. 58 is a screen shot of the "manage projects" browser page of the "system administration" procedure of FIG. 42.

With reference now to FIGS. 42 and 58, the manage projects page 762 includes the standard assessment main menu and three action options: (i) review projects label 768; (ii) approved projects report label 770; and (iii) return to main menu label 772. If the user clicks on the review projects label 768, the review projects function 774 is called, which in turn calls the review projects procedure 776 as shown in FIG. 45.

Figure 45:
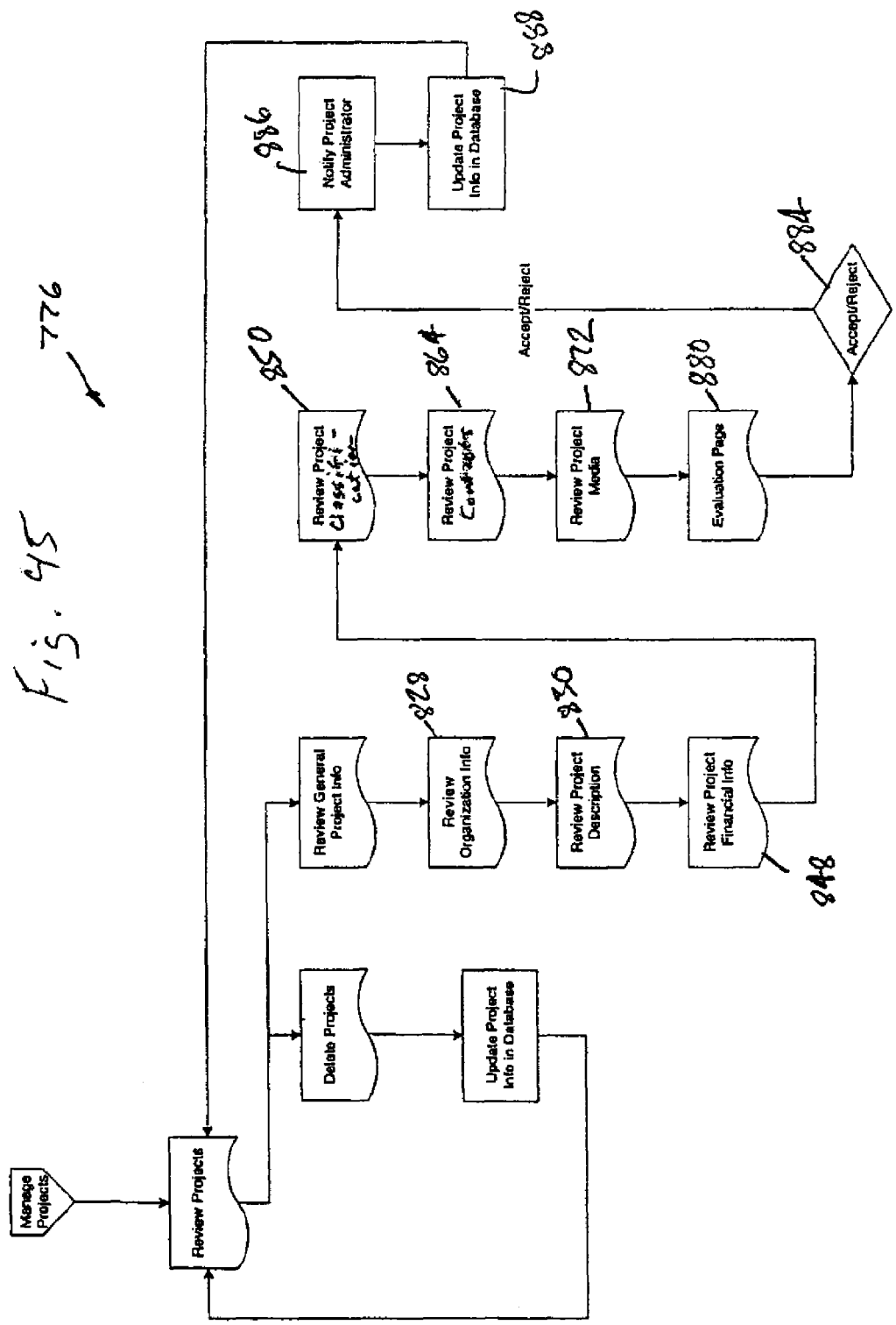
FIG. 45 is a flowchart of the "review projects" procedure in the project assessment portion of the philanthropy management system.
Figure 46:
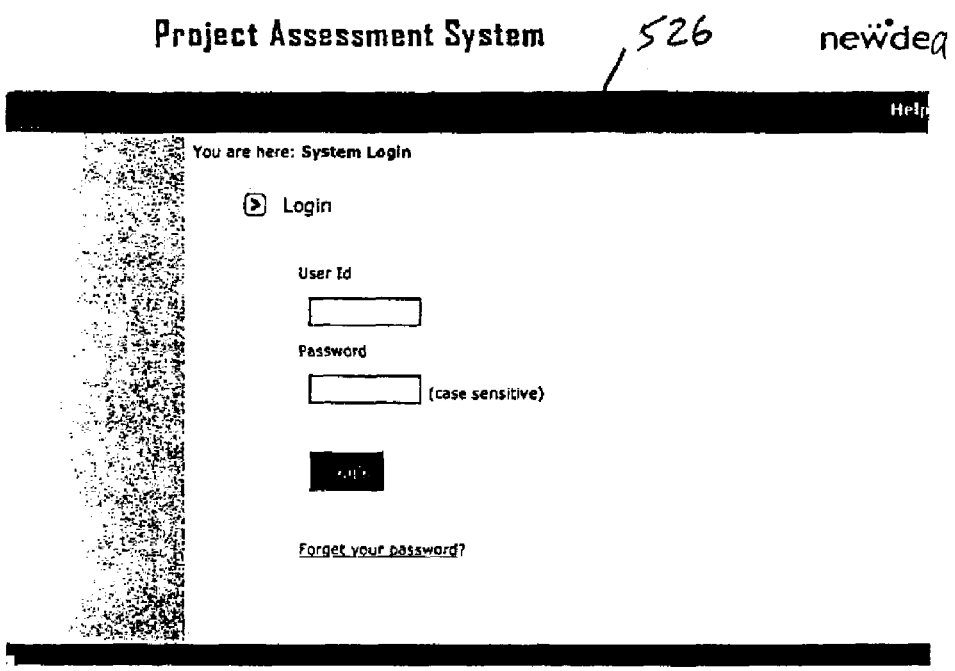
FIG. 46 is a screen shot of the "login" browser page for the "login and main menu" procedure of FIG. 36.
Figure 59:
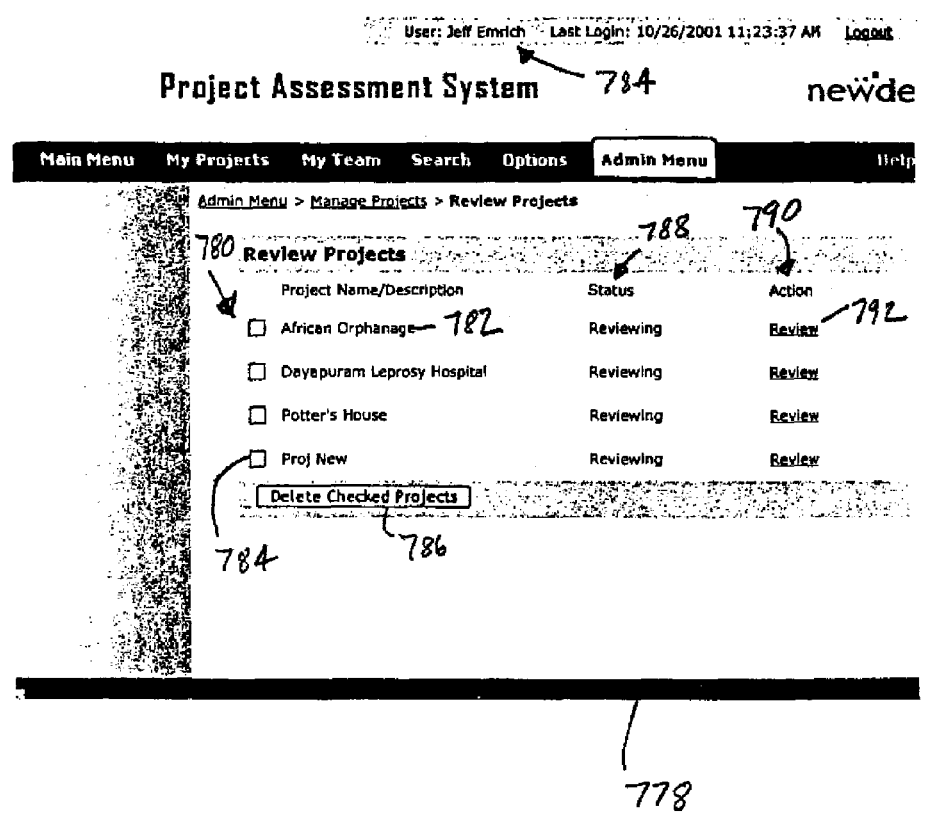
FIG. 59 is a screen shot of the "review projects" browser page of the "review projects" procedure of FIG. 45.

With reference now to FIGS. 45 and 59, the review projects procedure 776 first displays a review projects browser page 778. This page 778 includes the standard assessment main menu and a list, e.g., 780, of the particular projects, e.g., 782, in the portfolio for the particular user's team and the particular user, e.g., 784, shown as logged in and using the system on the page 778. This list is drawn, of course, from the SQL database. This page 778 also includes a status column 788 and an action column 790 for reporting status, and the next action required for each project 780 listed on the page 778 in order to approve the project for receipt of donations by other users of the system, including the user's team.

If the user clicks on a check-box adjacent one or more projects, e.g., 784, and then clicks on the delete button 786, the checked projects are deleted from the page 778 and from the portfolio for that user 784 and for his team.

If the user clicks on a "review" label, e.g., 792 for a given project 782, the review projects procedure 776 displays. as shown in FIG. 60, the review project—general info browser page 794 for the given project 782. With reference now to FIGS. 45 and 60, this page 794 presents general information for the given project entered as described above in conjunction with the my projects 552 and edit existing project 592 procedures of FIGS. 37 and 38, respectively. This general information page 794 includes the project name 795, input id (the user name of the user that entered this project into the system) 796, input date 797, project name 798, brief project description 799, project description 800, project notes 801, project mailing address 802, project shipping address 803, and website url 804.

This page 794 also includes a vertical "review project menu" 806 on its left side 808. The review project menu 806 allows the user the option of clicking on a general info label 810, an organization label 812, a description label 814, a financial label 816, a classification label 818, a contacts label 820, a media label 822, and an evaluation label 824. This page 794 also includes a page indicator arrow 826 that indicates the identity of the particular page 794 then being displayed on screen.

In the example shown in the particular screen shot of FIG. 60, many fields, e.g., 800, are blank—include no data, e.g., 800, 801, 803. The user can see that, in order to continue with the assessment of the project (in order to qualify it for charitable donations) the user should first enter the data sought in the empty field(s).

The user may next click on the organization label 812, and the review projects procedure 776 calls the review organizational info function 828. This function 828 displays a review organizational info page (not shown), which presents organizational informational fields for the project. As with the general info page 794 of FIG. 60, the user can see the information that has been entered as well as fields that may not yet be determined and entered into the SQL database for association and display in connection with project on this organizational info page.

The user may instead click on the description label 814 (or instead click on the next label 827), and the review projects procedure 776 calls the review project description function 830. The review project description function 830 then displays the review project-description page 832 of FIG. 61.

With reference now to FIGS. 45 and 61, the review project-descriptions page 832 includes the following information fields for the project: the project name and input data, generally 831 shown also on the general info page 794 of FIG. 60; the project's problem statement 834; the project's constituency 836; the project's program description 838; the project's goals, objectives, activities/strategies 840; the project's organizational authority structure 842; and the project's governance 844. This page also includes a next button 846 and the review project menu.

The user should also review this page to ensure that adequate data has been entered and stored for the project. When adequate information has been entered into all fields on this page 832, the user and others can use this information to assess the project and determine whether it should or should not qualify for inclusion an a giving portfolio for the user or his or her team members (or their clients or donors).

If the user clicks on the next button 846 or the financial label, the review projects procedure 776 of FIG. 45 calls the review project financial info function 848. This function 848 displays the review projects—financial browser page 850 of FIG. 62.

With reference now to FIGS. 45 and 62, the review projects—financial browser page 850 includes the assessment main menu, the review projects menu, and the project name and input data, generally 852. This page 852, as all others in the project assessment system, also includes the bread crumb, or browser page, history 854. By clicking on any page label, e.g., 856, in this history, that particular page in this history 854 represented by the clicked page label is displayed.

This page also includes the following information fields: total project budget amount 858, project funds requested 860, project funding request period 862, matching grant information 864, fiscal year start date 866, project total annual expenses 868, and project expense breakdown 870. The user may review and determine the adequacy and acceptability of this information and associated project as explained above in connection with FIG. 61.

If the user next clicks on the next button 872, or instead on the classification button 818, the review projects procedure 776 calls the review project classification function 850. This function 850 then displays the review project—classification browser page 852 of FIGS. 63 and 64.

Figure 64:
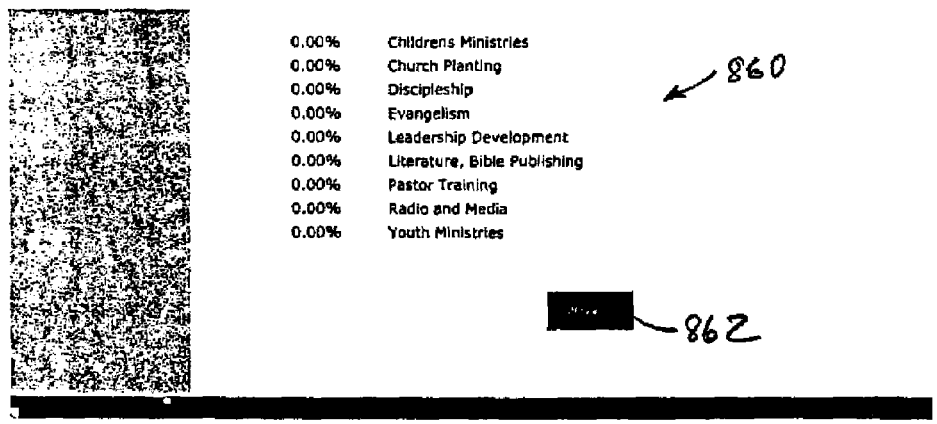
FIG. 64 is a screen shot of the lower portion of the "review project—classification" browser page of FIG. 63.

With reference now to FIGS. 45, 63, and 64, the review project—classification page 852 is structured identically to the review project—financial page 850 of FIG. 62, except that it 852 includes the following project information fields: economic development focus percentages for the project 854; infrastructure development focus percentages for the project 856; social development focus percentages for the project 858; and spiritual development focus percentages for the project 860. The user may review and determine the adequacy and acceptability of this information and associated project as explained above in connection with FIG. 62, for example.

If the user clicks on the next button 862, the review projects procedure 776 calls the review projects contacts function 864.

The review project contacts function 864 then displays the review project—contacts browser page 866 of FIG. 65.

Referring now to FIGS. 45 and 65, this page 866 is structured identically to the review project—financial page 850 of FIG. 62 except that it includes the following information project information field: contacts 868. The user may review and determine the adequacy and acceptability of this information and associated project as explained above in connection with FIG. 62, for example.

If the user clicks on the next button 870 on this page 866, the review projects procedure 776 calls the review projects media function 872. The review project contacts function 872 then displays the review project—media browser page 874 of FIG. 66.

Figure 66:
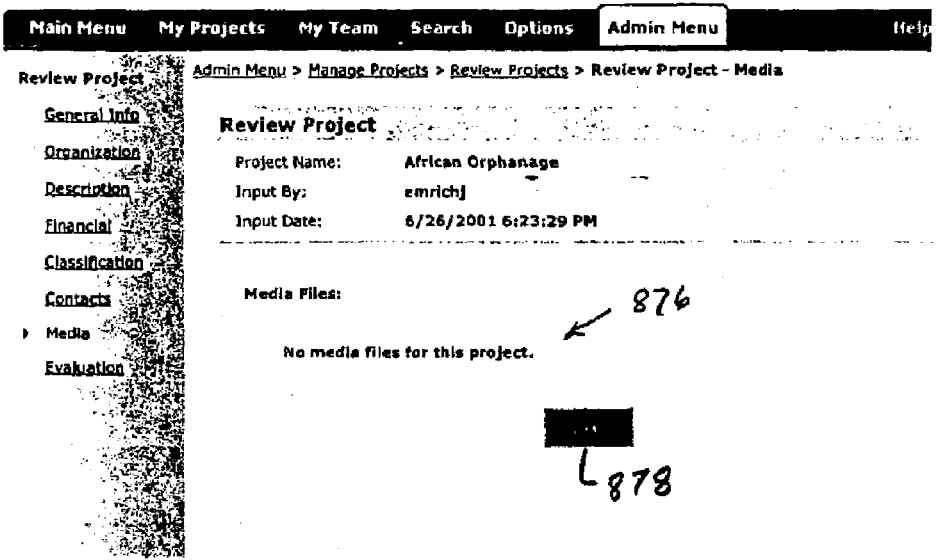
FIG. 66 is a screen shot of the "review project—media" browser page of the "review projects" procedure of FIG. 45.

Referring now to FIGS. 45 and 66, this page 874 is structured identically to the review project—financial page 850 of FIG. 62 except that it includes the following information project information field: media 876. The user may review and determine the adequacy and acceptability of this information and associated project information as explained above in connection with FIG. 62, for example.

If the user clicks on the next button 878 on this page 874, the review projects procedure 776 calls the evaluation page function 880. The evaluation page function 880 then displays the review project—evaluation browser page 874 of FIG. 67.

Referring now to FIGS. 45 and 67, this page 874 is structured identically to the review project—financial page 850 of FIG. 62 except that (i) it includes a save button 885 rather than a next button and (ii) the following interactive project information field: a reviewer's notes input field 876. This page 874 also includes the user/reviewer with the choice of: approve project 878, reject project 880, or leave project as is for now 882. If the user approves the project by clicking the approve project click circle 878, 884 and the save button 885, the project administrator is automatically notified (preferably by e-mail) of the approval 886. Also, the approval is recorded in the SQL database 888. This "approval" would then show up as an "approval" on the review projects page 778 of FIG. 59 for the particular approved project. In addition, this approval process renders this project available for retrieval of the project information for this project in the portfolio management system described above in connection with FIGS. 3-35.

Figure 68:
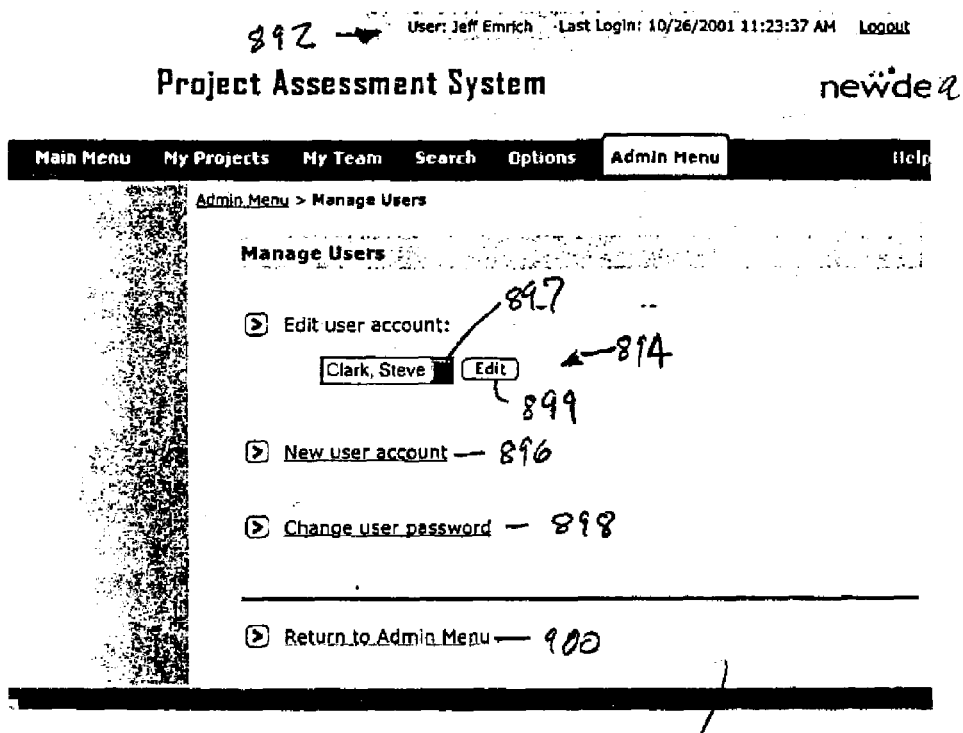
FIG. 68 is a screen shot of the "manage users" browser page of the "manage users" procedure of FIG. 42.
Figure 70:
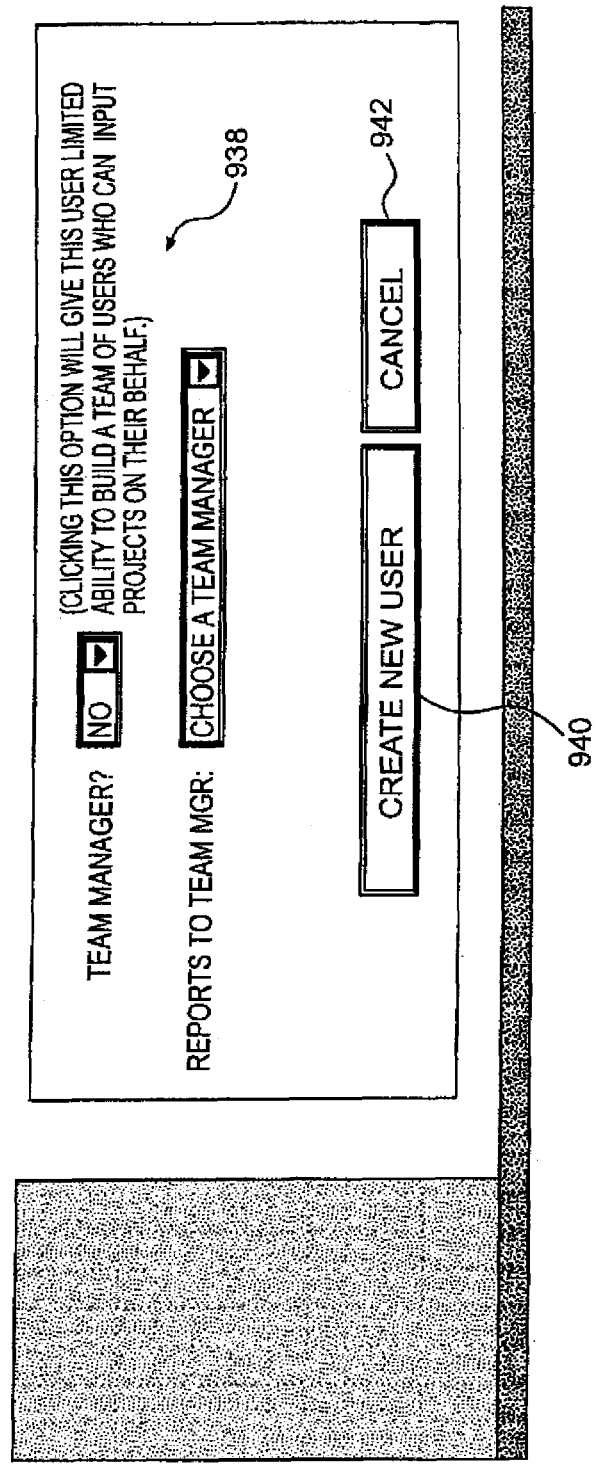
FIG. 70 is a screen shot of the lower portion of the "new user account" browser page of FIG. 69.

With reference now to FIGS. 42 and 57, if the user clicks on the manage users label 758, the system administration procedure 752 calls the manage users function 758. With reference to FIGS. 42 and 68, the manage users function 752 then displays the manage users browser page 890. The manage users page 890 includes the assessment main menu and standard user and user login information, generally 892, at the top of the page 890. The manage users page 890 also includes an edit user field 894, a new user account label 896, a change user password label 898, and return to admin menu label 900.

The edit user field 894 includes a drop down menu button 897. If the user clicks on this button 897, the names of the team members on the user's team appear on a drop down menu (not shown). The user may then click on the name of any team member shown and then click on the edit button 899. The edit user function 902 then displays with an edit user account browser page 904 as shown in FIG. 72.

With reference now to FIGS. 42 and 72, the edit user account browser page 904 includes the assessment main menu and the following information editing fields for the selected user (i.e., the user/team member identified in the edit user field 894 in the preceding manage users page 890 of FIG. 68). These editing fields include: user name 906; user phone and fax numbers 908; user email address 910; user biography 912; whether the user has administrative privileges on the system 914 (selected by drop down menu); whether the user is a team manager for others 916 (selected by drop down menu); and the team manager for the user (if any) 918 (selected by drop down menu). This page 904 also includes a change password label 920, a delete user label 922, and a save button 924.

If the user clicks on the save button 924 and the required information has been entered/edited on the page 904, the edit user function 902 saves the information entered on this page 904 to the SQL database. If the required information is not entered, a warning message appears on screen (not shown). If the user clicks on the delete user button 926, the user whose information is shown in the edit user fields is deleted from the SQL database.

With reference now to FIGS. 42, 68, and 69, if the user clicks on the new user account label 896, the manage users function 758 displays the new user account page 928 shown in FIG. 69. With reference now to FIGS. 42 and 69, this page 928 includes the assessment main menu and presents the new user information entry fields including name 930, contact information 932, biography 934, user id and password 936, and whether the user has system administrator privileges, team manager privileges, or team member status 938.

If the user has entered the required information in these new user information entry fields and then clicks on the save new user button 940, the information shown on the page 928 is saved to the SQL database (provided also of course that the password has been entered properly) for the new user identified on this page 928. The new user function 941 then displays the manage users page 890 of FIG. 68.

If the user instead clicks on the cancel button 942, the user is returned to the manage users page 890 of FIG. 68 without any saving of any information entered on the new user account page 928 of FIG. 69.

With reference now to FIGS. 42 and 68, if the user clicks on the change user password label 898, the manage users function 758 displays the change user password browser page 944 shown in FIG. 71. With reference now to FIGS. 42 and 71, in this page 944 the operating user may edit the passwords of other users, which appear in a drop down menu 946 for the operating user 948 depending on the operating user's access privileges. If the operating user is an administrator, the operating user 948 and all other users will appear in the drop down menu 946. If the operating user 948 is a team manger without administrator access, the team managers assigned to that team manager will appear in the drop down menu 946. If the operating user has properly changed the password fields 950 for a particular other user and clicks on the save password button 952, the new password is saved in the SQL database for the particular other user. If, on the other hand, the user clicks on the cancel button 954, the change password function 958 returns the user to the manage users page 890 of FIG. 68.

Figure 44:
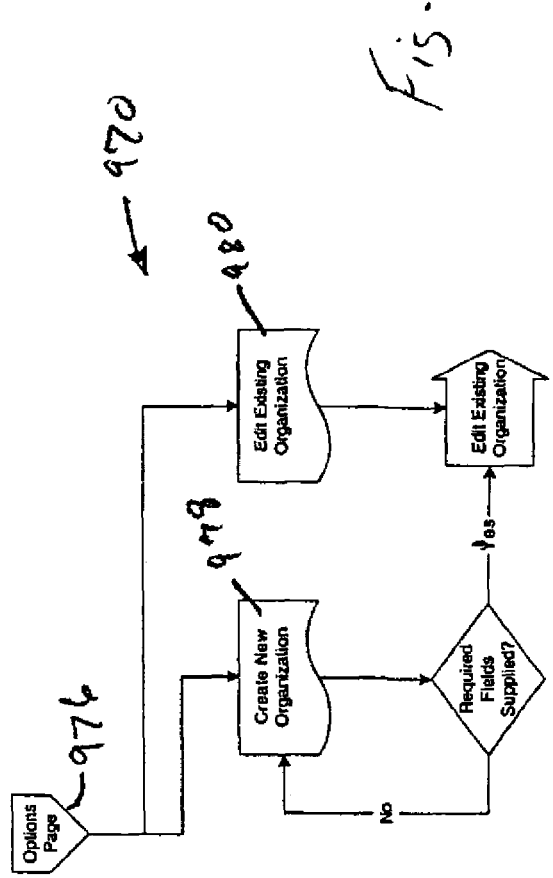
FIG. 44 is a flowchart for the "manage organizations" procedure in the project assessment portion of the philanthropy management system.

If the user clicks on the options label 972 on the assessment main menu, the login and main menu procedure of FIG. 36 is called, which in turn calls 552 the manage organizations procedure 970 of FIG. 44. The manage organizations procedure 970 displays an organization options page 976, which presents the user with the choice of creating a new organization 978 or editing an existing organization 980. If the user clicks on the new organization label 978, the user is presented with a new organization browser page (not shown) through which the user may enter and save information about a new organization. If the user clicks on the edit existing organization label 980, the user is presented with an edit existing organization browser page (not shown) through which the user may edit information, and save the edited information, about an existing organization. All of these pages include the assessment main menu and associated functions described above.

It can thus be seen that the above-explained charitable project assessment system provides an automated system for input, editing, review, and evaluation of charitable projects and organizations for possible donations from donors or those who manage donations, preferably through use of the above-explained charitable portfolio management system. The project assessment also allows a user to create automated grant proposals that are maintained and updated on a regular basis. Regular updating of the proposals, according to the guidelines provided in association with the project assessment system, renders the funding process more informed and less risky for donors and those who manage, locate, or implement donations for donors.

Once a user has input all data for a project sought by the project assessment system, the project is ready for review by the system administrators or other operator in order to determine if the project is qualified for funding. If qualified, the project is marked as approved, which renders it accessible, through a common or separate SQL database, to users of the portfolio management system.

The above-described preferred philanthropic portfolio management system and the charitable project assessment system both consist of three distinct parts: (i) a browser and preferably web-based and web-accessible graphical user interface; (ii) server-side business logic; and (iii) central relational SQL database for storing, revising, displaying, and searching data.

The graphical user interface consists of browser or web pages built using a combination of HTML, JavaScript, Cascading Style Sheets, and Active Server Pages. The web pages are served by Microsoft's Internet Information Server running on a Windows 2000 Server. Cascading Style Sheets are used to control the look of the text on the pages, and custom developed graphics contribute to the overall look and feel of the pages and the navigation system. The navigation system consists of a basic menu system that identifies the top-level categories of the application. Once a top-level category has been chosen from the menu, the sub-level categories are available for selection. Near the top of each page, there is a "bread crumb" trail that displays the history of the pages the user has moved through to arrive at the current page.

The server-side business logic consists of a series of traditional components: .NET components and web services. Traditional components are built with Visual Basic and compiled into DLL (Dynamic Link Library) files that are hosted on a Windows 2000 Server. .NET components are created with the C# programming language and are hosted on a Windows 2000 Server that has the Microsoft .NET SDK installed. Microsoft .NET Web Services are also used to execute certain business processes. Web Services provide an HTTP interface for executing business processes in the philanthropic portfolio management system. The processes that are implemented as Web Services will be called by many of the Active Server Pages as users use this system. Additionally, the Web Services also may be called by additional systems that can be developed and added to the system in the future.

The relational SQL database portion of the systems utilize Microsoft's SQL Database Server as noted above. This SQL database consists of a series of tables that contain rows and columns that identify and define the data in the SQL database. The data in the database consists of:
  information about each user and team in the system;
  portfolios for each philanthropist that uses the system (both direct and indirect users);
  information about each of the charitable projects and organizations that are approved to receive funding in the system, including:
    general project information;
    organization information;
    contact information for people or entities associated with the project;
    project classification information;
    project geographical involvement;
    detailed project descriptions and goals;
    media information, including pictures, movies, articles, and other documents.
  information about each philanthropist's goal for giving;
  transactional detail about each charitable financial transaction that is handled by the system; and
  project assessment information for projects currently under review and others already reviewed.

The SQL database also utilizes stored procedures for performing many database related functions such as inserts, updates, and deletions, as well as queries by the users and the systems. The inclusion of stored procedures provides an added level of security and performance to the database component of the overall system.

The SQL database may be structured as one database, as described above, supporting both the portfolio management system and the project assessment system. Alternatively, the SQL database may be two separate databases, one for each such system. In the latter case, projects are transferred when approved from the project assessment system SQL database to the portfolio management system SQL database.

While the preferred database consists of one or more SQL databases, other database systems and formats, including those that are not relational, may be utilized. The same is true of the other system components, such as the operating system for example. Although the applicants preferred embodiment is a Windows 2000 operating system, other operating systems may be used, such as Unix, Linux, or others that may run on Apple Macs or other types of computers.

The foregoing systems and methods may be utilized in order to provide a method of doing of doing business. The business earns revenue in one or more of the following ways:
  charging a periodic fee for access to, or operating or maintaining, one system or both systems or data maintained by the system(s) or their users;
  charging a transactional fee for donation transactions that take place through one system or both systems or in conjunction with use of one or both of them;
  receiving a commission or fee for money managed or donated through or with one systems or both systems;
  charging a fee for the amount of time spent using one system or both systems; and
  charging a fee for conducting a charitable project or organization assessment.

The term "fee" may include forms of remuneration other than cash, including for example barter remuneration.

It is to be understood that term "charitable project" can include "charitable organization" or other entity or activity pursuing charitable donations, resources, or funding.

The system described above is generally architected as two application systems: the philanthropic portfolio management system and the charitable project assessment system. Both systems preferably access information from the SQL database(s). These two applications could be combined into one system provide much the same functionality, however. Similarly, these two applications could be divided up into more applications if desired.

We claim:

1. A charitable donation management system of the type accessible by a plurality of remote users through a communications network, the charitable donation management system comprising in combination:
   A. at least one server computing system in communication with said communications network;
   B. one or more charitable project databases mounted on the server computing system, the one or more charitable project databases including:
   the identity of a plurality of pre-approved charitable projects;
   financial information about said plurality of pre-approved charitable projects wherein financial information about said plurality of pre-approved charitable projects comprises at least one of: funding request period, total budget for at least one project, matching grant information for at least one project, a total annual expenses for at least one project, or expense breakdown for at least one project;
   project objective information about said plurality of pre-approved charitable projects; and
   updated status information relating to said plurality of pre-approved charitable projects;
   C. a charitable project data server system mounted on the server computing system in communication with the one or more charitable project databases and the communications network; and
   D. wherein the communication network is configured to communicate the financial information, the project objective information, and the updated status information to a remote user, and further wherein the communications network receives a donation after communicating the updated status information.

2. The charitable project donation management system of claim 1 wherein the communications network includes the Internet.

3. The charitable project donation management system of claim 1 wherein the communications network includes a local area network.

4. The charitable project donation management system of claim 1 wherein the communications network includes a wide area network.

5. The charitable project donation management system of claim 1 wherein the charitable project data server system is browser based.

6. The charitable project donation management system of claim 2 wherein the server computing system comprises a web-server.

7. The charitable project donation management system of claim 2 wherein the one or more charitable project databases include remote user team information.

8. The charitable project donation management system of claim 3 wherein the one or more charitable project databases include pre-approved remote user login information.

9. The charitable project donation management system of claim 1 wherein the one or more charitable project databases include fee information.

10. The charitable project donation management system of claim 9 wherein the fee information includes information about at least one of: a fee charged periodically; a fee charged on a transactional basis; a fee charged based on amount of time spent using the charitable project management system; a fee charged for conducting a charitable project assessment; or a fee charged for conducting a charitable organization assessment.

11. The charitable project donation management system of claim 1 wherein the one or more charitable project databases includes project goals for at least one project.

12. The charitable project donation management system of claim 1 wherein the one or more charitable project databases includes a website URL for at least one project.

13. The charitable project donation management system of claim 1 wherein project objective information about said plurality of pre-approved charitable projects comprises at least one of: economic development information for at least one project; infrastructure development information for at least one project; social development information for at least one project; or spiritual development information for at least one project.

14. The charitable project donation management system of claim 1 wherein the one or more charitable project databases mounted on the server computing system further comprise, for at least one project, approval information.

* * * * *